United States Patent
Singh et al.

(10) Patent No.: US 12,125,121 B2
(45) Date of Patent: Oct. 22, 2024

(54) TESSELLATION REDISTRIBUTION FOR REDUCING LATENCIES IN PROCESSORS

(71) Applicant: Intel Corporation, Santa Clara, CA (US)

(72) Inventors: Amandeep Singh, Bangalore (IN); Arthur Hunter, Jr., Cameron Park, CA (US); Abhinav Srivastava, Bangalore (IN); Rashmi Agarwal, Bangalore (IN); Mohit Choradia, Bangalore (IN)

(73) Assignee: INTEL CORPORATION, Santa Clara, CA (US)

( * ) Notice: Subject to any disclaimer, the term of this patent is extended or adjusted under 35 U.S.C. 154(b) by 665 days.

(21) Appl. No.: 17/211,095

(22) Filed: Mar. 24, 2021

(65) Prior Publication Data
US 2022/0309605 A1    Sep. 29, 2022

(51) Int. Cl.
*G06T 1/20* (2006.01)
*G06T 1/60* (2006.01)
*G06T 17/20* (2006.01)

(52) U.S. Cl.
CPC ............. *G06T 1/20* (2013.01); *G06T 1/60* (2013.01); *G06T 17/20* (2013.01); *G06T 2210/52* (2013.01)

(58) Field of Classification Search
None
See application file for complete search history.

(56) References Cited

U.S. PATENT DOCUMENTS

2018/0060995 A1    3/2018 Doyle
2018/0075650 A1*   3/2018 Akenine-Moller ....... G06T 1/20

FOREIGN PATENT DOCUMENTS

DE    102022106500 A1    9/2022

OTHER PUBLICATIONS

Notice of Publication for Chinese Patent Application No. 202210127824.X mailed Oct. 11, 2022, 3 pages (including translation).

* cited by examiner

*Primary Examiner* — Kyle Zhai
(74) *Attorney, Agent, or Firm* — JAFFERY WATSON MENDONSA & HAMILTON LLP

(57) ABSTRACT

An apparatus to facilitate tessellation redistribution for reducing latencies in processors is disclosed. The apparatus includes a processor to provide parallel interconnected geometry fixed-function units with separate front end and back ends, the front ends to perform patch culling and transmission and the back ends to perform patch reception from the front end and patch tessellation; provide a tessellation redistribution central engine to redistribute patches among the back ends using a redistribution bus; receive, by the tessellation redistribution central engine from the front ends in parallel, patch transmissions marked for distribution, the tessellation redistribution engine to process the patch transmissions in order; and in response to receiving a synchronization barrier packet from one of the front ends, broadcast, by the tessellation redistribution central engine, the synchronization barrier packet to the back ends to cause one of the back ends to process tessellation work locally.

20 Claims, 28 Drawing Sheets

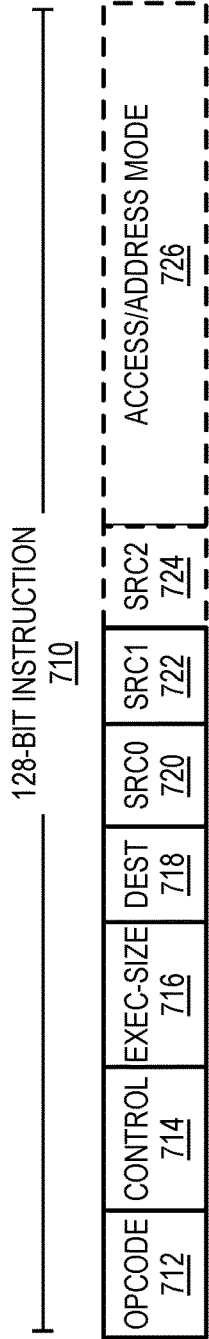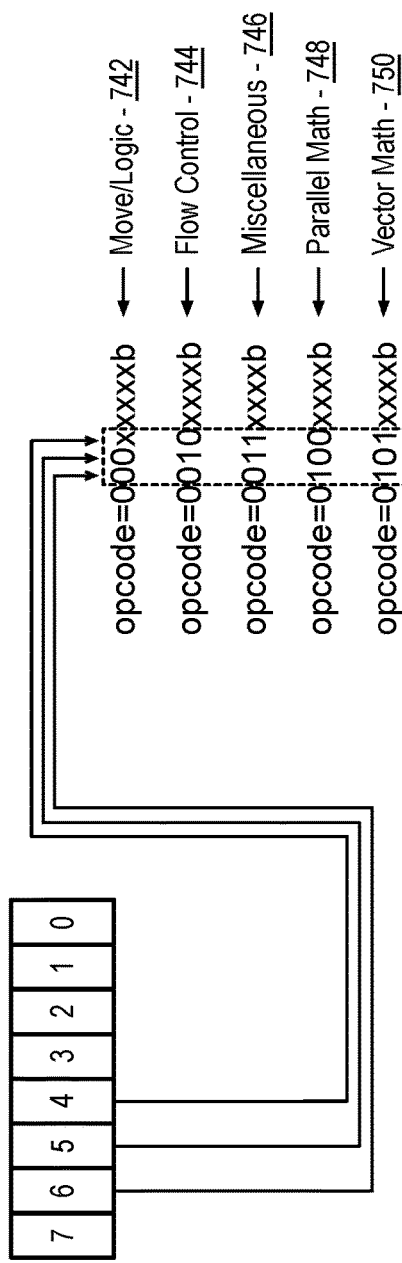
FIG. 7

1600

```
┌─────────────────────────────────────────────────────────────────────────┐
│ Provide parallel interconnected geometry fixed-function units with      │
│ separate front end and back ends, the front ends to perform patch       │
│ culling and transmission and the back ends to perform patch reception   │
│ from the front end and patch tessellation                               │
│                                                                    1610 │
└─────────────────────────────────────────────────────────────────────────┘
                                   │
                                   ▼
┌─────────────────────────────────────────────────────────────────────────┐
│ Provide a tessellation redistribution central engine to redistribute    │
│ patches among the back ends using a redistribution bus provided         │
│ between the front ends and the back ends                                │
│                                                                    1620 │
└─────────────────────────────────────────────────────────────────────────┘
                                   │
                                   ▼
┌─────────────────────────────────────────────────────────────────────────┐
│ Receive, by the tessellation redistribution central engine from the     │
│ front ends in parallel, patch transmissions marked for distribution,    │
│ the tessellation redistribution engine to process the patch             │
│ transmissions in order                                                  │
│                                                                    1630 │
└─────────────────────────────────────────────────────────────────────────┘
                                   │
                                   ▼
┌─────────────────────────────────────────────────────────────────────────┐
│ In response to receiving a synchronization barrier packet from one of   │
│ the front ends, broadcast, by the tessellation redistribution central   │
│ engine, the synchronization barrier packet to the back ends to cause    │
│ one of the back ends to process tessellation work locally               │
│                                                                    1640 │
└─────────────────────────────────────────────────────────────────────────┘
```

Receive patch marked for local processing at tessellation engine with a marker indicating a synchronization barrier packet associated with the patch, the patch maintain in intermediate storage of the tessellation engine
1810

Read out work from front end that is not marked with a synchronization barrier packet or control packets from tessellation redistribution central engine, while received patch is held in intermediate storage
1820

Receive, from tessellation redistribution central engine, synchronization barrier packet marked with ID of the tessellation engine
1830

Process patch from the intermediate storage in response to receiving the synchronization barrier packet
1840

FIG. 18

TESSELLATION REDISTRIBUTION FOR REDUCING LATENCIES IN PROCESSORS

FIELD

This document relates generally to data processing and more particularly to tessellation redistribution for reducing latencies in processors.

BACKGROUND

Current parallel graphics data processing includes systems and methods developed to perform specific operations on graphics data such as, for example, linear interpolation, tessellation, rasterization, texture mapping, depth testing, etc. Traditionally, graphics processors used fixed function computational units to process graphics data; however, more recently, portions of graphics processors have been made programmable, enabling such processors to support a wider variety of operations for processing vertex and fragment data.

To further increase performance, graphics processors typically implement processing techniques such as pipelining that attempt to process, in parallel, as much graphics data as possible throughout the different parts of the graphics pipeline. Parallel graphics processors with single instruction, multiple data (SIMD) or single instruction, multiple thread (SIMT) architectures are designed to maximize the amount of parallel processing in the graphics pipeline. In a SIMD architecture, computers with multiple processing elements attempt to perform the same operation on multiple data points simultaneously. In a SIMT architecture, groups of parallel threads attempt to execute program instructions synchronously together as often as possible to increase processing efficiency.

Providing competitive geometry processing performance in a graphics processing unit (GPU) typically involves multiple, parallel, concurrent geometry processing fixed-function pipelines (GPPs). These GPPs (sometimes also called SMMs, Geometry and Setup fixed-function pipelines or pre-tessellation and post-tessellation pipeline) include a mixture of programmable shader and fixed-function stages in the OpenGL rendering pipeline (RP). In computer graphics, tessellation is used to manage datasets of polygons (also referred to a vertex sets) presenting objects in a scene and divide them into suitable structures for rendering. An advantage of tessellation for realtime graphics is that it allows detail to be dynamically added and subtracted from a 3D polygon mesh and its silhouette edges based on control parameters (e.g., camera distance). Tessellation involves subdividing a patch primitive (also called an "object") and computing vertex values for its vertices. A tessellation control shader may determine how much tessellation to perform by specifying a tessellation factor. The number of vertices per patch may be defined at the application level. A patch object may be a triangle or quad (which is a square).

Tessellation involves subdividing parametric domains associated with input patch primitives into a set of triangle primitives and computing vertex values at the tessellated domain points (coinciding with the corners of those triangle primitives). Input patch primitives may be associated with triangle or quad parametric domains. A tessellation control shader may determine how finely the domain is subdivided into triangles by specifying a set of tessellation factors for each patch. A tessellation evaluation shader may subsequently compute vertex values using a set of input control points associated with an input patch primitive as well as the domain parameters at the tessellated domain points. The number of input control points associated with patch primitives may be defined at the application level.

A problem in parallel rendering graphics architectures is how to take advantage of parallel GPPs and Rendering or Rasterization Pipelines (RPs) while maintaining the strict in-order three-dimensional (3D) pipeline rendering model. The major issue involved is the arbitrary mapping of application-supplied "object-space" geometry primitives onto the rendered image during the rendering process, where the "Sort-Middle" architecture has been exploited effectively by the industry. In this scheme, the GPU first performs full geometry processing on arbitrarily distributed subsets ("batches") of object-space primitives via parallel GPPs. The resulting screen-space primitives are then correctly reordered (i.e., temporally sorted) and distributed to RPs via a rasterization crossbar based on the screen space regions owned by each RP.

Increasing the number (N) of GPPs in the design typically utilizes deeper buffers at the output of each GPP in order to provide sufficient GPP output buffering while the GPP "waits for its turn" to output to the rasterization crossbar. Here the GPP output buffer would likely be sized to the average time it takes the other (N−1) GPPs to drain their batches to the crossbar. If sufficient buffering is not provided, the overall geometry throughput tends to degrade to the throughput of a single GPP, as the GPPs "waiting for their turn" quickly become stalled as they are not drained while waiting, and when it becomes their turn, they output to the crossbar at the GPP processing rate (which is slower than the crossbar rate).

BRIEF DESCRIPTION OF THE DRAWINGS

So that the manner in which the above recited features of the present embodiments can be understood in detail, a more particular description of the embodiments, briefly summarized above, may be had by reference to embodiments, some of which are illustrated in the appended drawings. It is to be noted, however, that the appended drawings illustrate only typical embodiments and are therefore not to be considered limiting of its scope.

FIG. 7 is a block diagram illustrating a graphics processor instruction formats.

FIG. 16 is a flow diagram illustrating an embodiment of a method for tessellation redistribution for reducing latencies in processors.

FIG. 18 is a flow diagram illustrating an embodiment of a method for a tessellation engine back end (TEBE) performing tessellation redistribution for reducing latencies in processors.

DETAILED DESCRIPTION

A graphics processing unit (GPU) is communicatively coupled to host/processor cores to accelerate, for example, graphics operations, machine-learning operations, pattern analysis operations, and/or various general-purpose GPU (GPGPU) functions. The GPU may be communicatively coupled to the host processor/cores over a bus or another interconnect (e.g., a high-speed interconnect such as PCIe or NVLink). Alternatively, the GPU may be integrated on the same package or chip as the cores and communicatively coupled to the cores over an internal processor bus/interconnect (i.e., internal to the package or chip). Regardless of the manner in which the GPU is connected, the processor cores may allocate work to the GPU in the form of sequences of commands/instructions contained in a work descriptor. The GPU then uses dedicated circuitry/logic for efficiently processing these commands/instructions.

In the following description, numerous specific details are set forth to provide a more thorough understanding. However, it will be apparent to one of skill in the art that the embodiments described herein may be practiced without one or more of these specific details. In other instances, well-known features have not been described to avoid obscuring the details of the present embodiments.

System Overview

Figure 1:
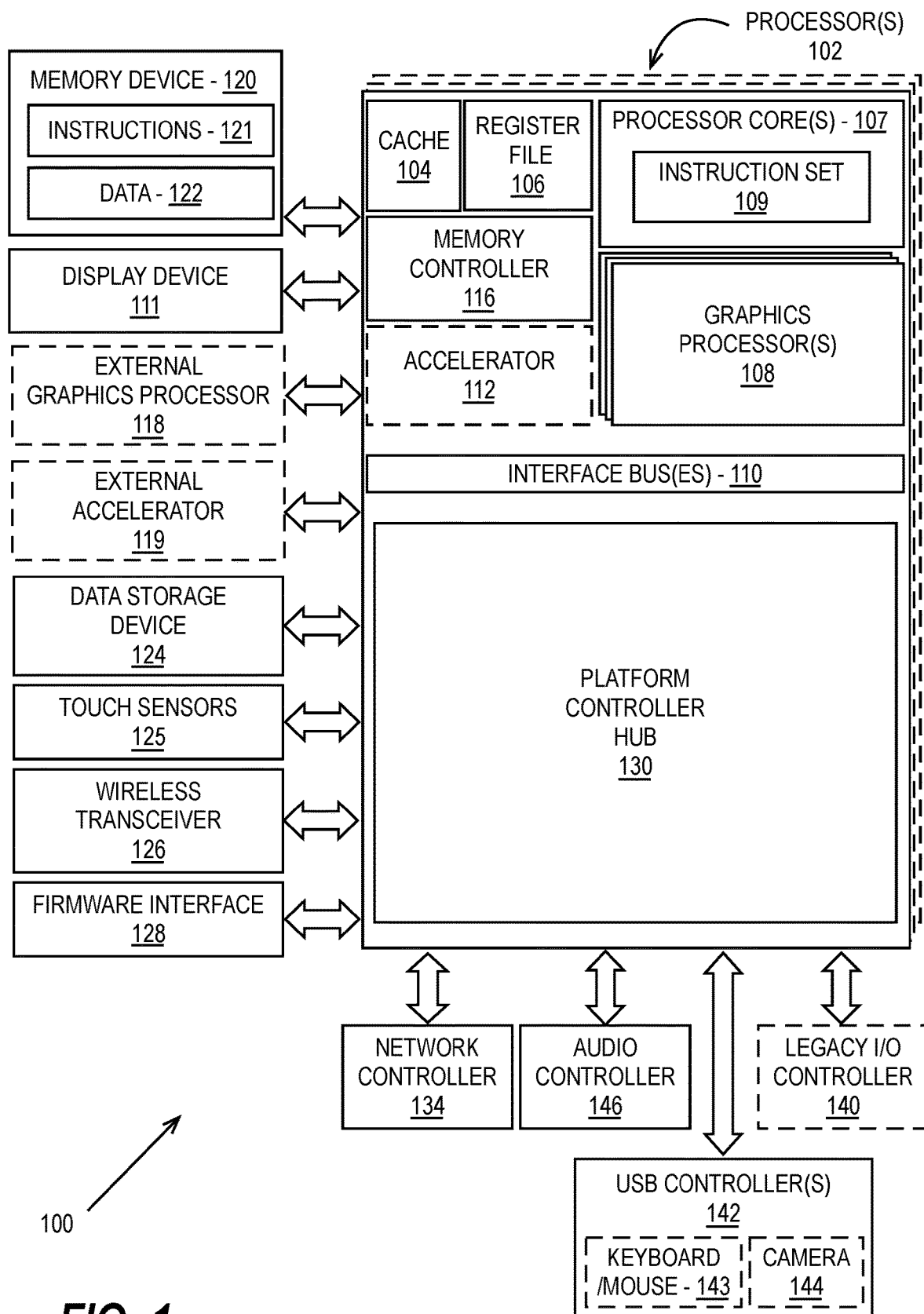
FIG. 1 is a block diagram of a processing system.

FIG. 1 is a block diagram of a processing system 100, according to an embodiment. System 100 may be used in a single processor desktop system, a multiprocessor workstation system, or a server system having a large number of processors 102 or processor cores 107. In one embodiment, the system 100 is a processing platform incorporated within a system-on-a-chip (SoC) integrated circuit for use in mobile, handheld, or embedded devices such as within Internet-of-things (IoT) devices with wired or wireless connectivity to a local or wide area network.

In one embodiment, system 100 can include, couple with, or be integrated within: a server-based gaming platform; a game console, including a game and media console; a mobile gaming console, a handheld game console, or an online game console. In some embodiments the system 100 is part of a mobile phone, smart phone, tablet computing device or mobile Internet-connected device such as a laptop with low internal storage capacity. Processing system 100 can also include, couple with, or be integrated within: a wearable device, such as a smart watch wearable device; smart eyewear or clothing enhanced with augmented reality (AR) or virtual reality (VR) features to provide visual, audio or tactile outputs to supplement real world visual, audio or tactile experiences or otherwise provide text, audio, graphics, video, holographic images or video, or tactile feedback; other augmented reality (AR) device; or other virtual reality (VR) device. In some embodiments, the processing system 100 includes or is part of a television or set top box device. In one embodiment, system 100 can include, couple with, or be integrated within a self-driving vehicle such as a bus, tractor trailer, car, motor or electric power cycle, plane or glider (or any combination thereof). The self-driving vehicle may use system 100 to process the environment sensed around the vehicle.

In some embodiments, the one or more processors 102 each include one or more processor cores 107 to process instructions which, when executed, perform operations for system or user software. In some embodiments, at least one of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). One or more processor cores 107 may process a different instruction set 109, which may include instructions to facilitate the emulation of other instruction sets. Processor core 107 may also include other processing devices, such as a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 can be additionally included in processor 102 and may include different types of registers for storing different types of data (e.g., integer registers, floating point registers, status registers, and an instruction pointer register). Some registers may be general-purpose registers, while other registers may be specific to the design of the processor 102.

In some embodiments, one or more processor(s) 102 are coupled with one or more interface bus(es) 110 to transmit communication signals such as address, data, or control signals between processor 102 and other components in the system 100. The interface bus 110, in one embodiment, can be a processor bus, such as a version of the Direct Media Interface (DMI) bus. However, processor busses are not limited to the DMI bus, and may include one or more Peripheral Component Interconnect buses (e.g., PCI, PCI express), memory busses, or other types of interface busses. In one embodiment the processor(s) 102 include an integrated memory controller 116 and a platform controller hub 130. The memory controller 116 facilitates communication between a memory device and other components of the system 100, while the platform controller hub (PCH) 130 provides connections to I/O devices via a local I/O bus.

The memory device 120 can be a dynamic random-access memory (DRAM) device, a static random-access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller 116 also couples with an optional external graphics processor 118, which may communicate with the one or more graphics processors 108 in processors 102 to perform graphics and media operations. In some embodiments, graphics, media, and or compute operations may be assisted by an accelerator 112 which is a coprocessor that can be configured to perform a specialized set of graphics, media, or compute operations. For example, in one embodiment the accelerator 112 is a matrix multiplication accelerator used to optimize machine learning or compute operations. In one embodiment the accelerator 112 is a ray-tracing accelerator that can be used to perform ray-tracing operations in concert with the graphics processor 108. In one embodiment, an external accelerator 119 may be used in place of or in concert with the accelerator 112.

In some embodiments a display device 111 can connect to the processor(s) 102. The display device 111 can be one or more of an internal display device, as in a mobile electronic device or a laptop device or an external display device attached via a display interface (e.g., DisplayPort, etc.). In one embodiment the display device 111 can be a head mounted display (HMD) such as a stereoscopic display device for use in virtual reality (VR) applications or augmented reality (AR) applications.

In some embodiments the platform controller hub 130 enables peripherals to connect to memory device 120 and processor 102 via a high-speed I/O bus. The I/O peripherals include, but are not limited to, an audio controller 146, a network controller 134, a firmware interface 128, a wireless transceiver 126, touch sensors 125, a data storage device 124 (e.g., non-volatile memory, volatile memory, hard disk drive, flash memory, NAND, 3D NAND, 3D XPoint, etc.). The data storage device 124 can connect via a storage interface (e.g., SATA) or via a peripheral bus, such as a Peripheral Component Interconnect bus (e.g., PCI, PCI express). The touch sensors 125 can include touch screen sensors, pressure sensors, or fingerprint sensors. The wireless transceiver 126 can be a Wi-Fi transceiver, a Bluetooth transceiver, or a mobile network transceiver such as a 3G, 4G, 5G, or Long-Term Evolution (LTE) transceiver. The firmware interface 128 enables communication with system firmware, and can be, for example, a unified extensible firmware interface (UEFI). The network controller 134 can enable a network connection to a wired network. In some embodiments, a high-performance network controller (not shown) couples with the interface bus 110. The audio controller 146, in one embodiment, is a multi-channel high definition audio controller. In one embodiment the system 100 includes an optional legacy I/O controller 140 for coupling legacy (e.g., Personal System 2 (PS/2)) devices to the system. The platform controller hub 130 can also connect to one or more Universal Serial Bus (USB) controllers 142 connect input devices, such as keyboard and mouse 143 combinations, a camera 144, or other USB input devices.

It will be appreciated that the system 100 shown is example and not limiting, as other types of data processing systems that are differently configured may also be used. For example, an instance of the memory controller 116 and platform controller hub 130 may be integrated into a discreet external graphics processor, such as the external graphics processor 118. In one embodiment the platform controller hub 130 and/or memory controller 116 may be external to the one or more processor(s) 102. For example, the system 100 can include an external memory controller 116 and platform controller hub 130, which may be configured as a memory controller hub and peripheral controller hub within a system chipset that is in communication with the processor(s) 102.

For example, circuit boards ("sleds") can be used on which components such as CPUs, memory, and other components are placed are designed for increased thermal performance. In some examples, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in a rack, thereby enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

A data center can utilize a single network architecture ("fabric") that supports multiple other network architectures including Ethernet and Omni-Path. The sleds can be coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center may, in use, pool resources, such as memory, accelerators (e.g., GPUs, graphics accelerators, FPGAs, ASICs, neural network and/or artificial intelligence accelerators, etc.), and data storage drives that are physically disaggregated, and provide them to compute resources (e.g., processors), enabling the compute resources to access the pooled resources as if they were local.

A power supply or source can provide voltage and/or current to system 100 or any component or system described herein. In one example, the power supply includes an AC to DC (alternating current to direct current) adapter to plug into a wall outlet. Such AC power can be renewable energy (e.g., solar power) power source. In one example, power source includes a DC power source, such as an external AC to DC converter. In one example, power source or power supply includes wireless charging hardware to charge via proximity to a charging field. In one example, power source can include an internal battery, alternating current supply, motion-based power supply, solar power supply, or fuel cell source.

FIGS. 2A-2D illustrate computing systems and graphics processors provided by embodiments described herein. The elements of FIGS. 2A-2D having the same reference numbers (or names) as the elements of any other figure herein can operate or function in any manner similar to that described elsewhere herein, but are not limited to such.

Figure 2A:
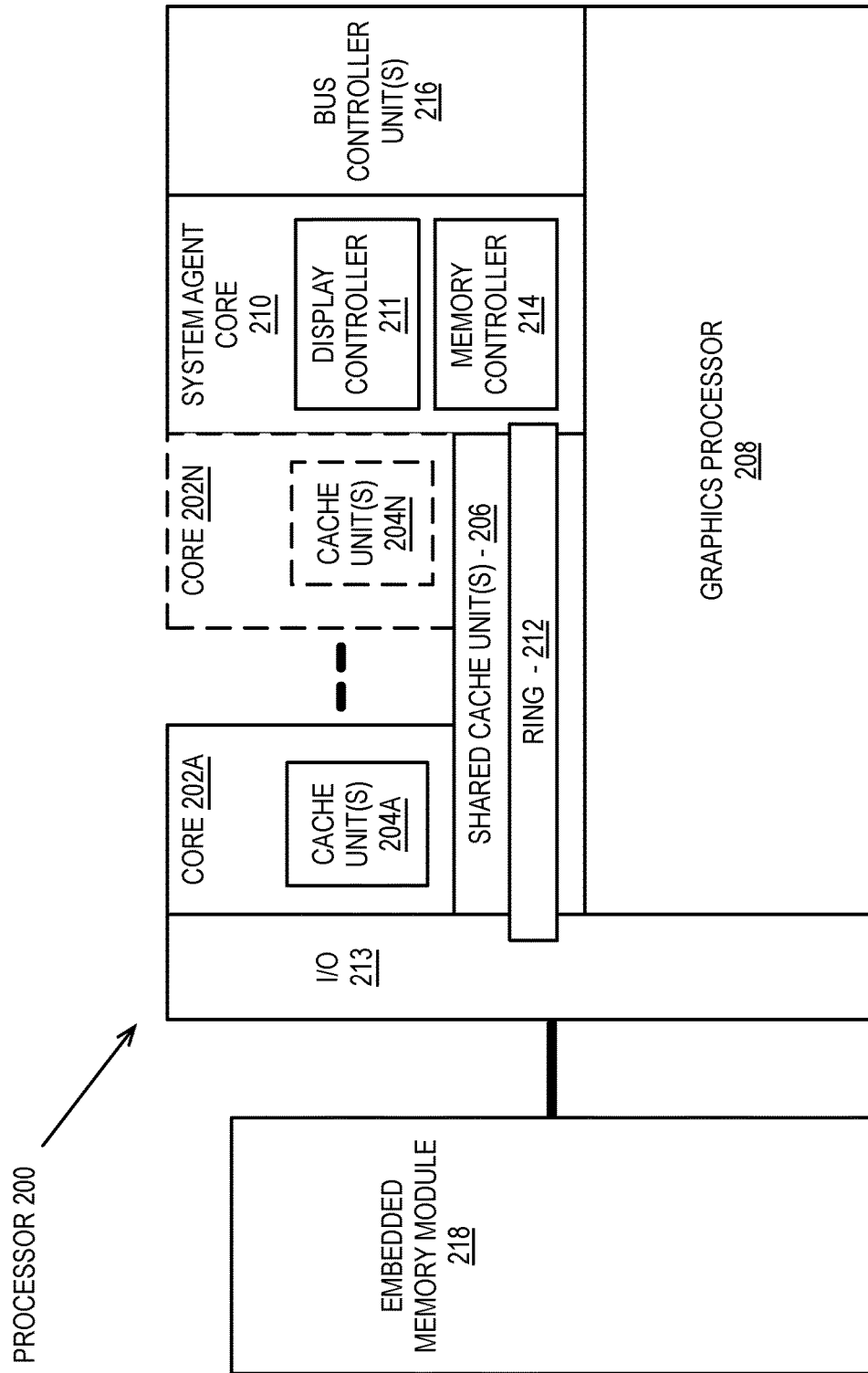
FIG. 2A-2D illustrate computing systems and graphics processors.

FIG. 2A is a block diagram of an embodiment of a processor 200 having one or more processor cores 202A-202N, an integrated memory controller 214, and an integrated graphics processor 208. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206. The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more PCI or PCI express busses. System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, the system agent core 210 also includes a display controller 211 to drive graphics processor output to one or more coupled displays. In some embodiments, display controller 211 may also be a separate module coupled with the graphics processor via at least one interconnect, or may be integrated within the graphics processor 208.

In some embodiments, a ring-based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The example I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202A-202N and graphics processor 208 can use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-202N execute a first instruction set, while at least one of the other cores executes a subset of the first instruction set or a different instruction set. In one embodiment, processor cores 202A-202N are heterogeneous in terms of microarchitecture, where one or more cores having a relatively higher power consumption couple with one or more power cores having a lower power consumption. In one embodiment, processor cores 202A-202N are heterogeneous in terms of computational capability. Additionally, processor 200 can be implemented on one or more chips or as an SoC integrated circuit having the illustrated components, in addition to other components.

Figure 2B:
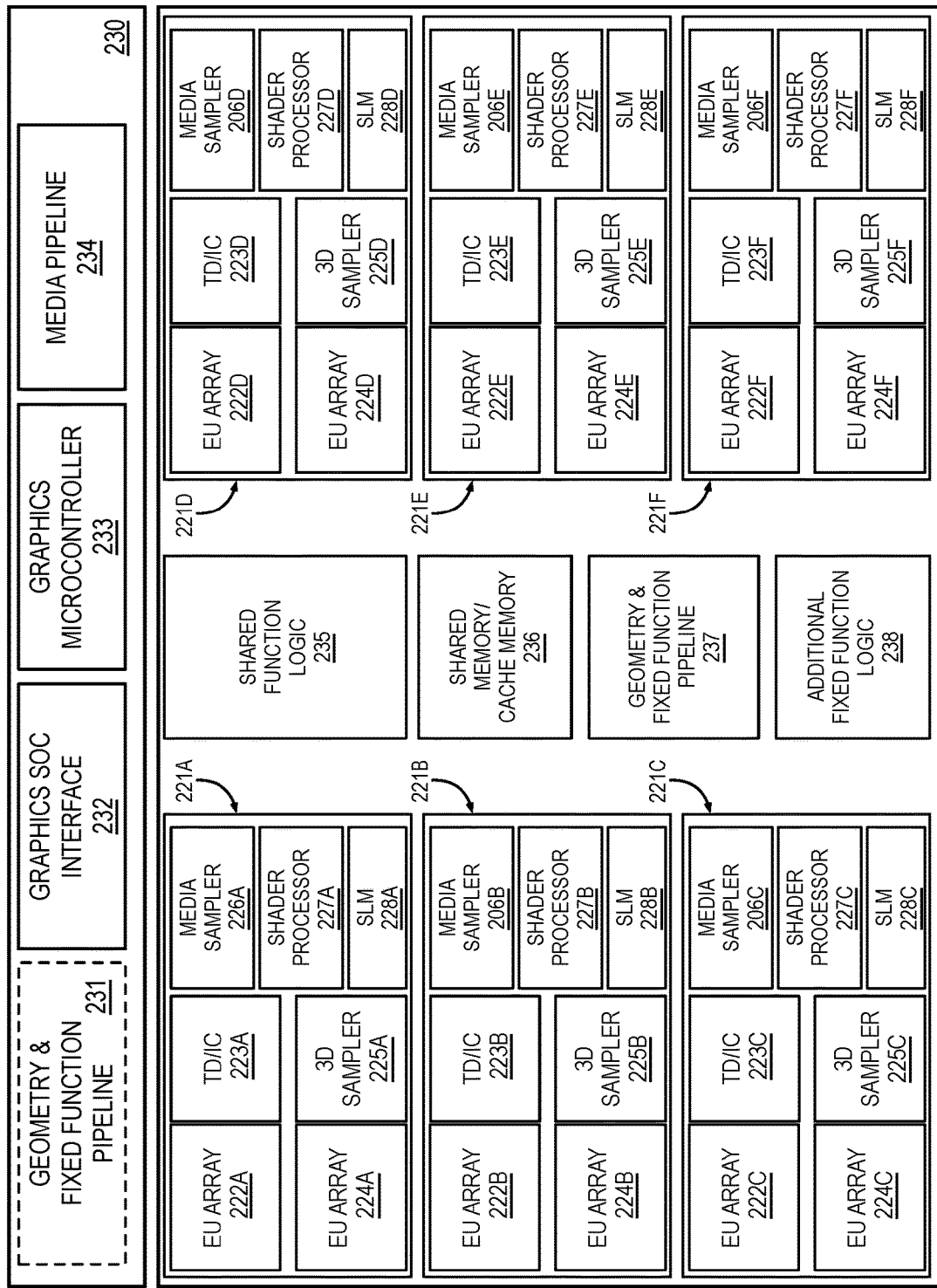

FIG. 2B is a block diagram of hardware logic of a graphics processor core 219, according to some embodiments described herein. Elements of FIG. 2B having the same reference numbers (or names) as the elements of any other figure herein can operate or function in any manner similar to that described elsewhere herein, but are not limited to such. The graphics processor core 219, sometimes referred to as a core slice, can be one or multiple graphics cores within a modular graphics processor. The graphics processor core 219 is example of one graphics core slice, and a graphics processor as described herein may include multiple graphics core slices based on target power and performance envelopes. Each graphics processor core 219 can include a fixed function block 230 coupled with multiple sub-cores 221A-221F, also referred to as sub-slices, that include modular blocks of general-purpose and fixed function logic.

In some embodiments, the fixed function block 230 includes a geometry/fixed function pipeline 231 that can be shared by all sub-cores in the graphics processor core 219, for example, in lower performance and/or lower power graphics processor implementations. In various embodiments, the geometry/fixed function pipeline 231 includes a 3D fixed function pipeline (e.g., 3D pipeline 312 as in FIG. 3 and FIG. 4, described below) a video front-end unit, a thread spawner and thread dispatcher, and a unified return buffer manager, which manages unified return buffers (e.g., unified return buffer 418 in FIG. 4, as described below).

In one embodiment the fixed function block 230 also includes a graphics SoC interface 232, a graphics microcontroller 233, and a media pipeline 234. The graphics SoC interface 232 provides an interface between the graphics processor core 219 and other processor cores within a system on a chip integrated circuit. The graphics microcontroller 233 is a programmable sub-processor that is configurable to manage various functions of the graphics processor core 219, including thread dispatch, scheduling, and preemption. The media pipeline 234 (e.g., media pipeline 316 of FIG. 3 and FIG. 4) includes logic to facilitate the decoding, encoding, pre-processing, and/or post-processing of multimedia data, including image and video data. The media pipeline 234 implement media operations via requests to compute or sampling logic within the sub-cores 221-221F.

In one embodiment the SoC interface 232 enables the graphics processor core 219 to communicate with general-purpose application processor cores (e.g., CPUs) and/or other components within an SoC, including memory hierarchy elements such as a shared last level cache memory, the system RAM, and/or embedded on-chip or on-package DRAM. The SoC interface 232 can also enable communication with fixed function devices within the SoC, such as camera imaging pipelines, and enables the use of and/or implements global memory atomics that may be shared between the graphics processor core 219 and CPUs within the SoC. The SoC interface 232 can also implement power management controls for the graphics processor core 219 and enable an interface between a clock domain of the graphic core 219 and other clock domains within the SoC. In one embodiment the SoC interface 232 enables receipt of command buffers from a command streamer and global thread dispatcher that are configured to provide commands and instructions to each of one or more graphics cores within a graphics processor. The commands and instructions can be dispatched to the media pipeline 234, when media operations are to be performed, or a geometry and fixed function pipeline (e.g., geometry and fixed function pipeline 231, geometry and fixed function pipeline 237) when graphics processing operations are to be performed.

The graphics microcontroller 233 can be configured to perform various scheduling and management tasks for the graphics processor core 219. In one embodiment the graphics microcontroller 233 can perform graphics and/or compute workload scheduling on the various graphics parallel engines within execution unit (EU) arrays 222A-222F, 224A-224F within the sub-cores 221A-221F. In this scheduling model, host software executing on a CPU core of an SoC including the graphics processor core 219 can submit workloads one of multiple graphic processor doorbells, which invokes a scheduling operation on the appropriate graphics engine. Scheduling operations include determining which workload to run next, submitting a workload to a command streamer, pre-empting existing workloads running on an engine, monitoring progress of a workload, and notifying host software when a workload is complete. In one embodiment the graphics microcontroller 233 can also facilitate low-power or idle states for the graphics processor core 219, providing the graphics processor core 219 with the ability to save and restore registers within the graphics processor core 219 across low-power state transitions independently from the operating system and/or graphics driver software on the system.

The graphics processor core 219 may have greater than or fewer than the illustrated sub-cores 221A-221F, up to N modular sub-cores. For each set of N sub-cores, the graphics processor core 219 can also include shared function logic 235, shared and/or cache memory 236, a geometry/fixed function pipeline 237, as well as additional fixed function logic 238 to accelerate various graphics and compute processing operations. The shared function logic 235 can include logic units associated with the shared function logic 420 of FIG. 4 (e.g., sampler, math, and/or inter-thread communication logic) that can be shared by each N sub-cores within the graphics processor core 219. The shared and/or cache memory 236 can be a last-level cache for the set of N sub-cores 221A-221F within the graphics processor core 219, and can also serve as shared memory that is accessible by multiple sub-cores. The geometry/fixed function pipeline 237 can be included instead of the geometry/fixed function pipeline 231 within the fixed function block 230 and can include the same or similar logic units.

In one embodiment the graphics processor core 219 includes additional fixed function logic 238 that can include various fixed function acceleration logic for use by the graphics processor core 219. In one embodiment the additional fixed function logic 238 includes an additional geometry pipeline for use in position only shading. In position-only shading, two geometry pipelines exist, the full geometry pipeline within the geometry/fixed function pipeline 238, 231, and a cull pipeline, which is an additional geometry pipeline which may be included within the additional fixed function logic 238. In one embodiment the cull pipeline is a trimmed down version of the full geometry pipeline. The full pipeline and the cull pipeline can execute different instances of the same application, each instance having a separate context. Position only shading can hide long cull runs of discarded triangles, enabling shading to be completed earlier in some instances. For example and in one embodiment the cull pipeline logic within the additional fixed function logic 238 can execute position shaders in parallel with the main application and generally generates results faster than the full pipeline, as the cull pipeline fetches and shades only the position attribute of the vertices, without performing rasterization and rendering of the pixels to the frame buffer. The cull pipeline can use the generated results to compute visibility information for all the triangles without regard to whether those triangles are culled. The full pipeline (which in this instance may be referred to as a replay pipeline) can consume the visibility information to skip the culled triangles to shade only the visible triangles that are finally passed to the rasterization phase.

In one embodiment the additional fixed function logic 238 can also include machine-learning acceleration logic, such as fixed function matrix multiplication logic, for implementations including optimizations for machine learning training or inferencing.

Within each graphics sub-core 221A-221F includes a set of execution resources that may be used to perform graphics, media, and compute operations in response to requests by graphics pipeline, media pipeline, or shader programs. The graphics sub-cores 221A-221F include multiple EU arrays 222A-222F, 224A-224F, thread dispatch and inter-thread communication (TD/IC) logic 223A-223F, a 3D (e.g., texture) sampler 225A-225F, a media sampler 206A-206F, a shader processor 227A-227F, and shared local memory (SLM) 228A-228F. The EU arrays 222A-222F, 224A-224F each include multiple execution units, which are general-purpose graphics processing units capable of performing floating-point and integer/fixed-point logic operations in service of a graphics, media, or compute operation, including graphics, media, or compute shader programs. The TD/IC logic 223A-223F performs local thread dispatch and thread control operations for the execution units within a sub-core and facilitate communication between threads executing on the execution units of the sub-core. The 3D sampler 225A-225F can read texture or other 3D graphics related data into memory. The 3D sampler can read texture data differently based on a configured sample state and the texture format associated with a given texture. The media sampler 206A-206F can perform similar read operations based on the type and format associated with media data. In one embodiment, each graphics sub-core 221A-221F can alternately include a unified 3D and media sampler. Threads executing on the execution units within each of the sub-cores 221A-221F can make use of shared local memory 228A-228F within each sub-core, to enable threads executing within a thread group to execute using a common pool of on-chip memory.

Figure 2C:
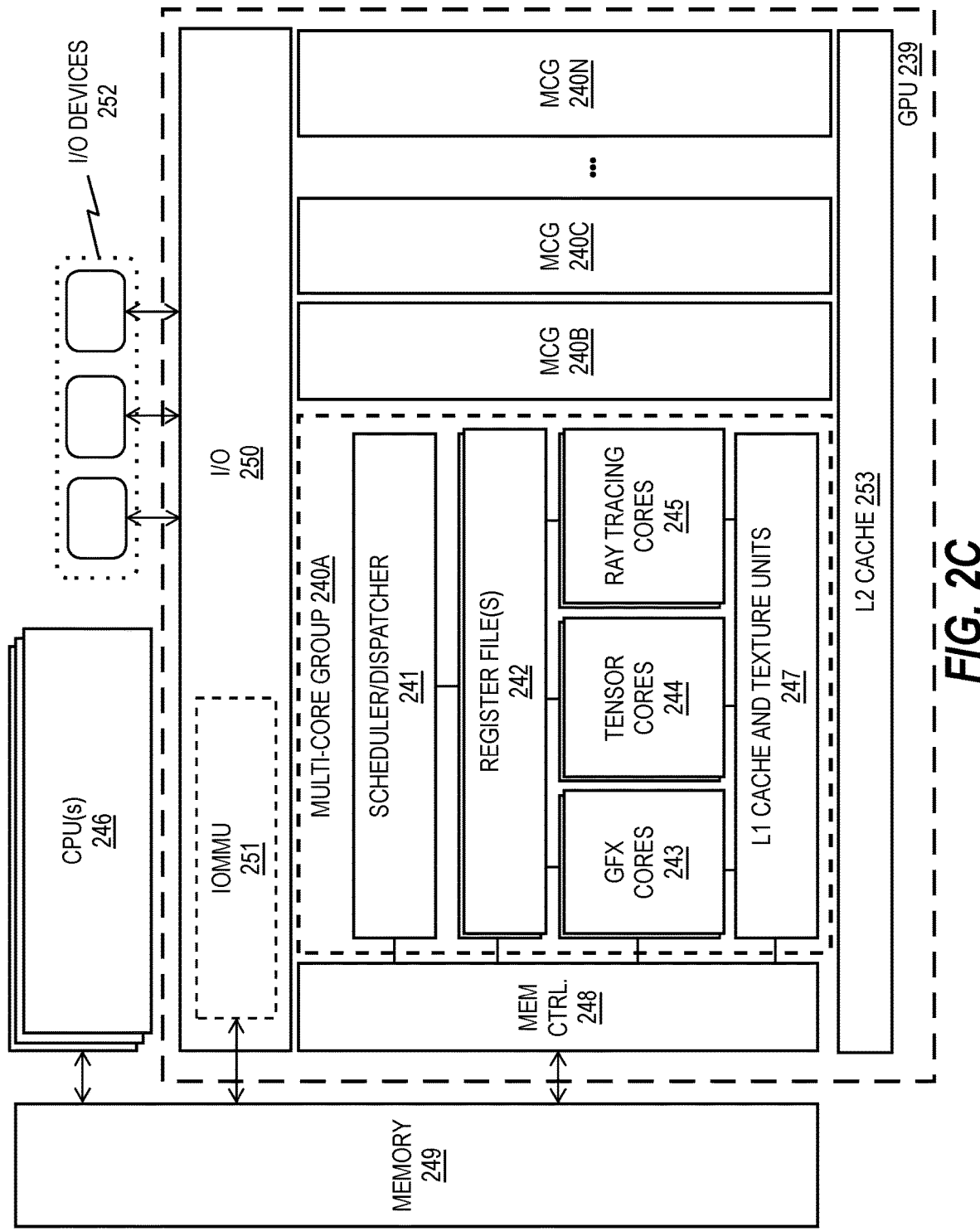

FIG. 2C illustrates a graphics processing unit (GPU) 239 that includes dedicated sets of graphics processing resources arranged into multi-core groups 240A-240N. While the details of only a single multi-core group 240A are provided, it will be appreciated that the other multi-core groups 240B-240N may be equipped with the same or similar sets of graphics processing resources.

As illustrated, a multi-core group 240A may include a set of graphics cores 243, a set of tensor cores 244, and a set of ray tracing cores 245. A scheduler/dispatcher 241 schedules and dispatches the graphics threads for execution on the various cores 243, 244, 245. A set of register files 242 store operand values used by the cores 243, 244, 245 when executing the graphics threads. These may include, for example, integer registers for storing integer values, floating point registers for storing floating point values, vector registers for storing packed data elements (integer and/or floating point data elements) and tile registers for storing tensor/matrix values. In one embodiment, the tile registers are implemented as combined sets of vector registers.

One or more combined level 1 (L1) caches and shared memory units 247 store graphics data such as texture data, vertex data, pixel data, ray data, bounding volume data, etc., locally within each multi-core group 240A. One or more texture units 247 can also be used to perform texturing operations, such as texture mapping and sampling. A Level 2 (L2) cache 253 shared by all or a subset of the multi-core groups 240A-240N stores graphics data and/or instructions for multiple concurrent graphics threads. As illustrated, the L2 cache 253 may be shared across a plurality of multi-core groups 240A-240N. One or more memory controllers 248 couple the GPU 239 to a memory 249 which may be a system memory (e.g., DRAM) and/or a dedicated graphics memory (e.g., GDDR6 memory).

Input/output (I/O) circuitry 250 couples the GPU 239 to one or more I/O devices 252 such as digital signal processors (DSPs), network controllers, or user input devices. An on-chip interconnect may be used to couple the I/O devices 252 to the GPU 239 and memory 249. One or more I/O memory management units (IOMMUs) 251 of the I/O circuitry 250 couple the I/O devices 252 directly to the system memory 249. In one embodiment, the IOMMU 251 manages multiple sets of page tables to map virtual addresses to physical addresses in system memory 249. In this embodiment, the I/O devices 252, CPU(s) 246, and GPU(s) 239 may share the same virtual address space.

In one implementation, the IOMMU 251 supports virtualization. In this case, it may manage a first set of page tables to map guest/graphics virtual addresses to guest/graphics physical addresses and a second set of page tables to map the guest/graphics physical addresses to system/host physical addresses (e.g., within system memory 249). The base addresses of each of the first and second sets of page tables may be stored in control registers and swapped out on a context switch (e.g., so that the new context is provided with access to the relevant set of page tables). While not illustrated in FIG. 2C, each of the cores 243, 244, 245 and/or multi-core groups 240A-240N may include translation lookaside buffers (TLBs) to cache guest virtual to guest physical translations, guest physical to host physical translations, and guest virtual to host physical translations.

In one embodiment, the CPUs 246, GPUs 239, and I/O devices 252 are integrated on a single semiconductor chip and/or chip package. The illustrated memory 249 may be integrated on the same chip or may be coupled to the memory controllers 248 via an off-chip interface. In one implementation, the memory 249 comprises GDDR6 memory which shares the same virtual address space as other physical system-level memories, although the underlying principles discussed herein are not limited to this specific implementation.

In one embodiment, the tensor cores 244 include a plurality of execution units specifically designed to perform matrix operations, which are the basic compute operation used to perform deep learning operations. For example, simultaneous matrix multiplication operations may be used for neural network training and inferencing. The tensor cores 244 may perform matrix processing using a variety of operand precisions including single precision floating-point (e.g., 32 bits), half-precision floating point (e.g., 16 bits), integer words (16 bits), bytes (8 bits), and half-bytes (4 bits). In one embodiment, a neural network implementation extracts features of each rendered scene, potentially combining details from multiple frames, to construct a high-quality final image.

In deep learning implementations, parallel matrix multiplication work may be scheduled for execution on the tensor cores 244. The training of neural networks, in particular, utilizes a significant number matrix dot product operations. In order to process an inner-product formulation of an N×N×N matrix multiply, the tensor cores 244 may include at least N dot-product processing elements. Before the matrix multiply begins, one entire matrix is loaded into tile registers and at least one column of a second matrix is loaded each cycle for N cycles. Each cycle, there are N dot products that are processed.

Matrix elements may be stored at different precisions depending on the particular implementation, including 16-bit words, 8-bit bytes (e.g., INT8) and 4-bit half-bytes (e.g., INT4). Different precision modes may be specified for the tensor cores 244 to ensure that the most efficient precision is used for different workloads (e.g., such as inferencing workloads which can tolerate quantization to bytes and half-bytes).

In one embodiment, the ray tracing cores 245 accelerate ray tracing operations for both real-time ray tracing and non-real-time ray tracing implementations. In particular, the ray tracing cores 245 include ray traversal/intersection circuitry for performing ray traversal using bounding volume hierarchies (BVHs) and identifying intersections between rays and primitives enclosed within the BVH volumes. The ray tracing cores 245 may also include circuitry for performing depth testing and culling (e.g., using a Z buffer or similar arrangement). In one implementation, the ray tracing cores 245 perform traversal and intersection operations in concert with the image denoising techniques described herein, at least a portion of which may be executed on the tensor cores 244. For example, in one embodiment, the tensor cores 244 implement a deep learning neural network to perform denoising of frames generated by the ray tracing cores 245. However, the CPU(s) 246, graphics cores 243, and/or ray tracing cores 245 may also implement all or a portion of the denoising and/or deep learning algorithms.

In addition, as described above, a distributed approach to denoising may be employed in which the GPU 239 is in a computing device coupled to other computing devices over a network or high speed interconnect. In this embodiment, the interconnected computing devices share neural network learning/training data to improve the speed with which the overall system learns to perform denoising for different types of image frames and/or different graphics applications.

In one embodiment, the ray tracing cores 245 process all BVH traversal and ray-primitive intersections, saving the graphics cores 243 from being overloaded with thousands of instructions per ray. In one embodiment, each ray tracing core 245 includes a first set of specialized circuitry for performing bounding box tests (e.g., for traversal operations) and a second set of specialized circuitry for performing the ray-triangle intersection tests (e.g., intersecting rays which have been traversed). Thus, in one embodiment, the multi-core group 240A can simply launch a ray probe, and the ray tracing cores 245 independently perform ray traversal and intersection and return hit data (e.g., a hit, no hit, multiple hits, etc.) to the thread context. The other cores 243, 244 are freed to perform other graphics or compute work while the ray tracing cores 245 perform the traversal and intersection operations.

In one embodiment, each ray tracing core 245 includes a traversal unit to perform BVH testing operations and an intersection unit which performs ray-primitive intersection tests. The intersection unit generates a "hit", "no hit", or "multiple hit" response, which it provides to the appropriate thread. During the traversal and intersection operations, the execution resources of the other cores (e.g., graphics cores 243 and tensor cores 244) are freed to perform other forms of graphics work.

In one particular embodiment described below, a hybrid rasterization/ray tracing approach is used in which work is distributed between the graphics cores 243 and ray tracing cores 245.

In one embodiment, the ray tracing cores 245 (and/or other cores 243, 244) include hardware support for a ray tracing instruction set such as Microsoft's DirectX Ray Tracing (DXR) which includes a DispatchRays command, as well as ray-generation, closest-hit, any-hit, and miss shaders, which enable the assignment of sets of shaders and textures for each object. Another ray tracing platform which may be supported by the ray tracing cores 245, graphics cores 243 and tensor cores 244 is Vulkan 1.1.85. Note, however, that the underlying principles discussed herein are not limited to any particular ray tracing ISA.

In general, the various cores 245, 244, 243 may support a ray tracing instruction set that includes instructions/functions for ray generation, closest hit, any hit, ray-primitive intersection, per-primitive and hierarchical bounding box construction, miss, visit, and exceptions. More specifically, one embodiment includes ray tracing instructions to perform the following functions:

Ray Generation—Ray generation instructions may be executed for each pixel, sample, or other user-defined work assignment.

Closest Hit—A closest hit instruction may be executed to locate the closest intersection point of a ray with primitives within a scene.

Any Hit—An any hit instruction identifies multiple intersections between a ray and primitives within a scene, potentially to identify a new closest intersection point.

Intersection—An intersection instruction performs a ray-primitive intersection test and outputs a result.

Per-primitive Bounding box Construction—This instruction builds a bounding box around a given primitive or group of primitives (e.g., when building a new BVH or other acceleration data structure).

Miss—Indicates that a ray misses all geometry within a scene, or specified region of a scene.

Visit—Indicates the children volumes a ray will traverse.

Exceptions—Includes various types of exception handlers (e.g., invoked for various error conditions).

Figure 2D:
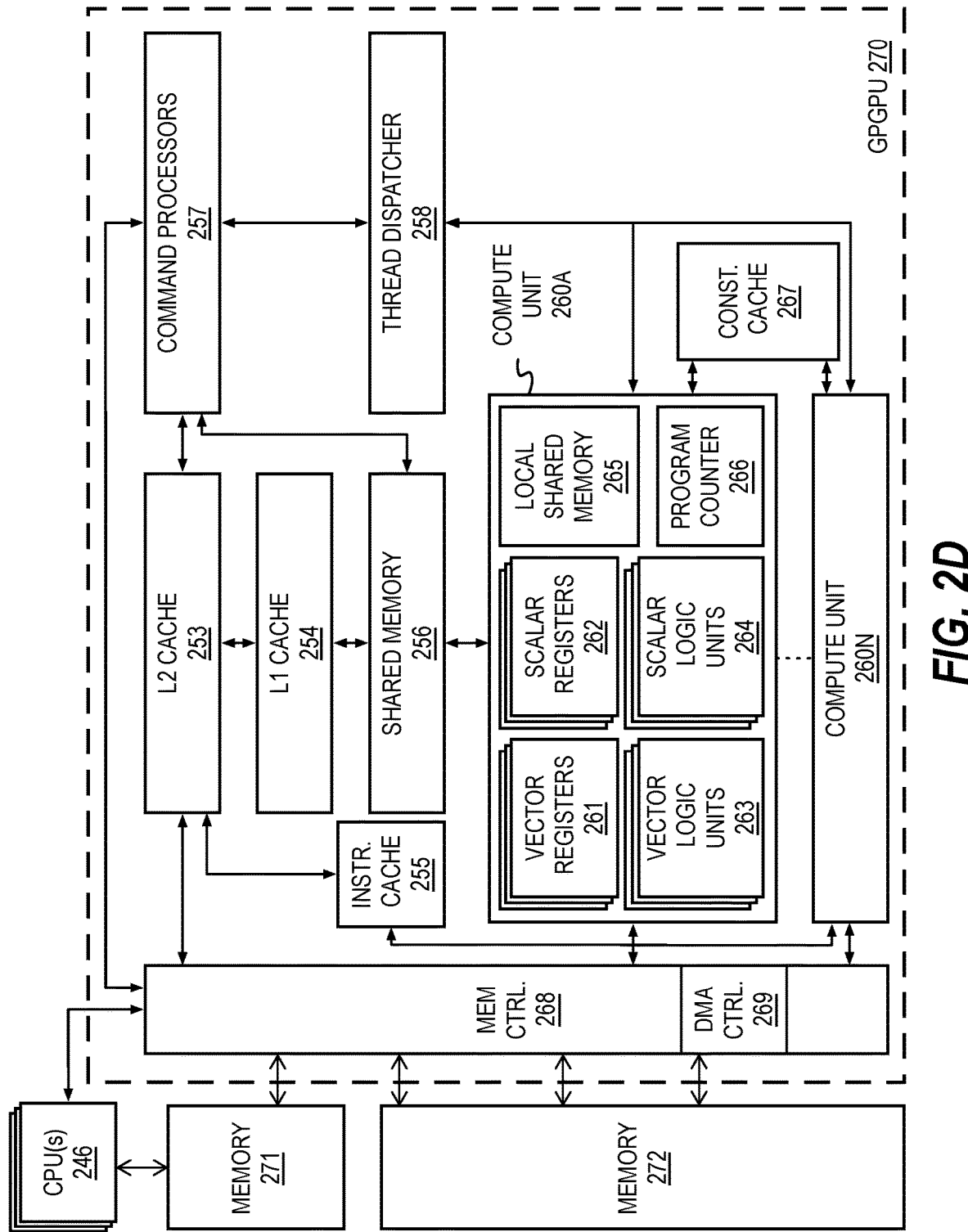

FIG. 2D is a block diagram of general purpose graphics processing unit (GPGPU) 270 that can be configured as a graphics processor and/or compute accelerator, according to embodiments described herein. The GPGPU 270 can interconnect with host processors (e.g., one or more CPU(s) 246) and memory 271, 272 via one or more system and/or memory busses. In one embodiment the memory 271 is system memory that may be shared with the one or more CPU(s) 246, while memory 272 is device memory that is dedicated to the GPGPU 270. In one embodiment, components within the GPGPU 270 and device memory 272 may be mapped into memory addresses that are accessible to the one or more CPU(s) 246. Access to memory 271 and 272 may be facilitated via a memory controller 268. In one embodiment the memory controller 268 includes an internal direct memory access (DMA) controller 269 or can include logic to perform operations that would otherwise be performed by a DMA controller.

The GPGPU 270 includes multiple cache memories, including an L2 cache 253, L1 cache 254, an instruction cache 255, and shared memory 256, at least a portion of which may also be partitioned as a cache memory. The GPGPU 270 also includes multiple compute units 260A-260N. Each compute unit 260A-260N includes a set of vector registers 261, scalar registers 262, vector logic units 263, and scalar logic units 264. The compute units 260A-260N can also include local shared memory 265 and a program counter 266. The compute units 260A-260N can couple with a constant cache 267, which can be used to store constant data, which is data that will not change during the run of kernel or shader program that executes on the GPGPU 270. In one embodiment the constant cache 267 is a scalar data cache and cached data can be fetched directly into the scalar registers 262.

During operation, the one or more CPU(s) 246 can write commands into registers or memory in the GPGPU 270 that has been mapped into an accessible address space. The command processors 257 can read the commands from registers or memory and determine how those commands will be processed within the GPGPU 270. A thread dispatcher 258 can then be used to dispatch threads to the compute units 260A-260N to perform those commands. Each compute unit 260A-260N can execute threads independently of the other compute units. Additionally each compute unit 260A-260N can be independently configured for conditional computation and can conditionally output the results of computation to memory. The command processors 257 can interrupt the one or more CPU(s) 246 when the submitted commands are complete.

Figure 3A:
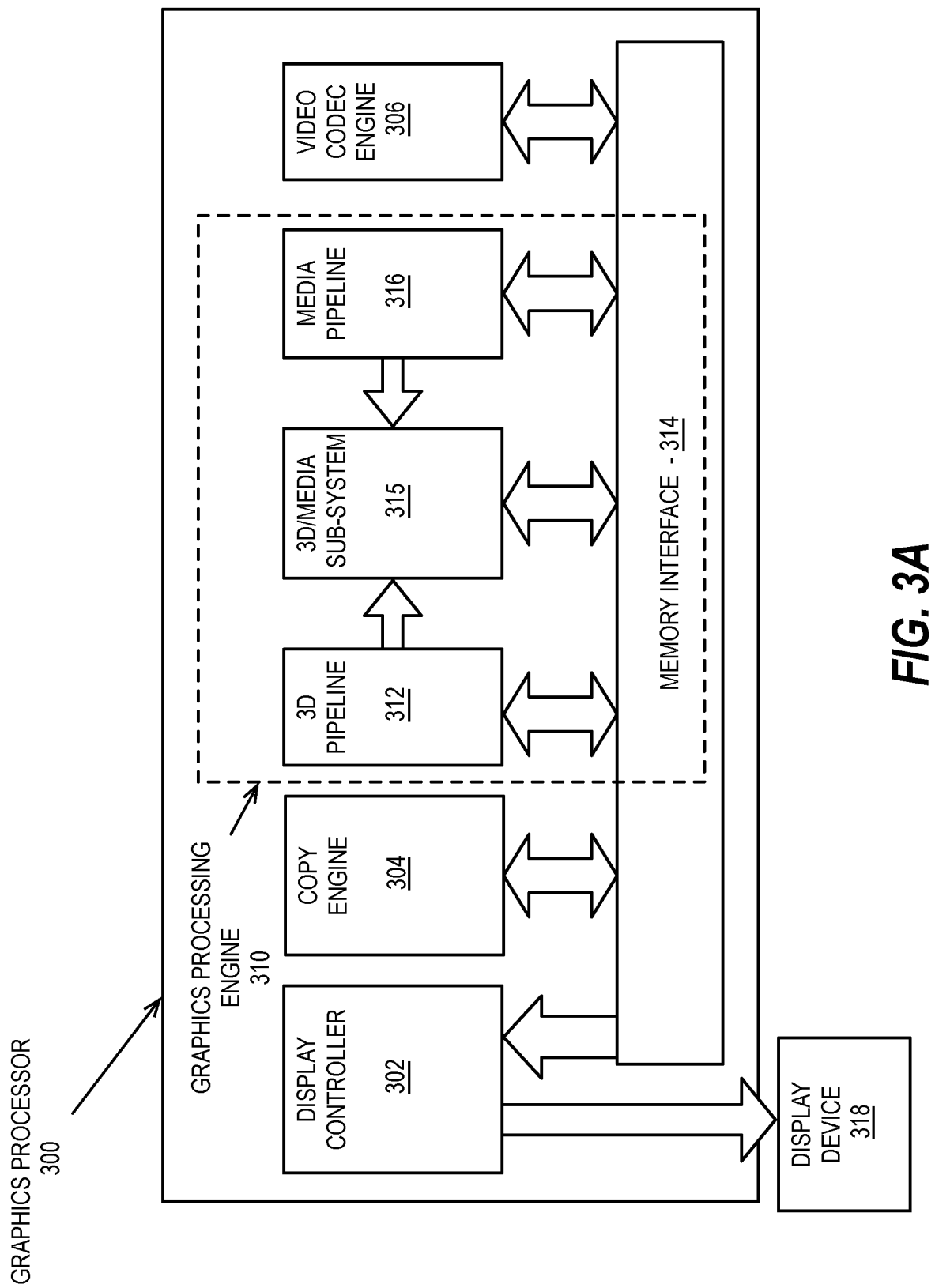
FIG. 3A-3C illustrate block diagrams of additional graphics processor and compute accelerator architectures.
Figure 3B:
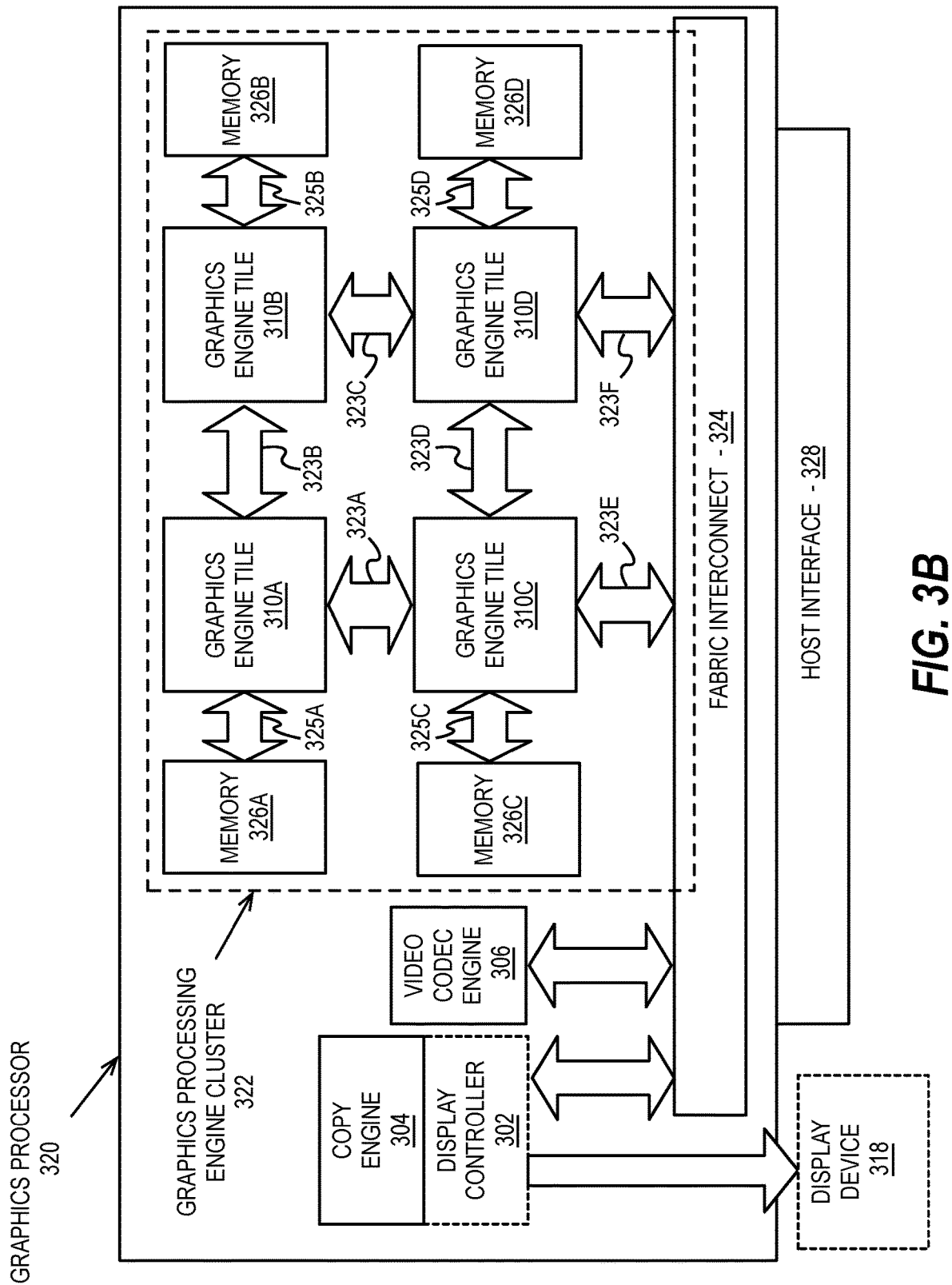
Figure 3C:
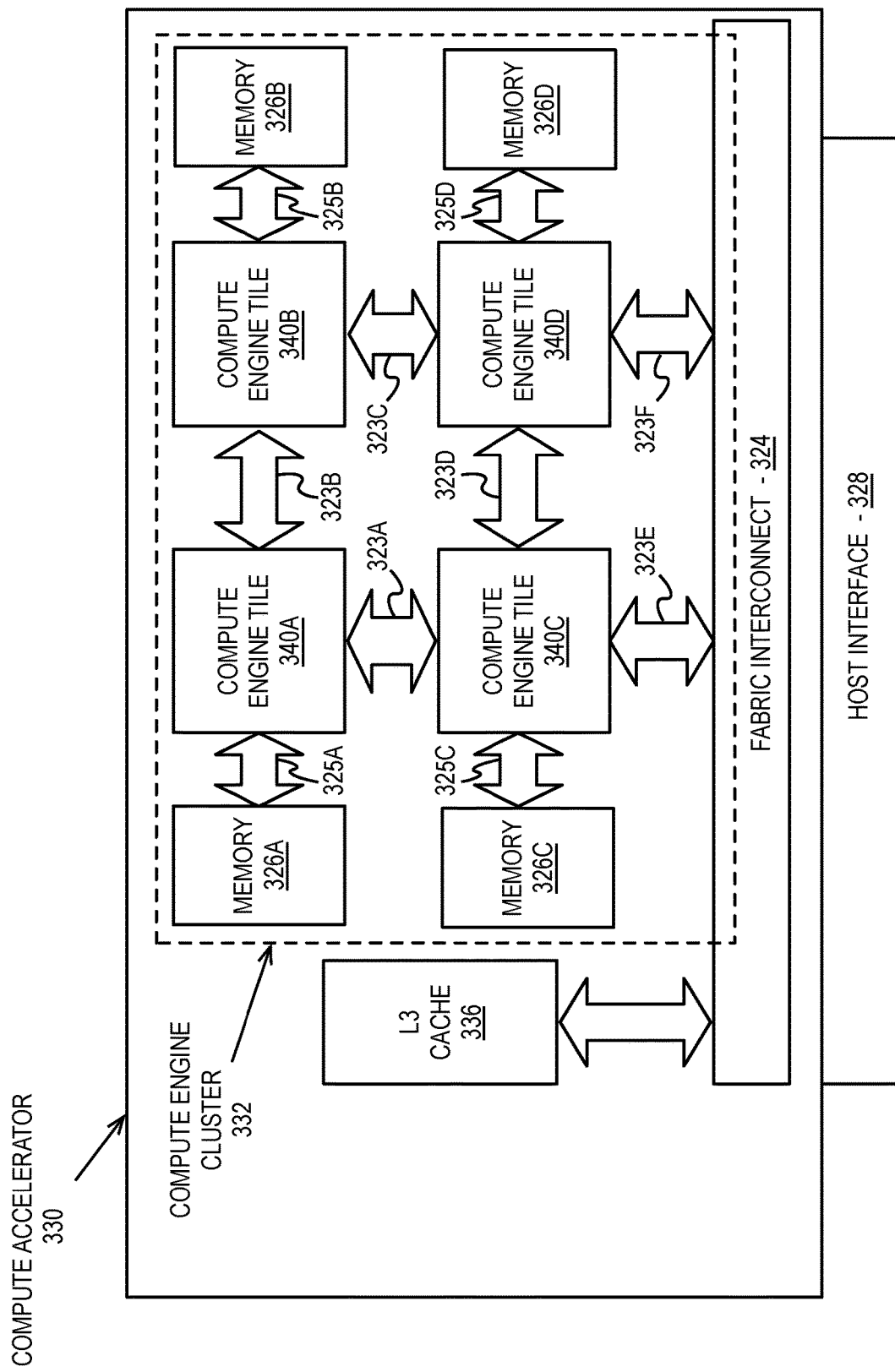

FIGS. 3A-3C illustrate block diagrams of additional graphics processor and compute accelerator architectures provided by embodiments described herein. The elements of FIGS. 3A-3C having the same reference numbers (or names) as the elements of any other figure herein can operate or function in any manner similar to that described elsewhere herein, but are not limited to such.

FIG. 3A is a block diagram of a graphics processor 300, which may be a discrete graphics processing unit, or may be a graphics processor integrated with a plurality of processing cores, or other semiconductor devices such as, but not limited to, memory devices or network interfaces. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 318. Display controller 302 includes hardware for one or more overlay planes for the display and composition of multiple layers of video or user interface elements. The display device 318 can be an internal or external display device. In one embodiment the display device 318 is a head mounted display device, such as a virtual reality (VR) display device or an augmented reality (AR) display device. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, H.265/HEVC, Alliance for Open Media (AOMedia) VP8, VP9, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, GPE 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media sub-system 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

FIG. 3B illustrates a graphics processor 320 having a tiled architecture, according to embodiments described herein. In one embodiment the graphics processor 320 includes a graphics processing engine cluster 322 having multiple instances of the graphics processing engine 310 of FIG. 3A within a graphics engine tile 310A-310D. Each graphics engine tile 310A-310D can be interconnected via a set of tile interconnects 323A-323F. Each graphics engine tile 310A-310D can also be connected to a memory module or memory device 326A-326D via memory interconnects 325A-325D. The memory devices 326A-326D can use any graphics memory technology. For example, the memory devices 326A-326D may be graphics double data rate (GDDR) memory. The memory devices 326A-326D, in one embodiment, are high-bandwidth memory (HBM) modules that can be on-die with their respective graphics engine tile 310A-310D. In one embodiment the memory devices 326A-326D are stacked memory devices that can be stacked on top of their respective graphics engine tile 310A-310D. In one embodiment, each graphics engine tile 310A-310D and associated memory 326A-326D reside on separate chiplets, which are bonded to a base die or base substrate, as described on further detail in FIGS. 11B-11D.

The graphics processor 320 may be configured with a non-uniform memory access (NUMA) system in which memory devices 326A-326D are coupled with associated graphics engine tiles 310A-310D. A given memory device may be accessed by graphics engine tiles other than the tile to which it is directly connected. However, access latency to the memory devices 326A-326D may be lowest when accessing a local tile. In one embodiment, a cache coherent NUMA (ccNUMA) system is enabled that uses the tile interconnects 323A-323F to enable communication between cache controllers within the graphics engine tiles 310A-310D to keep a consistent memory image when more than one cache stores the same memory location.

The graphics processing engine cluster 322 can connect with an on-chip or on-package fabric interconnect 324. The fabric interconnect 324 can enable communication between graphics engine tiles 310A-310D and components such as the video codec 306 and one or more copy engines 304. The copy engines 304 can be used to move data out of, into, and between the memory devices 326A-326D and memory that is external to the graphics processor 320 (e.g., system memory). The fabric interconnect 324 can also be used to interconnect the graphics engine tiles 310A-310D. The graphics processor 320 may optionally include a display controller 302 to enable a connection with an external display device 318. The graphics processor may also be configured as a graphics or compute accelerator. In the accelerator configuration, the display controller 302 and display device 318 may be omitted.

The graphics processor 320 can connect to a host system via a host interface 328. The host interface 328 can enable communication between the graphics processor 320, system memory, and/or other system components. The host interface 328 can be, for example a PCI express bus or another type of host system interface.

FIG. 3C illustrates a compute accelerator 330, according to embodiments described herein. The compute accelerator 330 can include architectural similarities with the graphics processor 320 of FIG. 3B and is optimized for compute acceleration. A compute engine cluster 332 can include a set of compute engine tiles 340A-340D that include execution logic that is optimized for parallel or vector-based general-purpose compute operations. In some embodiments, the compute engine tiles 340A-340D do not include fixed function graphics processing logic, although in one embodiment one or more of the compute engine tiles 340A-340D can include logic to perform media acceleration. The compute engine tiles 340A-340D can connect to memory 326A-326D via memory interconnects 325A-325D. The memory 326A-326D and memory interconnects 325A-325D may be similar technology as in graphics processor 320, or can be different. The graphics compute engine tiles 340A-340D can also be interconnected via a set of tile interconnects 323A-323F and may be connected with and/or interconnected by a fabric interconnect 324. In one embodiment the compute accelerator 330 includes a large T 3 cache 336 that can be configured as a device-wide cache. The compute accelerator 330 can also connect to a host processor and memory via a host interface 328 in a similar manner as the graphics processor 320 of FIG. 3B.

Graphics Processing Engine

Figure 4:
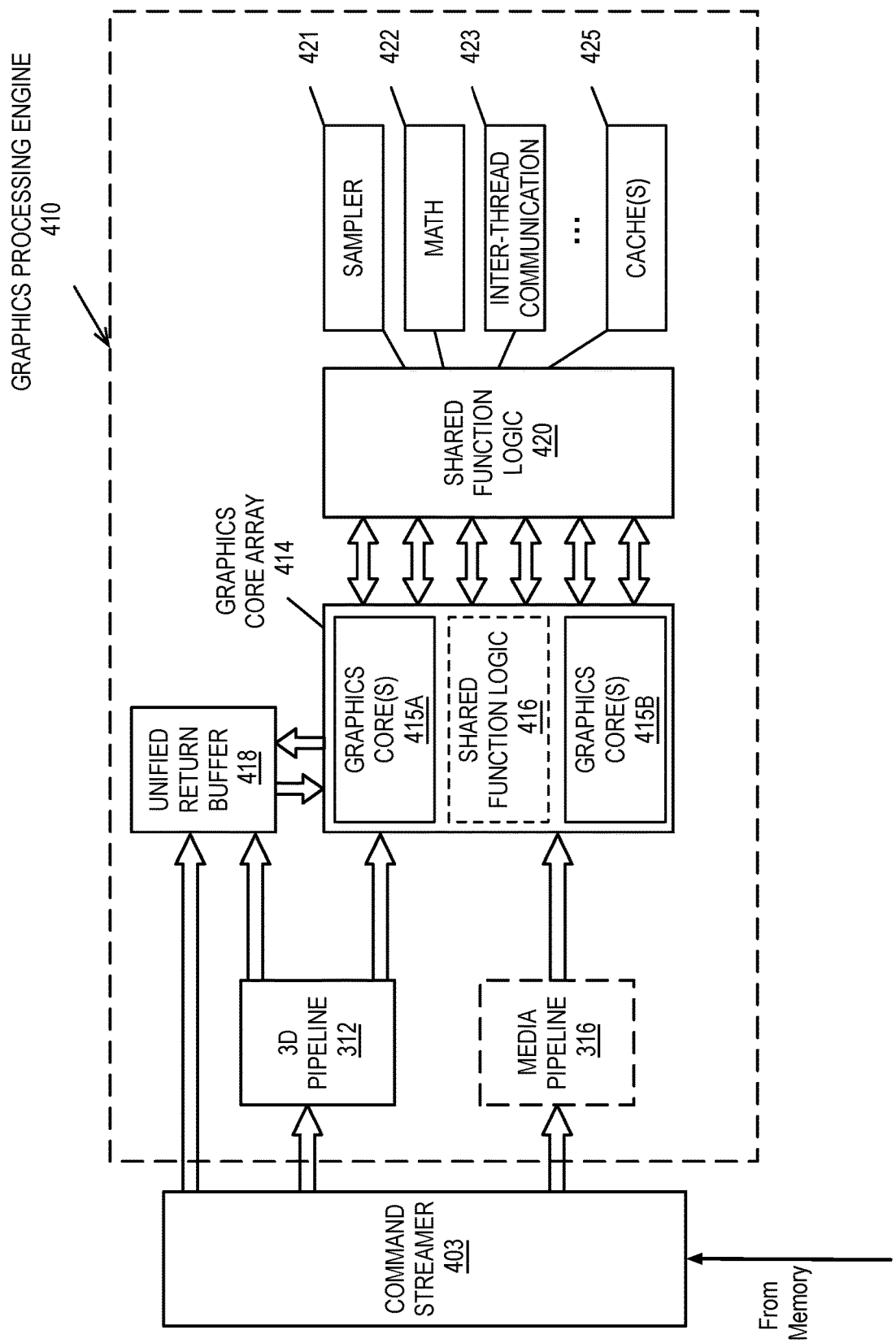
FIG. 4 is a block diagram of a graphics processing engine of a graphics processor.

FIG. 4 is a block diagram of a graphics processing engine 410 of a graphics processor in accordance with some embodiments. In one embodiment, the graphics processing engine (GPE) 410 is a version of the GPE 310 shown in FIG. 3A, and may also represent a graphics engine tile 310A-310D of FIG. 3B. Elements of FIG. 4 having the same reference numbers (or names) as the elements of any other figure herein can operate or function in any manner similar to that described elsewhere herein, but are not limited to such. For example, the 3D pipeline 312 and media pipeline 316 of FIG. 3A are illustrated. The media pipeline 316 is optional in some embodiments of the GPE 410 and may not be explicitly included within the GPE 410. For example and in at least one embodiment, a separate media and/or image processor is coupled to the GPE 410.

In some embodiments, GPE 410 couples with or includes a command streamer 403, which provides a command stream to the 3D pipeline 312 and/or media pipelines 316. In some embodiments, command streamer 403 is coupled to memory, which can be system memory, or one or more of internal cache memory and shared cache memory. In some embodiments, command streamer 403 receives commands from the memory and sends the commands to 3D pipeline 312 and/or media pipeline 316. The commands are directives fetched from a ring buffer, which stores commands for the 3D pipeline 312 and media pipeline 316. In one embodiment, the ring buffer can additionally include batch command buffers storing batches of multiple commands. The commands for the 3D pipeline 312 can also include references to data stored in memory, such as but not limited to vertex and geometry data for the 3D pipeline 312 and/or image data and memory objects for the media pipeline 316. The 3D pipeline 312 and media pipeline 316 process the commands and data by performing operations via logic within the respective pipelines or by dispatching one or more execution threads to a graphics core array 414. In one embodiment the graphics core array 414 include one or more blocks of graphics cores (e.g., graphics core(s) 415A, graphics core(s) 415B), each block including one or more graphics cores. Each graphics core includes a set of graphics execution resources that includes general-purpose and graphics specific execution logic to perform graphics and compute operations, as well as fixed function texture processing and/or machine learning and artificial intelligence acceleration logic.

In various embodiments the 3D pipeline 312 can include fixed function and programmable logic to process one or more shader programs, such as vertex shaders, geometry shaders, pixel shaders, fragment shaders, compute shaders, or other shader programs, by processing the instructions and dispatching execution threads to the graphics core array 414. The graphics core array 414 provides a unified block of execution resources for use in processing these shader programs. Multi-purpose execution logic (e.g., execution units) within the graphics core(s) 415A-414B of the graphic core array 414 includes support for various 3D API shader languages and can execute multiple simultaneous execution threads associated with multiple shaders.

In some embodiments, the graphics core array 414 includes execution logic to perform media functions, such as video and/or image processing. In one embodiment, the execution units include general-purpose logic that is programmable to perform parallel general-purpose computational operations, in addition to graphics processing operations. The general-purpose logic can perform processing operations in parallel or in conjunction with general-purpose logic within the processor core(s) 107 of FIG. 1 or core 202A-202N as in FIG. 2A.

Output data generated by threads executing on the graphics core array 414 can output data to memory in a unified return buffer (URB) 418. The URB 418 can store data for multiple threads. In some embodiments the URB 418 may be used to send data between different threads executing on the graphics core array 414. In some embodiments the URB 418 may additionally be used for synchronization between threads on the graphics core array and fixed function logic within the shared function logic 420.

In some embodiments, graphics core array 414 is scalable, such that the array includes a variable number of graphics cores, each having a variable number of execution units based on the target power and performance level of GPE 410. In one embodiment the execution resources are dynamically scalable, such that execution resources may be enabled or disabled.

The graphics core array 414 couples with shared function logic 420 that includes multiple resources that are shared between the graphics cores in the graphics core array. The shared functions within the shared function logic 420 are hardware logic units that provide specialized supplemental functionality to the graphics core array 414. In various embodiments, shared function logic 420 includes but is not limited to sampler 421, math 422, and inter-thread communication (ITC) 423 logic. Additionally, some embodiments implement one or more cache(s) 425 within the shared function logic 420.

A shared function is implemented at least in a case where the demand for a given specialized function is insufficient for inclusion within the graphics core array 414. Instead a single instantiation of that specialized function is implemented as a stand-alone entity in the shared function logic 420 and shared among the execution resources within the graphics core array 414. The precise set of functions that are shared between the graphics core array 414 and included within the graphics core array 414 varies across embodiments. In some embodiments, specific shared functions within the shared function logic 420 that are used extensively by the graphics core array 414 may be included within shared function logic 416 within the graphics core array 414. In various embodiments, the shared function logic 416 within the graphics core array 414 can include some or all logic within the shared function logic 420. In one embodiment, all logic elements within the shared function logic 420 may be duplicated within the shared function logic 416 of the graphics core array 414. In one embodiment the shared function logic 420 is excluded in favor of the shared function logic 416 within the graphics core array 414.

Execution Units

Figure 5A:
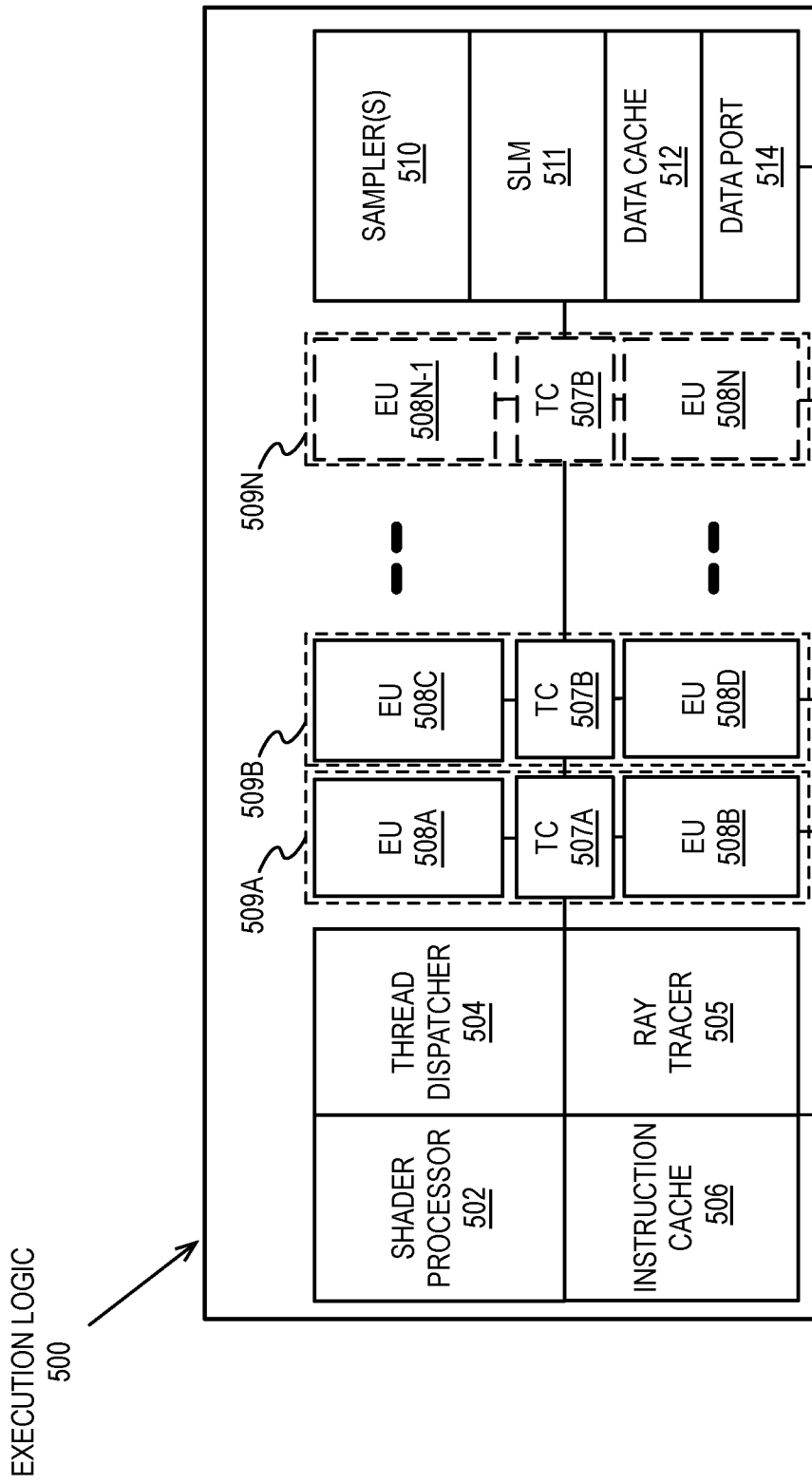
FIG. 5A-5B illustrate thread execution logic including an array of processing elements employed in a graphics processor core.
Figure 5B:
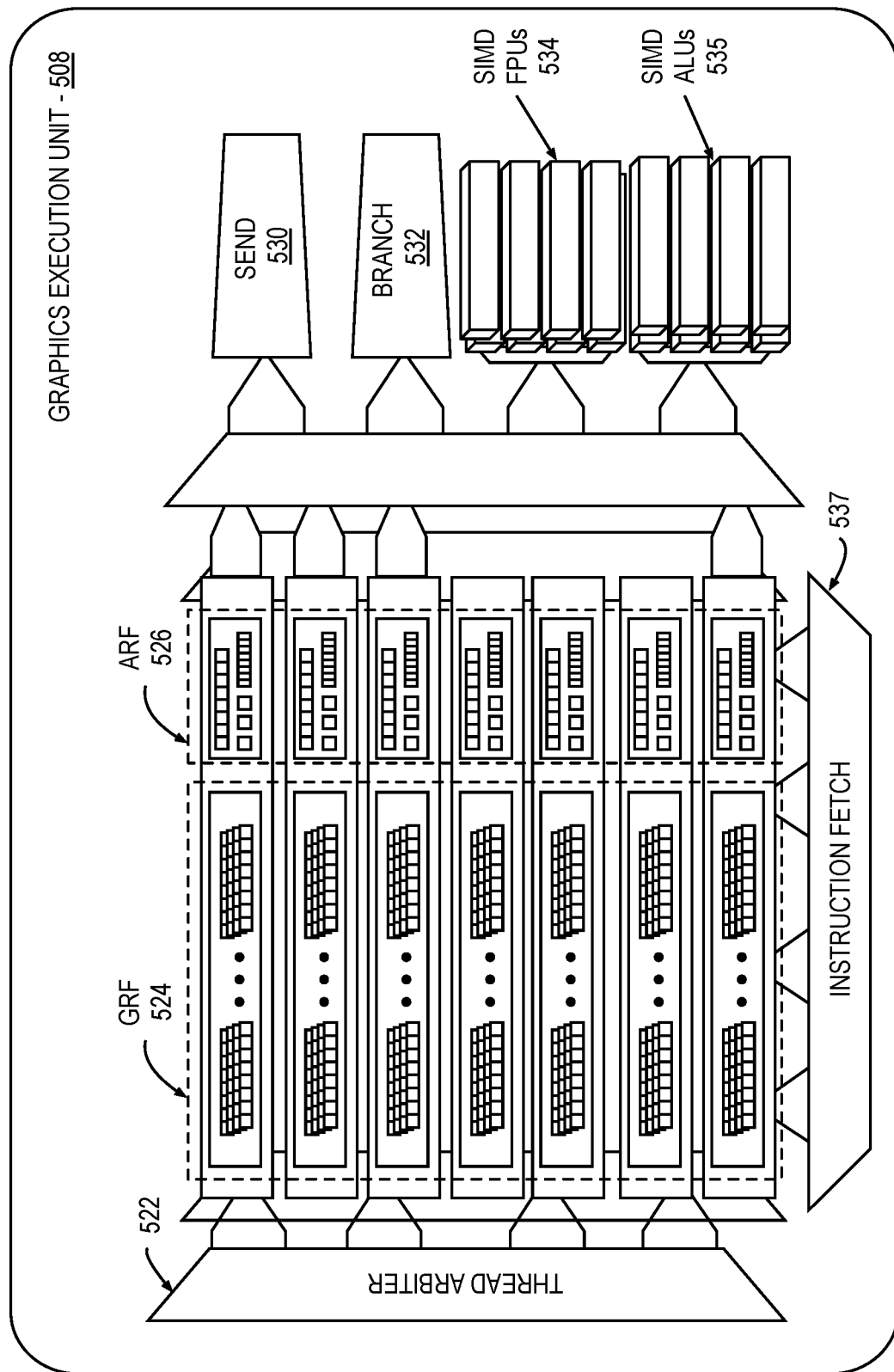

FIGS. 5A-5B illustrate thread execution logic 500 including an array of processing elements employed in a graphics processor core according to embodiments described herein. Elements of FIGS. 5A-5B having the same reference numbers (or names) as the elements of any other figure herein can operate or function in any manner similar to that described elsewhere herein, but are not limited to such. FIG. 5A-5B illustrates an overview of thread execution logic 500, which may be representative of hardware logic illustrated with each sub-core 221A-221F of FIG. 2B. FIG. 5A is representative of an execution unit within a general-purpose graphics processor, while FIG. 5B is representative of an execution unit that may be used within a compute accelerator.

As illustrated in FIG. 5A, in some embodiments thread execution logic 500 includes a shader processor 502, a thread dispatcher 504, instruction cache 506, a scalable execution unit array including a plurality of execution units 508A-508N, a sampler 510, shared local memory 511, a data cache 512, and a data port 514. In one embodiment the scalable execution unit array can dynamically scale by enabling or disabling one or more execution units (e.g., any of execution units 508A, 508B, 508C, 508D, through 508N-1 and 508N) based on the computational requirements of a workload. In one embodiment the included components are interconnected via an interconnect fabric that links to each of the components. In some embodiments, thread execution logic 500 includes one or more connections to memory, such as system memory or cache memory, through one or more of instruction cache 506, data port 514, sampler 510, and execution units 508A-508N. In some embodiments, each execution unit (e.g. 508A) is a stand-alone programmable general-purpose computational unit that is capable of executing multiple simultaneous hardware threads while processing multiple data elements in parallel for each thread. In various embodiments, the array of execution units 508A-508N is scalable to include any number individual execution units.

In some embodiments, the execution units 508A-508N are primarily used to execute shader programs. A shader processor 502 can process the various shader programs and dispatch execution threads associated with the shader programs via a thread dispatcher 504. In one embodiment the thread dispatcher includes logic to arbitrate thread initiation requests from the graphics and media pipelines and instantiate the requested threads on one or more execution unit in the execution units 508A-508N. For example, a geometry pipeline can dispatch vertex, tessellation, or geometry shaders to the thread execution logic for processing. In some embodiments, thread dispatcher 504 can also process runtime thread spawning requests from the executing shader programs.

In some embodiments, the execution units 508A-508N support an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders). Each of the execution units 508A-508N is capable of multi-issue single instruction multiple data (SIMD) execution and multi-threaded operation enables an efficient execution environment in the face of higher latency memory accesses. Each hardware thread within each execution unit has a dedicated high-bandwidth register file and associated independent thread-state. Execution is multi-issue per clock to pipelines capable of integer, single and double precision floating point operations, SIMD branch capability, logical operations, transcendental operations, and other miscellaneous operations. While waiting for data from memory or one of the shared functions, dependency logic within the execution units 508A-508N causes a waiting thread to sleep until the requested data has been returned. While the waiting thread is sleeping, hardware resources may be devoted to processing other threads. For example, during a delay associated with a vertex shader operation, an execution unit can perform operations for a pixel shader, fragment shader, or another type of shader program, including a different vertex shader. Various embodiments can apply to use execution by use of Single Instruction Multiple Thread (SIMT) as an alternate to use of SIMD or in addition to use of SIMD. Reference to a SIMD core or operation can apply also to SIMT or apply to SIMD in combination with SIMT.

Each execution unit in execution units 508A-508N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 508A-508N support integer and floating-point data types.

The execution unit instruction set includes SIMD instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 54-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

In one embodiment one or more execution units can be combined into a fused execution unit 509A-509N having thread control logic (507A-507N) that is common to the fused EUs. Multiple EUs can be fused into an EU group. Each EU in the fused EU group can be configured to execute a separate SIMD hardware thread. The number of EUs in a fused EU group can vary according to embodiments. Additionally, various SIMD widths can be performed per-EU, including but not limited to SIMD8, SIMD16, and SIMD32. Each fused graphics execution unit 509A-509N includes at least two execution units. For example, fused execution unit 509A includes a first EU 508A, second EU 508B, and thread control logic 507A that is common to the first EU 508A and the second EU 508B. The thread control logic 507A controls threads executed on the fused graphics execution unit 509A, allowing each EU within the fused execution units 509A-509N to execute using a common instruction pointer register.

One or more internal instruction caches (e.g., 506) are included in the thread execution logic 500 to cache thread instructions for the execution units. In some embodiments, one or more data caches (e.g., 512) are included to cache thread data during thread execution. Threads executing on the execution logic 500 can also store explicitly managed data in the shared local memory 511. In some embodiments, a sampler 510 is included to provide texture sampling for 3D operations and media sampling for media operations. In some embodiments, sampler 510 includes specialized texture or media sampling functionality to process texture or media data during the sampling process before providing the sampled data to an execution unit.

During execution, the graphics and media pipelines send thread initiation requests to thread execution logic 500 via thread spawning and dispatch logic. Once a group of geometric objects has been processed and rasterized into pixel data, pixel processor logic (e.g., pixel shader logic, fragment shader logic, etc.) within the shader processor 502 is invoked to further compute output information and cause results to be written to output surfaces (e.g., color buffers, depth buffers, stencil buffers, etc.). In some embodiments, a pixel shader or fragment shader calculates the values of the various vertex attributes that are to be interpolated across the rasterized object. In some embodiments, pixel processor logic within the shader processor 502 then executes an application programming interface (API)-supplied pixel or fragment shader program. To execute the shader program, the shader processor 502 dispatches threads to an execution unit (e.g., 508A) via thread dispatcher 504. In some embodiments, shader processor 502 uses texture sampling logic in the sampler 510 to access texture data in texture maps stored in memory. Arithmetic operations on the texture data and the input geometry data compute pixel color data for each geometric fragment, or discards one or more pixels from further processing.

In some embodiments, the data port 514 provides a memory access mechanism for the thread execution logic 500 to output processed data to memory for further processing on a graphics processor output pipeline. In some embodiments, the data port 514 includes or couples to one or more cache memories (e.g., data cache 512) to cache data for memory access via the data port.

In one embodiment, the execution logic 500 can also include a ray tracer 505 that can provide ray tracing acceleration functionality. The ray tracer 505 can support a ray tracing instruction set that includes instructions/functions for ray generation. The ray tracing instruction set can be similar to or different from the ray-tracing instruction set supported by the ray tracing cores 245 in FIG. 2C.

FIG. 5B illustrates example internal details of an execution unit 508, according to embodiments. A graphics execution unit 508 can include an instruction fetch unit 537, a general register file array (GRF) 524, an architectural register file array (ARF) 526, a thread arbiter 522, a send unit 530, a branch unit 532, a set of SIMD floating point units (FPUs) 534, and in one embodiment a set of dedicated integer SIMD ALUs 535. The GRF 524 and ARF 526 includes the set of general register files and architecture register files associated with each simultaneous hardware thread that may be active in the graphics execution unit 508. In one embodiment, per thread architectural state is maintained in the ARF 526, while data used during thread execution is stored in the GRF 524. The execution state of each thread, including the instruction pointers for each thread, can be held in thread-specific registers in the ARF 526.

In one embodiment the graphics execution unit 508 has an architecture that is a combination of Simultaneous Multi-Threading (SMT) and fine-grained Interleaved Multi-Threading (IMT). The architecture has a modular configuration that can be fine-tuned at design time based on a target number of simultaneous threads and number of registers per execution unit, where execution unit resources are divided across logic used to execute multiple simultaneous threads. The number of logical threads that may be executed by the graphics execution unit 508 is not limited to the number of hardware threads, and multiple logical threads can be assigned to each hardware thread.

In one embodiment, the graphics execution unit 508 can co-issue multiple instructions, which may each be different instructions. The thread arbiter 522 of the graphics execution unit thread 508 can dispatch the instructions to one of the send unit 530, branch unit 532, or SIMD FPU(s) 534 for execution. Each execution thread can access 128 general-purpose registers within the GRF 524, where each register can store 32 bytes, accessible as a SIMD 8-element vector of 32-bit data elements. In one embodiment, each execution unit thread has access to 4 Kbytes within the GRF 524, although embodiments are not so limited, and greater or fewer register resources may be provided in other embodiments. In one embodiment the graphics execution unit 508 is partitioned into seven hardware threads that can independently perform computational operations, although the number of threads per execution unit can also vary according to embodiments. For example, in one embodiment up to 16 hardware threads are supported. In an embodiment in which seven threads may access 4 Kbytes, the GRF 524 can store a total of 28 Kbytes. Where 16 threads may access 4 Kbytes, the GRF 524 can store a total of 64 Kbytes. Flexible addressing modes can permit registers to be addressed together to build effectively wider registers or to represent strided rectangular block data structures.

In one embodiment, memory operations, sampler operations, and other longer-latency system communications are dispatched via "send" instructions that are executed by the message passing send unit 530. In one embodiment, branch instructions are dispatched to a dedicated branch unit 532 to facilitate SIMD divergence and eventual convergence.

In one embodiment the graphics execution unit 508 includes one or more SIMD floating point units (FPU(s)) 534 to perform floating-point operations. In one embodiment, the FPU(s) 534 also support integer computation. In one embodiment the FPU(s) 534 can SIMD execute up to M number of 32-bit floating-point (or integer) operations, or SIMD execute up to 2M 16-bit integer or 16-bit floating-point operations. In one embodiment, at least one of the FPU(s) provides extended math capability to support high-throughput transcendental math functions and double precision 54-bit floating-point. In some embodiments, a set of 8-bit integer SIMD ALUs 535 are also present, and may be specifically optimized to perform operations associated with machine learning computations.

In one embodiment, arrays of multiple instances of the graphics execution unit 508 can be instantiated in a graphics sub-core grouping (e.g., a sub-slice). For scalability, product architects can choose the exact number of execution units per sub-core grouping. In one embodiment the execution unit 508 can execute instructions across a plurality of execution channels. In a further embodiment, each thread executed on the graphics execution unit 508 is executed on a different channel.

Figure 6:
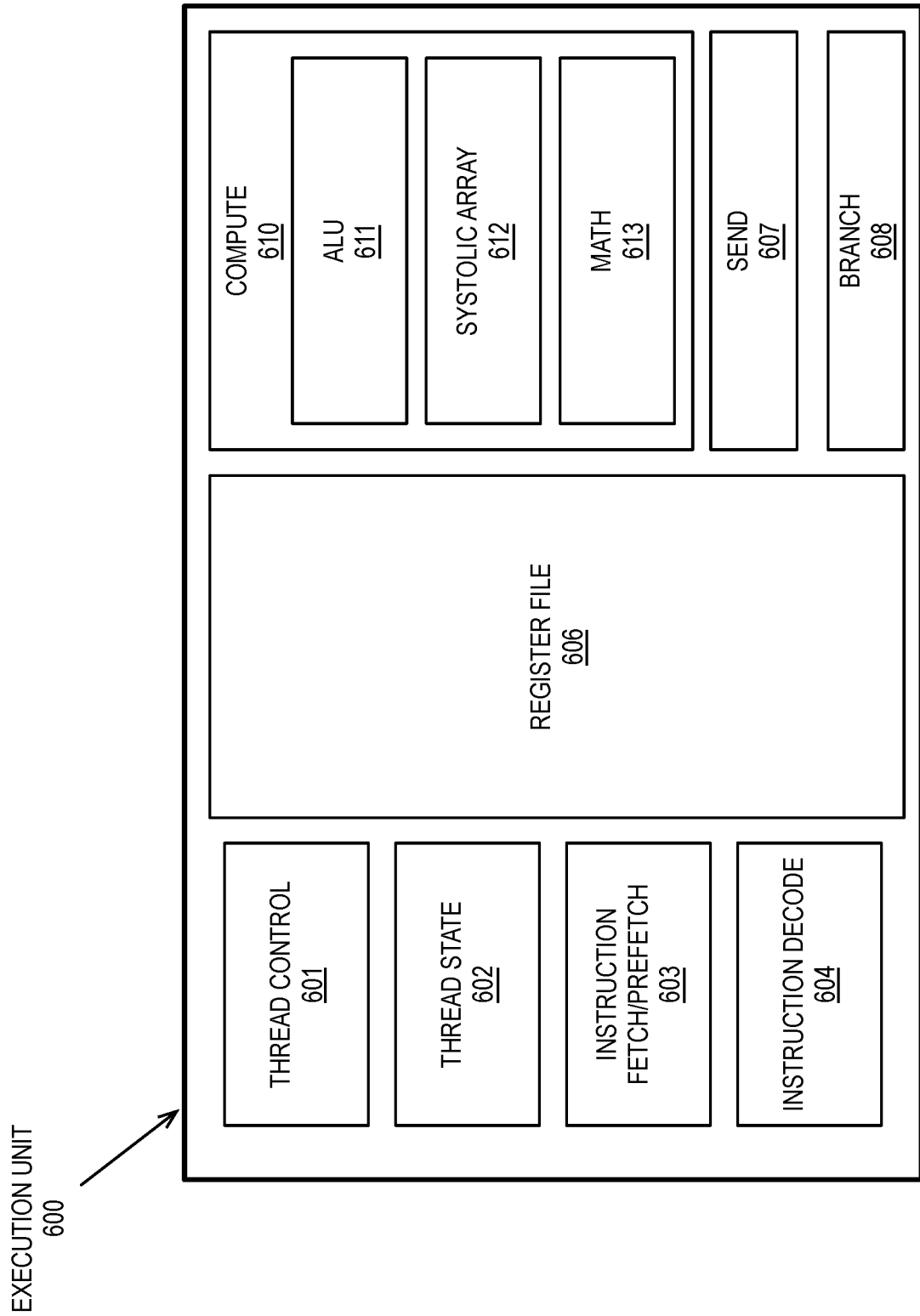
FIG. 6 illustrates an additional execution unit.

FIG. 6 illustrates an additional execution unit 600, according to an embodiment. The execution unit 600 may be a compute-optimized execution unit for use in, for example, a compute engine tile 340A-340D as in FIG. 3C, but is not limited as such. Variants of the execution unit 600 may also be used in a graphics engine tile 310A-310D as in FIG. 3B. In one embodiment, the execution unit 600 includes a thread control unit 601, a thread state unit 602, an instruction fetch/prefetch unit 603, and an instruction decode unit 604. The execution unit 600 additionally includes a register file 606 that stores registers that can be assigned to hardware threads within the execution unit. The execution unit 600 additionally includes a send unit 607 and a branch unit 608. In one embodiment, the send unit 607 and branch unit 608 can operate similarly as the send unit 530 and a branch unit 532 of the graphics execution unit 508 of FIG. 5B.

The execution unit 600 also includes a compute unit 610 that includes multiple different types of functional units. In one embodiment the compute unit 610 includes an ALU unit 611 that includes an array of arithmetic logic units. The ALU unit 611 can be configured to perform 64-bit, 32-bit, and 16-bit integer and floating point operations. Integer and floating point operations may be performed simultaneously. The compute unit 610 can also include a systolic array 612, and a math unit 613. The systolic array 612 includes a W wide and D deep network of data processing units that can be used to perform vector or other data-parallel operations in a systolic manner. In one embodiment the systolic array 612 can be configured to perform matrix operations, such as matrix dot product operations. In one embodiment the systolic array 612 support 16-bit floating point operations, as well as 8-bit and 4-bit integer operations. In one embodiment the systolic array 612 can be configured to accelerate machine learning operations. In such embodiments, the systolic array 612 can be configured with support for the bfloat 16-bit floating point format. In one embodiment, a math unit 613 can be included to perform a specific subset of mathematical operations in an efficient and lower-power manner than then ALU unit 611. The math unit 613 can include a variant of math logic that may be found in shared function logic of a graphics processing engine provided by other embodiments (e.g., math logic 422 of the shared function logic 420 of FIG. 4). In one embodiment the math unit 613 can be configured to perform 32-bit and 64-bit floating point operations.

The thread control unit 601 includes logic to control the execution of threads within the execution unit. The thread control unit 601 can include thread arbitration logic to start, stop, and preempt execution of threads within the execution unit 600. The thread state unit 602 can be used to store thread state for threads assigned to execute on the execution unit 600. Storing the thread state within the execution unit 600 enables the rapid pre-emption of threads when those threads become blocked or idle. The instruction fetch/prefetch unit 603 can fetch instructions from an instruction cache of higher level execution logic (e.g., instruction cache 506 as in FIG. 5A). The instruction fetch/prefetch unit 603 can also issue prefetch requests for instructions to be loaded into the instruction cache based on an analysis of currently executing threads. The instruction decode unit 604 can be used to decode instructions to be executed by the compute units. In one embodiment, the instruction decode unit 604 can be used as a secondary decoder to decode complex instructions into constituent micro-operations.

The execution unit 600 additionally includes a register file 606 that can be used by hardware threads executing on the execution unit 600. Registers in the register file 606 can be divided across the logic used to execute multiple simultaneous threads within the compute unit 610 of the execution unit 600. The number of logical threads that may be executed by the graphics execution unit 600 is not limited to the number of hardware threads, and multiple logical threads can be assigned to each hardware thread. The size of the register file 606 can vary across embodiments based on the number of supported hardware threads. In one embodiment, register renaming may be used to dynamically allocate registers to hardware threads.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit instruction format 710. A 64-bit compacted instruction format 730 is available for some instructions based on the selected instruction, instruction options, and number of operands. The native 128-bit instruction format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit instruction format 710. Other sizes and formats of instruction can be used.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For instructions in the 128-bit instruction format 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 720, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode field 726 specifying, for example, whether direct register addressing mode or indirect register addressing mode is used. When direct register addressing mode is used, the register address of one or more operands is directly provided by bits in the instruction.

In some embodiments, the 128-bit instruction format 710 includes an access/address mode field 726, which specifies an address mode and/or an access mode for the instruction. In one embodiment the access mode is used to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction may use byte-aligned addressing for source and destination operands and when in a second mode, the instruction may use 16-byte-aligned addressing for all source and destination operands.

In one embodiment, the address mode portion of the access/address mode field 726 determines whether the instruction is to use direct or indirect addressing. When direct register addressing mode is used bits in the instruction directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands. The illustrated opcode decode 740, in one embodiment, can be used to determine which portion of an execution unit will be used to execute a decoded instruction. For example, some instructions may be designated as systolic instructions that will be performed by a systolic array. Other instructions, such as ray-tracing instructions (not shown) can be routed to a ray-tracing core or ray-tracing logic within a slice or partition of execution logic.

Graphics Pipeline

Figure 8:
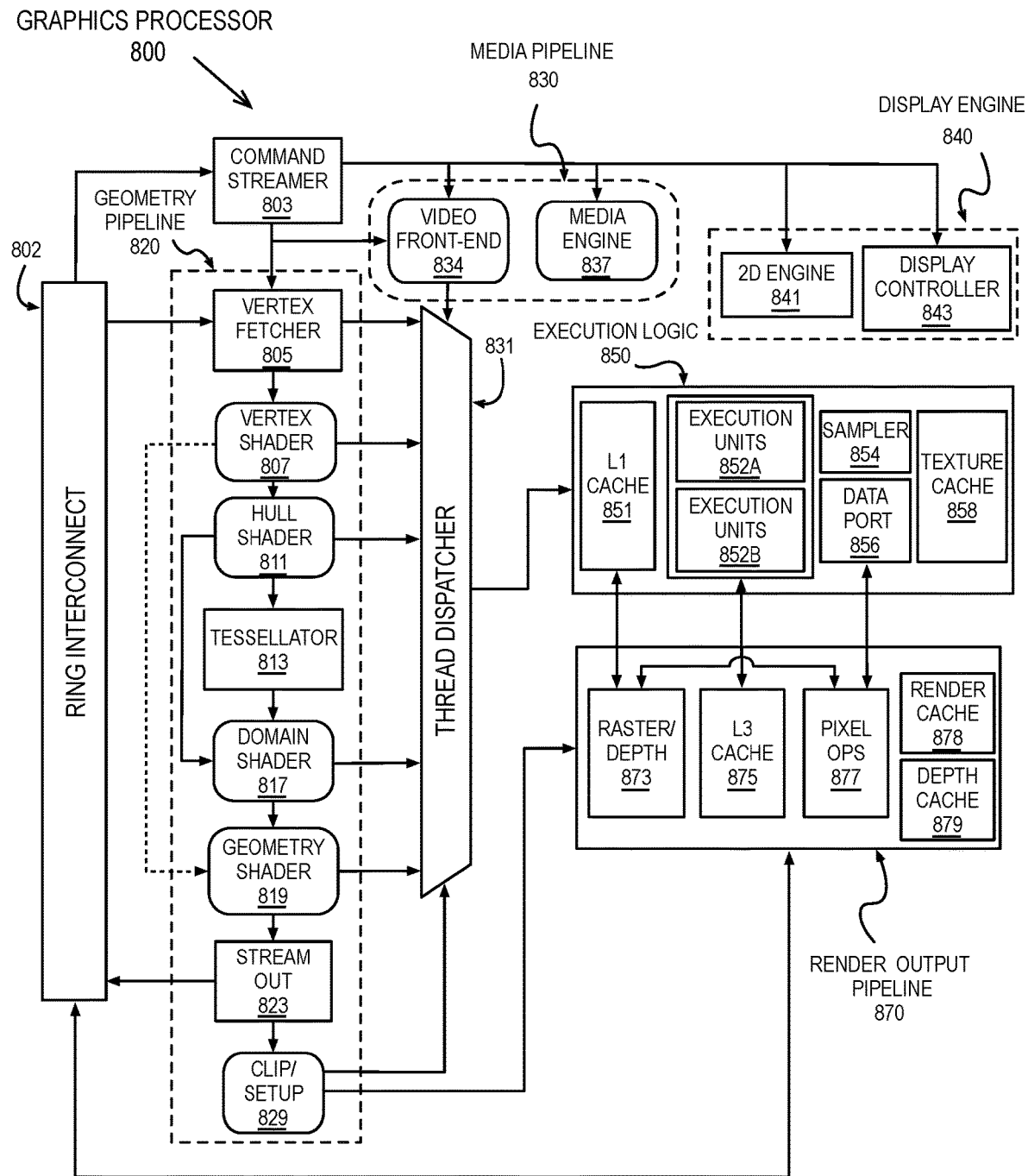
FIG. 8 is a block diagram of an additional graphics processor architecture.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a geometry pipeline 820, a media pipeline 830, a display engine 840, thread execution logic 850, and a render output pipeline 870. In some embodiments, graphics processor 800 is a graphics processor within a multi-core processing system that includes one or more general-purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of the geometry pipeline 820 or the media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A-852B via a thread dispatcher 831.

In some embodiments, execution units 852A-852B are an array of vector processors having an instruction set for performing graphics and media operations. In some embodiments, execution units 852A-852B have an attached L1 cache 851 that is specific for each array or shared between the arrays. The cache can be configured as a data cache, an instruction cache, or a single cache that is partitioned to contain data and instructions in different partitions.

In some embodiments, geometry pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to geometry pipeline 820. In some embodiments, if tessellation is not used, tessellation components (e.g., hull shader 811, tessellator 813, and domain shader 817) can be bypassed. The tessellation components can operate based on data received from the vertex shader 807.

In some embodiments, complete geometric objects can be processed by a geometry shader 819 via one or more threads dispatched to execution units 852A-852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into per pixel representations. In some embodiments, pixel shader logic is included in thread execution logic 850. In some embodiments, an application can bypass the rasterizer and depth test component 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A-852B and associated logic units (e.g., L1 cache 851, sampler 854, texture cache 858, etc.) interconnect via a data port 856 to perform memory access and communicate with render output pipeline components of the processor. In some embodiments, sampler 854, caches 851, 858 and execution units 852A-852B each have separate memory access paths. In one embodiment the texture cache 858 can also be configured as a sampler cache.

In some embodiments, render output pipeline 870 contains a rasterizer and depth test component 873 that converts vertex-based objects into an associated pixel-based representation. In some embodiments, the rasterizer logic includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front-end 834. In some embodiments, video front-end 834 receives pipeline commands from the command streamer 803. In some embodiments, media pipeline 830 includes a separate command streamer. In some embodiments, video front-end 834 processes media commands before sending the command to the media engine 837. In some embodiments, media engine 837 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, the geometry pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL), Open Computing Language (OpenCL), and/or Vulkan graphics and compute API, all from the Khronos Group. In some embodiments, support may also be provided for the Direct3D library from the Microsoft Corporation. In some embodiments, a combination of these libraries may be supported. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

Figure 9:
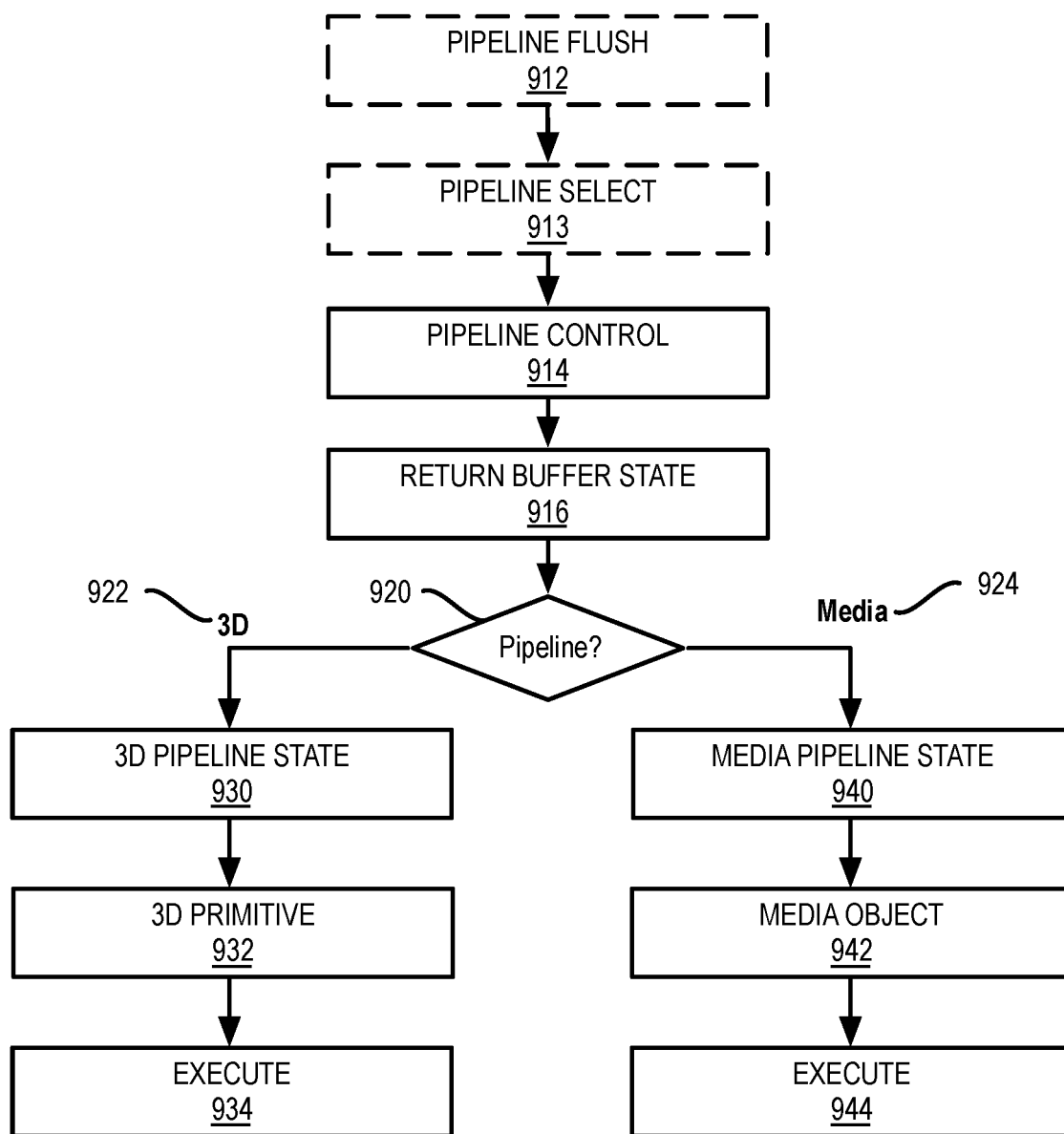
FIG. 9A-9B illustrate a graphics processor command format and command sequence.

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The example graphics processor command format 900 of FIG. 9A includes data fields to identify a client 902, a command operation code (opcode) 904, and data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word. Other command formats can be used.

The flow diagram in FIG. 9B illustrates an example graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence utilizes the graphics processor to explicitly switch between pipelines. In some embodiments, a pipeline select command 913 is utilized once within an execution context before issuing pipeline commands unless the context is to issue commands for both pipelines. In some embodiments, a pipeline flush command 912 is utilized immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations utilize the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930 or the media pipeline 924 beginning at the media pipeline state 940.

The commands to configure the 3D pipeline state 930 include 3D state setting commands for vertex buffer state, vertex element state, constant color state, depth buffer state, and other state variables that are to be configured before 3D primitive commands are processed. The values of these commands are determined at least in part based on the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment, command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general-purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of commands to configure the media pipeline state 940 are dispatched or placed into a command queue before the media object commands 942. In some embodiments, commands for the media pipeline state 940 include data to configure the media pipeline elements that will be used to process the media objects. This includes data to configure the video decode and video encode logic within the media pipeline, such as encode or decode format. In some embodiments, commands for the media pipeline state 940 also support the use of one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states should be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
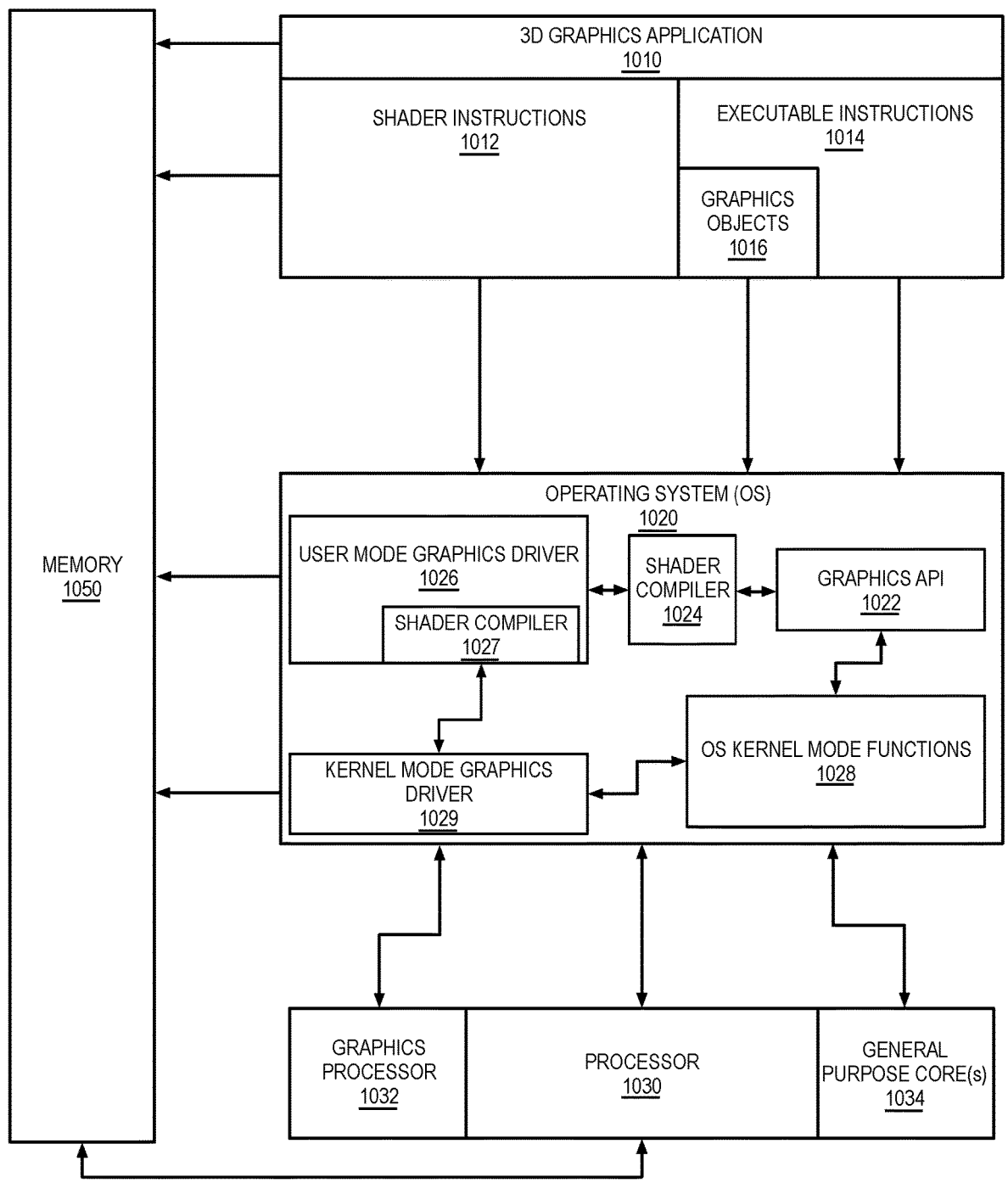
FIG. 10 illustrates example graphics software architecture for a data processing system.

FIG. 10 illustrates an example graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High-Level Shader Language (HLSL) of Direct3D, the OpenGL Shader Language (GLSL), and so forth. The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct3D API, the OpenGL API, or the Vulkan API. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010. In some embodiments, the shader instructions 1012 are provided in an intermediate form, such as a version of the Standard Portable Intermediate Representation (SPIR) used by the Vulkan API.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium (also referred to as computer-readable medium or a non-transitory computer-readable medium herein) which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11A:
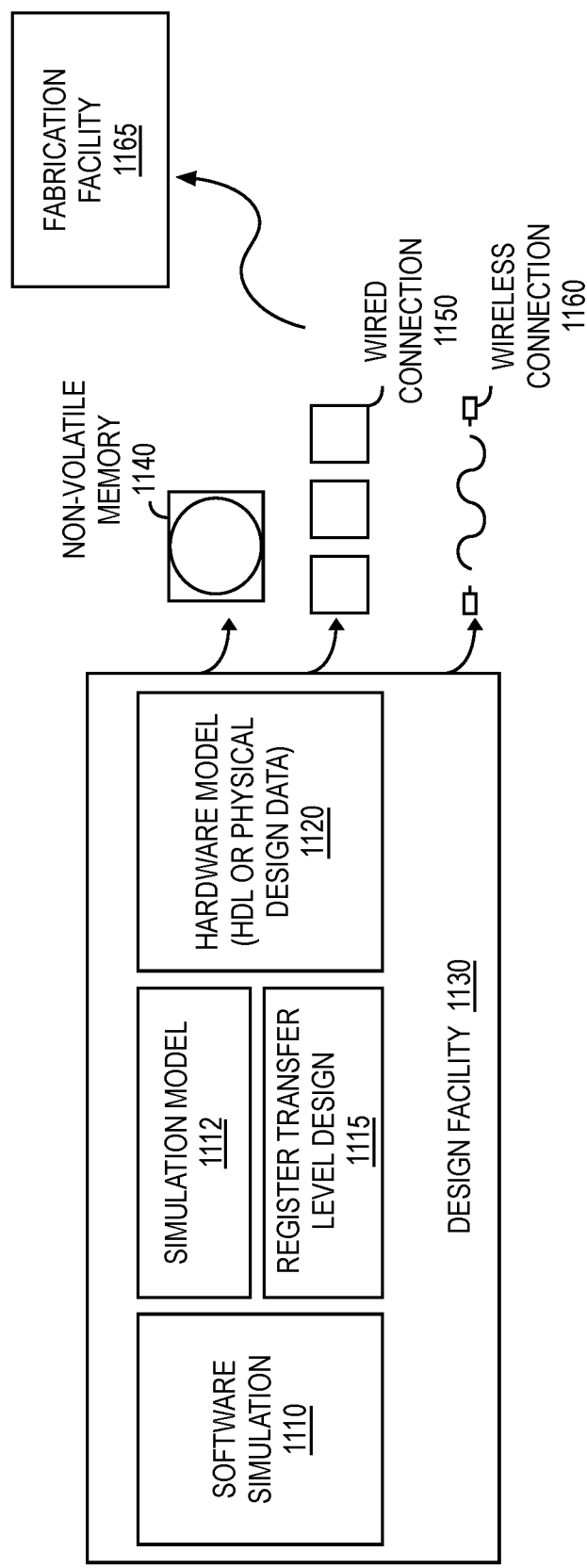
FIG. 11A is a block diagram illustrating an IP core development system.

FIG. 11A is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high-level programming language (e.g., C/C++). The software simulation 1110 can be used to design, test, and verify the behavior of the IP core using a simulation model 1112. The simulation model 1112 may include functional, behavioral, and/or timing simulations. A register transfer level (RTL) design 1115 can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a 3rd party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 11B:
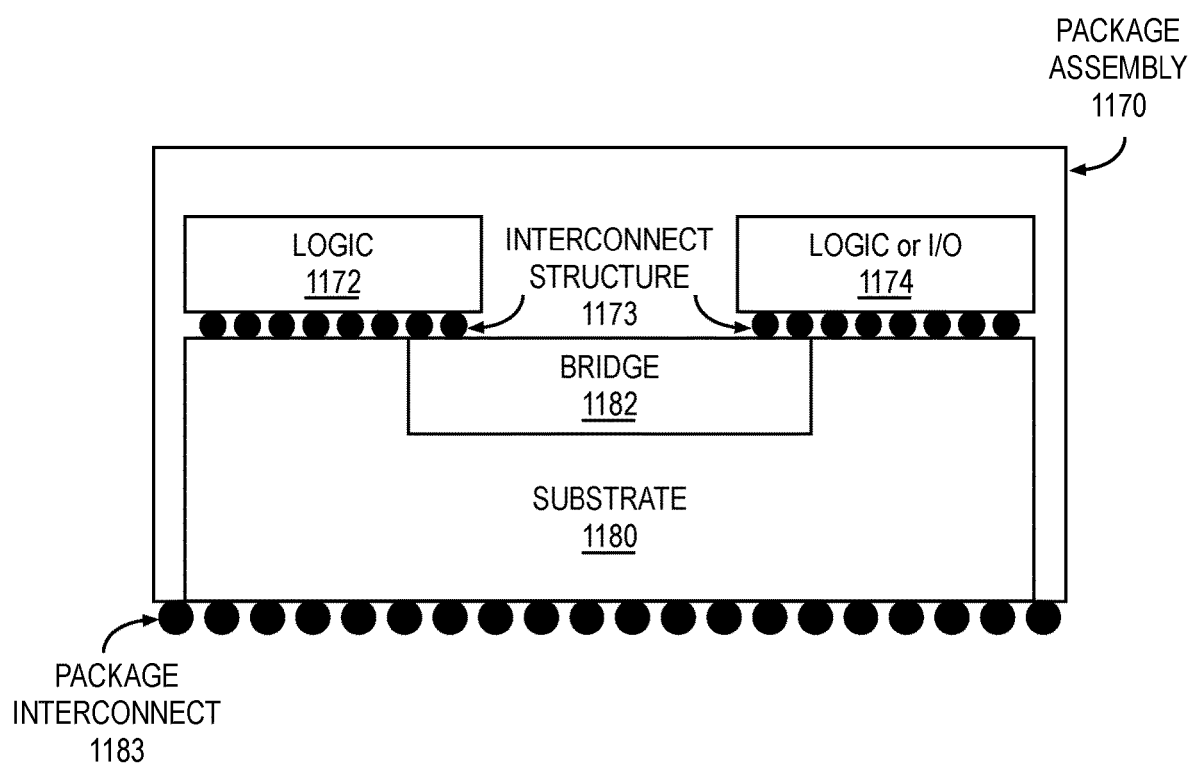
FIG. 11B illustrates a cross-section side view of an integrated circuit package assembly.

FIG. 11B illustrates a cross-section side view of an integrated circuit package assembly 1170, according to some embodiments described herein. The integrated circuit package assembly 1170 illustrates an implementation of one or more processor or accelerator devices as described herein. The package assembly 1170 includes multiple units of hardware logic 1172, 1174 connected to a substrate 1180. The logic 1172, 1174 may be implemented at least partly in configurable logic or fixed-functionality logic hardware, and can include one or more portions of any of the processor core(s), graphics processor(s), or other accelerator devices described herein. Each unit of logic 1172, 1174 can be implemented within a semiconductor die and coupled with the substrate 1180 via an interconnect structure 1173. The interconnect structure 1173 may be configured to route electrical signals between the logic 1172, 1174 and the substrate 1180, and can include interconnects such as, but not limited to bumps or pillars. In some embodiments, the interconnect structure 1173 may be configured to route electrical signals such as, for example, input/output (I/O) signals and/or power or ground signals associated with the operation of the logic 1172, 1174. In some embodiments, the substrate 1180 is an epoxy-based laminate substrate. The substrate 1180 may include other suitable types of substrates in other embodiments. The package assembly 1170 can be connected to other electrical devices via a package interconnect 1183. The package interconnect 1183 may be coupled to a surface of the substrate 1180 to route electrical signals to other electrical devices, such as a motherboard, other chipset, or multi-chip module.

In some embodiments, the units of logic 1172, 1174 are electrically coupled with a bridge 1182 that is configured to route electrical signals between the logic 1172, 1174. The bridge 1182 may be a dense interconnect structure that provides a route for electrical signals. The bridge 1182 may include a bridge substrate composed of glass or a suitable semiconductor material. Electrical routing features can be formed on the bridge substrate to provide a chip-to-chip connection between the logic 1172, 1174.

Although two units of logic 1172, 1174 and a bridge 1182 are illustrated, embodiments described herein may include more or fewer logic units on one or more dies. The one or more dies may be connected by zero or more bridges, as the bridge 1182 may be excluded when the logic is included on a single die. Alternatively, multiple dies or units of logic can be connected by one or more bridges. Additionally, multiple logic units, dies, and bridges can be connected together in other possible configurations, including three-dimensional configurations.

Figure 11C:
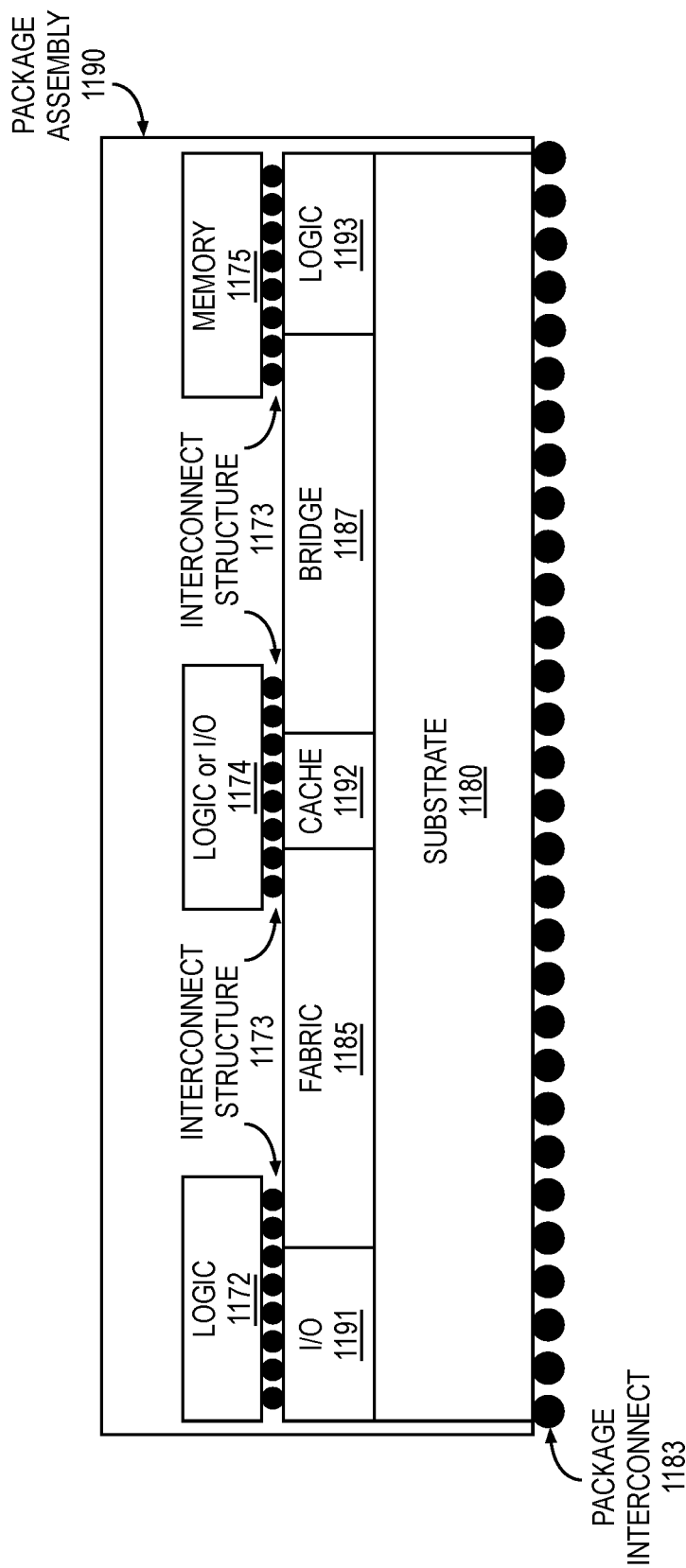
FIG. 11C illustrates a package assembly that includes multiple units of hardware logic chiplets connected to a substrate (e.g., base die).

FIG. 11C illustrates a package assembly 1190 that includes multiple units of hardware logic chiplets connected to a substrate 1180 (e.g., base die). A graphics processing unit, parallel processor, and/or compute accelerator as described herein can be composed from diverse silicon chiplets that are separately manufactured. In this context, a chiplet is an at least partially packaged integrated circuit that includes distinct units of logic that can be assembled with other chiplets into a larger package. A diverse set of chiplets with different IP core logic can be assembled into a single device. Additionally the chiplets can be integrated into a base die or base chiplet using active interposer technology. The concepts described herein enable the interconnection and communication between the different forms of IP within the GPU. IP cores can be manufactured using different process technologies and composed during manufacturing, which avoids the complexity of converging multiple IPs, especially on a large SoC with several flavors IPs, to the same manufacturing process. Enabling the use of multiple process technologies improves the time to market and provides a cost-effective way to create multiple product SKUs. Additionally, the disaggregated IPs are more amenable to being power gated independently, components that are not in use on a given workload can be powered off, reducing overall power consumption.

The hardware logic chiplets can include special purpose hardware logic chiplets 1172, logic or I/O chiplets 1174, and/or memory chiplets 1175. The hardware logic chiplets 1172 and logic or I/O chiplets 1174 may be implemented at least partly in configurable logic or fixed-functionality logic hardware and can include one or more portions of any of the processor core(s), graphics processor(s), parallel processors, or other accelerator devices described herein. The memory chiplets 1175 can be DRAM (e.g., GDDR, HBM) memory or cache (SRAM) memory.

Each chiplet can be fabricated as separate semiconductor die and coupled with the substrate 1180 via an interconnect structure 1173. The interconnect structure 1173 may be configured to route electrical signals between the various chiplets and logic within the substrate 1180. The interconnect structure 1173 can include interconnects such as, but not limited to bumps or pillars. In some embodiments, the interconnect structure 1173 may be configured to route electrical signals such as, for example, input/output (I/O) signals and/or power or ground signals associated with the operation of the logic, I/O and memory chiplets.

In some embodiments, the substrate 1180 is an epoxy-based laminate substrate. The substrate 1180 may include other suitable types of substrates in other embodiments. The package assembly 1190 can be connected to other electrical devices via a package interconnect 1183. The package interconnect 1183 may be coupled to a surface of the substrate 1180 to route electrical signals to other electrical devices, such as a motherboard, other chipset, or multi-chip module.

In some embodiments, a logic or I/O chiplet 1174 and a memory chiplet 1175 can be electrically coupled via a bridge 1187 that is configured to route electrical signals between the logic or I/O chiplet 1174 and a memory chiplet 1175. The bridge 1187 may be a dense interconnect structure that provides a route for electrical signals. The bridge 1187 may include a bridge substrate composed of glass or a suitable semiconductor material. Electrical routing features can be formed on the bridge substrate to provide a chip-to-chip connection between the logic or I/O chiplet 1174 and a memory chiplet 1175. The bridge 1187 may also be referred to as a silicon bridge or an interconnect bridge. For example, the bridge 1187, in some embodiments, is an Embedded Multi-die Interconnect Bridge (EMIB). In some embodiments, the bridge 1187 may simply be a direct connection from one chiplet to another chiplet.

The substrate 1180 can include hardware components for I/O 1191, cache memory 1192, and other hardware logic 1193. A fabric 1185 can be embedded in the substrate 1180 to enable communication between the various logic chiplets and the logic 1191, 1193 within the substrate 1180. In one embodiment, the I/O 1191, fabric 1185, cache, bridge, and other hardware logic 1193 can be integrated into a base die that is layered on top of the substrate 1180. The fabric 1185 may be a network on a chip interconnect or another form of packet switched fabric that switches data packets between components of the package assembly.

In various embodiments a package assembly 1190 can include fewer or greater number of components and chiplets that are interconnected by a fabric 1185 or one or more bridges 1187. The chiplets within the package assembly 1190 may be arranged in a 3D or 2.5D arrangement. In general, bridge structures 1187 may be used to facilitate a point to point interconnect between, for example, logic or I/O chiplets and memory chiplets. The fabric 1185 can be used to interconnect the various logic and/or I/O chiplets (e.g., chiplets 1172, 1174, 1191, 1193). with other logic and/or I/O chiplets. In one embodiment, the cache memory 1192 within the substrate can act as a global cache for the package assembly 1190, part of a distributed global cache, or as a dedicated cache for the fabric 1185.

Figure 11D:
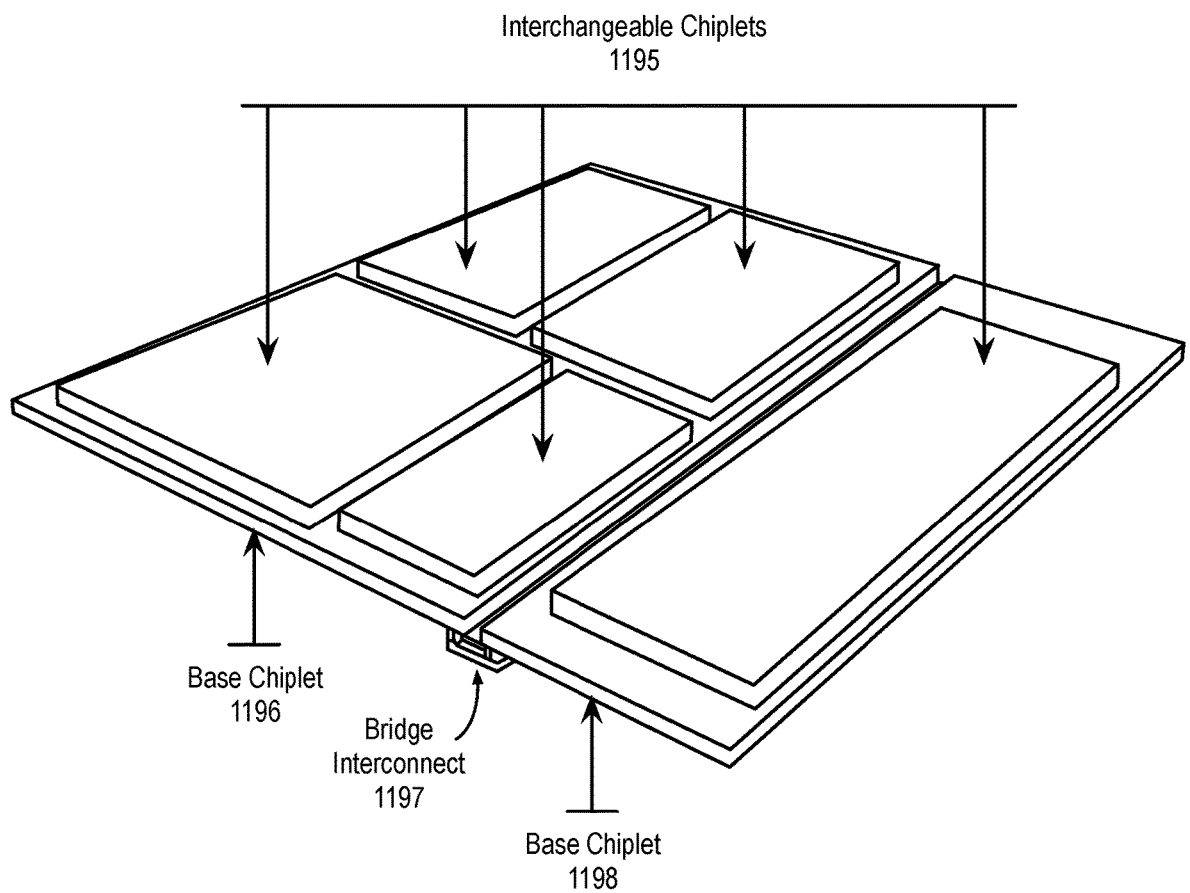
FIG. 11D illustrates a package assembly including interchangeable chiplets.

FIG. 11D illustrates a package assembly 1194 including interchangeable chiplets 1195, according to an embodiment. The interchangeable chiplets 1195 can be assembled into standardized slots on one or more base chiplets 1196, 1198. The base chiplets 1196, 1198 can be coupled via a bridge interconnect 1197, which can be similar to the other bridge interconnects described herein and may be, for example, an EMIB. Memory chiplets can also be connected to logic or I/O chiplets via a bridge interconnect. I/O and logic chiplets can communicate via an interconnect fabric. The base chiplets can each support one or more slots in a standardized format for one of logic or I/O or memory/cache.

In one embodiment, SRAM and power delivery circuits can be fabricated into one or more of the base chiplets 1196, 1198, which can be fabricated using a different process technology relative to the interchangeable chiplets 1195 that are stacked on top of the base chiplets. For example, the base chiplets 1196, 1198 can be fabricated using a larger process technology, while the interchangeable chiplets can be manufactured using a smaller process technology. One or more of the interchangeable chiplets 1195 may be memory (e.g., DRAM) chiplets. Different memory densities can be selected for the package assembly 1194 based on the power, and/or performance targeted for the product that uses the package assembly 1194. Additionally, logic chiplets with a different number of type of functional units can be selected at time of assembly based on the power, and/or performance targeted for the product. Additionally, chiplets containing IP logic cores of differing types can be inserted into the interchangeable chiplet slots, enabling hybrid processor designs that can mix and match different technology IP blocks.

Example System on a Chip Integrated Circuit

Figure 12:
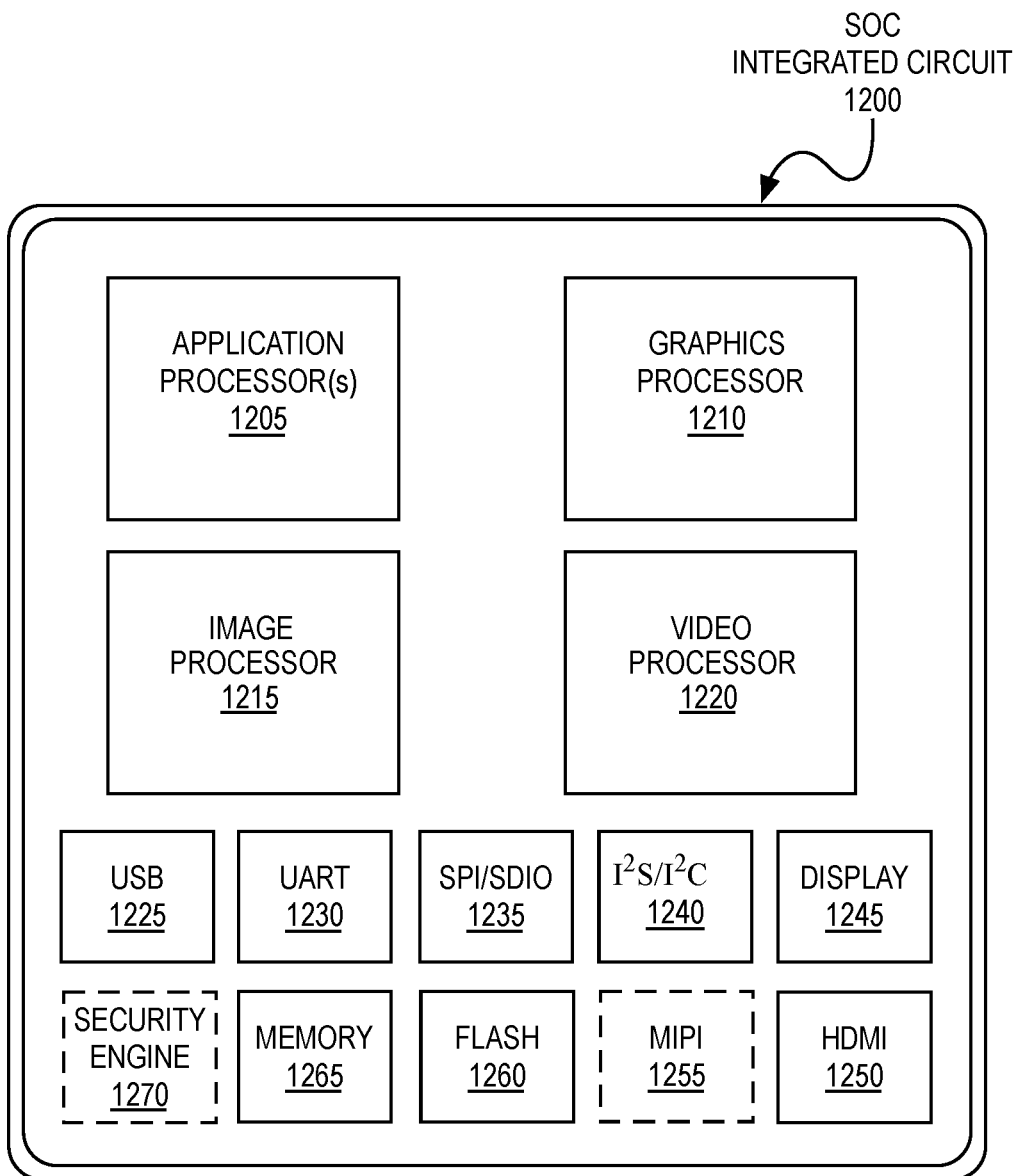
FIG. 12 is a block diagram illustrating an example system on a chip integrated circuit.
Figure 13A:
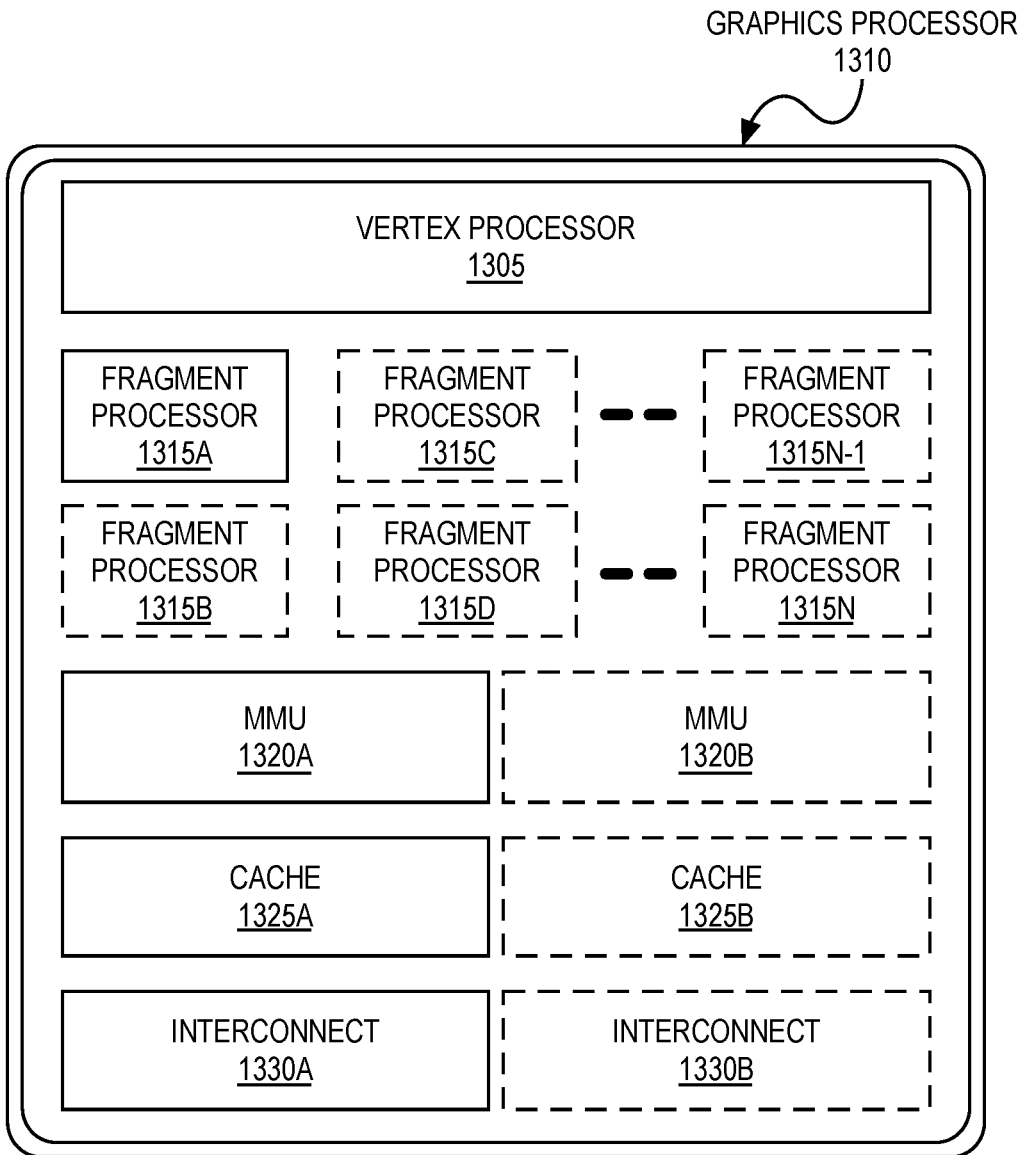
FIG. 13A-13B are block diagrams illustrating example graphics processors for use within an SoC.
Figure 13B:
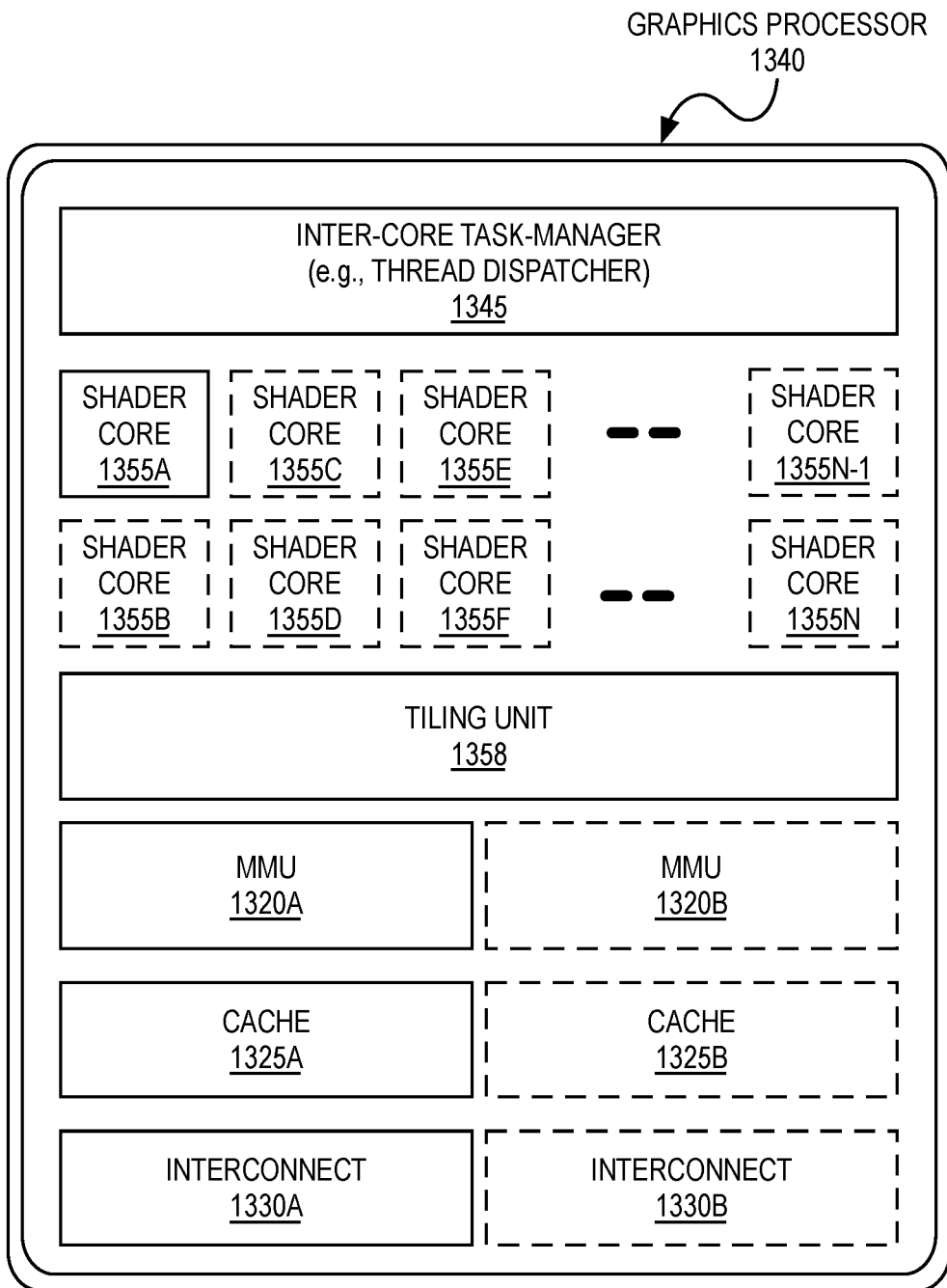

FIGS. 12-13B illustrate example integrated circuits and associated graphics processors that may be fabricated using one or more IP cores, according to various embodiments described herein. In addition to what is illustrated, other logic and circuits may be included, including additional graphics processors/cores, peripheral interface controllers, or general-purpose processor cores.

FIG. 12 is a block diagram illustrating an example system on a chip integrated circuit 1200 that may be fabricated using one or more IP cores, according to an embodiment. Example integrated circuit 1200 includes one or more application processor(s) 1205 (e.g., CPUs), at least one graphics processor 1210, and may additionally include an image processor 1215 and/or a video processor 1220, any of which may be a modular IP core from the same or multiple different design facilities. Integrated circuit 1200 includes peripheral or bus logic including a USB controller 1225, UART controller 1230, an SPI/SDIO controller 1235, and an I²S/I²C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

FIGS. 13A-13B are block diagrams illustrating example graphics processors for use within an SoC, according to embodiments described herein. FIG. 13A illustrates an example graphics processor 1310 of a system on a chip integrated circuit that may be fabricated using one or more IP cores, according to an embodiment. FIG. 13B illustrates an additional example graphics processor 1340 of a system on a chip integrated circuit that may be fabricated using one or more IP cores, according to an embodiment. Graphics processor 1310 of FIG. 13A is an example of a low power graphics processor core. Graphics processor 1340 of FIG. 13B is an example of a higher performance graphics processor core. Each of the graphics processors 1310, 1340 can be variants of the graphics processor 1210 of FIG. 12.

As shown in FIG. 13A, graphics processor 1310 includes a vertex processor 1305 and one or more fragment processor(s) 1315A-1315N (e.g., 1315A, 1315B, 1315C, 1315D, through 1315N-1, and 1315N). Graphics processor 1310 can execute different shader programs via separate logic, such that the vertex processor 1305 is optimized to execute operations for vertex shader programs, while the one or more fragment processor(s) 1315A-1315N execute fragment (e.g., pixel) shading operations for fragment or pixel shader programs. The vertex processor 1305 performs the vertex processing stage of the 3D graphics pipeline and generates primitives and vertex data. The fragment processor(s) 1315A-1315N use the primitive and vertex data generated by the vertex processor 1305 to produce a framebuffer that is displayed on a display device. In one embodiment, the fragment processor(s) 1315A-1315N are optimized to execute fragment shader programs as provided for in the OpenGL API, which may be used to perform similar operations as a pixel shader program as provided for in the Direct 3D API.

Graphics processor 1310 additionally includes one or more memory management units (MMUs) 1320A-1320B, cache(s) 1325A-1325B, and circuit interconnect(s) 1330A-1330B. The one or more MMU(s) 1320A-1320B provide for virtual to physical address mapping for the graphics processor 1310, including for the vertex processor 1305 and/or fragment processor(s) 1315A-1315N, which may reference vertex or image/texture data stored in memory, in addition to vertex or image/texture data stored in the one or more cache(s) 1325A-1325B. In one embodiment the one or more MMU(s) 1320A-1320B may be synchronized with other MMUs within the system, including one or more MMUs associated with the one or more application processor(s) 1205, image processor 1215, and/or video processor 1220 of FIG. 12, such that each processor 1205-1220 can participate in a shared or unified virtual memory system. The one or more circuit interconnect(s) 1330A-1330B enable graphics processor 1310 to interface with other IP cores within the SoC, either via an internal bus of the SoC or via a direct connection, according to embodiments.

As shown FIG. 13B, graphics processor 1340 includes the one or more MMU(s) 1320A-1320B, cache(s) 1325A-1325B, and circuit interconnect(s) 1330A-1330B of the graphics processor 1310 of FIG. 13A. Graphics processor 1340 includes one or more shader core(s) 1355A-1355N (e.g., 1455A, 1355B, 1355C, 1355D, 1355E, 1355F, through 1355N-1, and 1355N), which provides for a unified shader core architecture in which a single core or type or core can execute all types of programmable shader code, including shader program code to implement vertex shaders, fragment shaders, and/or compute shaders. The exact number of shader cores present can vary among embodiments and implementations. Additionally, graphics processor 1340 includes an inter-core task manager 1345, which acts as a thread dispatcher to dispatch execution threads to one or more shader cores 1355A-1355N and a tiling unit 1358 to accelerate tiling operations for tile-based rendering, in which rendering operations for a scene are subdivided in image space, for example to exploit local spatial coherence within a scene or to optimize use of internal caches.

In some embodiments, a processing resource represents a processing element (e.g., GPGPU core, ray-tracing core, tensor core, execution resource, execution unit (EU), stream processor, streaming multiprocessor (SM), graphics multi-processor) associated with a graphics processor or graphics processor structure (e.g., parallel processing unit, graphics processing engine, multi-core group, compute unit, compute unit of graphics core next) in a GPU as described herein. For example, the processing resource may be one of the GPGPU cores, or tensor/ray-tracing cores of graphics multiprocessor; a ray-tracing core, tensor core or GPGPU core of graphics multiprocessor; execution resources of graphics multiprocessor; one of GFX cores, tensor cores, or ray tracing cores of a multi-core group; one of vector logic units or scalar logic units of a compute unit; execution unit with EU array or EU array; an execution unit of execution logic; and/or execution unit. The processing resource may also be an execution resource within, for example, a graphics processing engine, processing cluster, GPGPU, GPGPU, graphics processing engine, graphics processing engine cluster, and/or graphics processing engine. The processing resource may also be a processing resource within graphics processor, graphics processor, and/or graphics processor.

Tessellation Redistribution for Reducing Latencies in Processors

Parallel computing is a type of computation in which many calculations or the execution of processes are carried out simultaneously. Parallel computing may come in a variety of forms, including, but not limited to, SIMD or SIMT. SIMD describes computers with multiple processing elements that perform the same operation on multiple data points simultaneously. In one example, FIGS. 5A-5B discussed above refer to SIMD and its implementation in a general processor in terms of EUs, FPUs, and ALUs. In a common SIMD machine, data is packaged into registers, each containing an array of channels. Instructions operate on the data found in channel n of a register with the data found in the same channel of another register. SIMD machines are advantageous in areas where a single sequence of instructions can be simultaneously applied to high amounts of data. For example, in one embodiment, a graphics processor (e.g., GPGPU, GPU, etc.) can be used to perform SIMD vector operations using computational shader programs.

Various embodiments can also apply to use execution by use of Single Instruction Multiple Thread (SIMT) as an alternate to use of SIMD or in addition to use of SIMD. Reference to a SIMD core or operation can apply also to SIMT or apply to SIMD in combination with SIMT. The following description is discussed in terms of SIMD machines. However, embodiments herein are not solely limited to application in the SIMD context and may apply in other parallel computing paradigms, such as SIMT, for example. For ease of discussion and explanation, the following description generally focuses on a SIMD implementation. However, embodiments can similarly apply to SIMT machines with no modifications to the described techniques and methodologies. With respect to SIMT machines, similar patterns as discussed below can be followed to provide instructions to the systolic array and execute the instructions on the SIMT machine. Other types of parallel computing machines may also utilize embodiments herein as well.

As previously discussed, providing competitive geometry processing performance in a graphics processing unit (GPU) typically involves multiple, parallel, concurrent geometry processing fixed-function pipelines (GPPs). These GPPs (sometimes also called SMMs, Geometry and Setup fixed-function pipelines or pre-tessellation and post-tessellation pipeline) include a mixture of programmable shader and fixed-function stages in the OpenGL rendering pipeline (RP). In computer graphics, tessellation is used to manage datasets of polygons (also referred to a vertex sets) presenting objects in a scene and divide them into suitable structures for rendering. An advantage of tessellation for realtime graphics is that it allows detail to be dynamically added and subtracted from a 3D polygon mesh and its silhouette edges based on control parameters (e.g., camera distance). Tessellation involves subdividing a patch primitive (also called an "object") and computing vertex values for its vertices. A tessellation control shader may determine how much tessellation to perform by specifying a tessellation factor. The number of vertices per patch may be defined at the application level. A patch object may be a triangle or quad (which is a square).

Tessellation involves subdividing parametric domains associated with input patch primitives into a set of triangle primitives and computing vertex values at the tessellated domain points (coinciding with the corners of those triangle primitives). Input patch primitives may be associated with triangle or quad parametric domains. A tessellation control shader may determine how finely the domain is subdivided into triangles by specifying a set of tessellation factors for each patch. A tessellation evaluation shader may subsequently compute vertex values using a set of input control points associated with an input patch primitive as well as the domain parameters at the tessellated domain points. The number of input control points associated with patch primitives may be defined at the application level.

A problem in parallel rendering graphics architectures is how to take advantage of parallel GPPs and Rendering or Rasterization Pipelines (RPs) while maintaining the strict in-order three-dimensional (3D) pipeline rendering model. The major issue involved is the arbitrary mapping of application-supplied "object-space" geometry primitives onto the rendered image during the rendering process, where the "Sort-Middle" architecture has been exploited effectively by the industry. In this scheme, the GPU first performs full geometry processing on arbitrarily distributed subsets ("batches") of object-space primitives via parallel GPPs. The resulting screen-space primitives are then correctly reordered (i.e., temporally sorted) and distributed to RPs via a rasterization crossbar based on the screen space regions owned by each RP.

Increasing the number (N) of GPPs in the design typically utilizes deeper buffers at the output of each GPP in order to provide sufficient GPP output buffering while the GPP "waits for its turn" to output to the rasterization crossbar. Here the GPP output buffer would likely be sized to the average time it takes the other (N−1) GPPs to drain their batches to the crossbar. If sufficient buffering is not provided, the overall geometry throughput tends to degrade to the throughput of a single GPP, as the GPPs "waiting for their turn" quickly become stalled as they are not drained while waiting, and when it becomes their turn, they output to the crossbar at the GPP processing rate (which is slower than the crossbar rate).

The tessellation processing rate of a GPU can be increased by using local (on-die) tessellation work redistribution. The tessellation work redistribution can avoid utilizing large on-die buffers and, as the distribution is local, the performance and power penalty incurred by use of off-chip memory accesses can be avoided as well. Instead of writing pre-tessellation results to memory and subsequently redistributing those results across the tessellation pipelines, a tessellation redistribution capability can be utilized to directly distribute patches across the tessellation stages of the GPPs, without consuming any off-chip memory bandwidth.

Existing approaches to tessellation work redistribution can involve tessellation engines (TEs) in GPPs communicating using a tessellation redistribution bus (TRB) communicably coupling the TEs, where the TRB supports distributing the tessellation work to parallel GPPs while maintaining ordering. A tessellation distribution central engine (TED) is also utilized to pass control to TEs in GPPs, allowing controlling of the TRB. The TEs communicate with the TED, including sending tessellation work to the TED as well as relieving the TRB while passing information about the next GPP that is to control the TRB.

However, in the existing approaches, the TED may be physically placed far away from individual TEs (residing within GPPs). Any communication involving passing the control from one GPP to another GPP or involving the TE waiting for previous tessellation work sent for redistribution to the TED to be distributed (before processing subsequent tessellation work itself at the TE) can involve a long path, resulting in latencies. These long paths and latencies result in idle periods across GPPs.

For example, the round trip latency from the TE to TED does not allow for streaming while switching from one GPP to another. Such streaming cannot occur, for example, when the TE has tessellation work marked for redistribution by the TED interleaved with tessellation work to be performed by the TE itself. This problem multiplies when a TE is switching frequently between tessellation work marked for distribution and tessellation work marked to be processed locally at the TE. As such, the idle period can increase every time the TE having control of the TRB has tessellation work that is to be distributed (to the TED) followed by tessellation work that is to be processed locally at the TE, or vice versa. This leads to overall under-utilization, and resulting performance loss, of the GPPs in the existing approaches of tessellation work redistribution.

Embodiments address the above-noted drawbacks by providing for tessellation redistribution for reducing latencies in processors. The tessellation redistribution of embodiments splits the TE to TED interactions of GPPs into a TE front end (TEFE) to TED interaction and a TE back end (TEBE) to TED interaction. In some embodiments, each TEFE of all of the GPPs interacting with the TED can send packets to the TED in parallel, while the TED processes such packets in order. Embodiments herein further introduce distribution barrier-based synchronization between the TEs and the TED to allow for pipelined processing of tessellation work.

Embodiments provide a technical advantage of reducing latencies in processors, such as GPUs, and improving processor performance across GPPs implementing tessellation work redistribution by scheduling tessellation work across all GPPs in a streamlined manner and avoiding switching penalties associating with such scheduling within each GPP. Embodiments also provide for scalability of tessellation work redistribution when adding additional GPPs within larger SoCs or multi-die processors, as the latencies associated with longer paths between TEs and the TED are reduced by embodiments.

Figure 14:
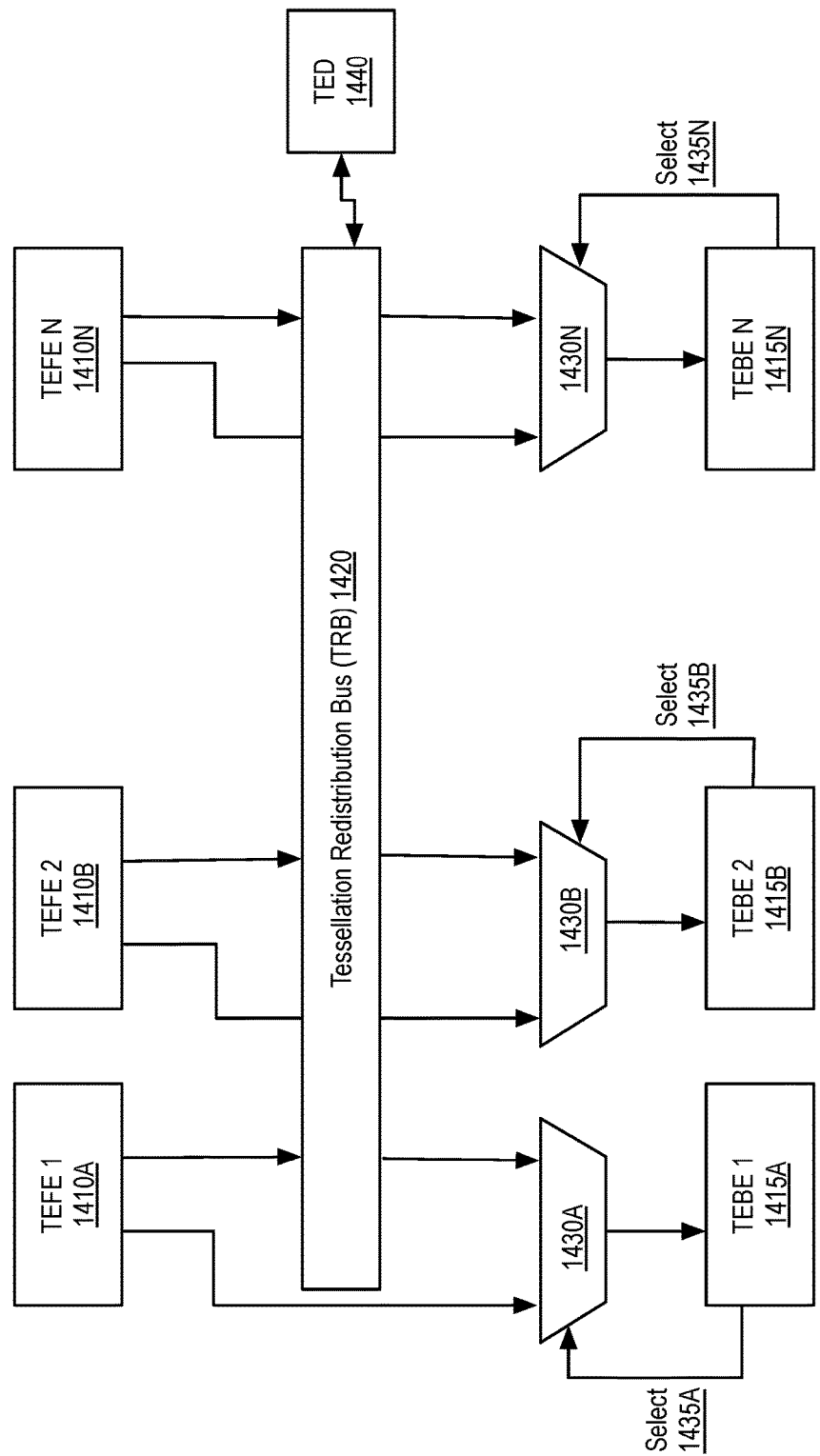
FIG. 14 is a block diagram illustrating an integrated circuit graphics processor having fixed function tessellation stages for tessellation redistribution for reducing latencies, according to embodiments.

FIG. 14 is a block diagram illustrating an integrated circuit graphics processor 1400 having fixed function tessellation stages for tessellation redistribution for reducing latencies, according to embodiments. In one implementation, graphics processor 1400 may include a GPGPU or GPU, such as the example GPGPUs and/or GPUs described herein with respect to FIGS. 1-13.

The graphics processor 1400 illustrated in FIG. 14 may include one or more fixed function tessellation stages divided into tessellation front end (TEFL) logic circuits 1410A-1410N (collectively referred to as TEFE 1410) that perform patch culling and patch transmission, and tessellation back end (TEBE) logic circuits 1415A-1415N (collectively referred to as TEBE 1415) that perform patch reception and patch tessellation. A tessellation engine (TE) of a GPP may include the combination of a TEFE 1410 and TEBE 1415. For example, a first TE of a GPP of the graphics processor 1400 may include TEFE 1 1410A and TEBE 1 1415A, a second TE of a second GPP of the graphics processor 1400 may include TEFE 2 1410B and TEBE 2 1415B, and so on through an Nth TE including TEFE N 1410N and TEBE N 1415N. A combination of a tessellation redistribution bus (TRB) 1420 and tessellation redistribution central engine (TED) 1040 perform patch redistribution from TEFE 1410 of a source GPP to the TEBEs 1415 of one or more destination GPPs.

GPPs can be assigned sequential GPP identifier (ID) values based on criteria such as location in the device floorplan or the GPP IDs may be loaded with programmable values after device reset, as examples. Each GPP may be aware of its GPP ID. These GPP IDs establish a sequential ordering of GPPs, where the ordering wraps from the highest-numbered GPP to the lowest-numbered GPP, forming a cycle of GPP IDs according to one implementation. However, other ordering schemes may also be implemented.

In an implementation, one or more or portions of the TEFE 1410, TEBE 1415, TRB 1420, and TED 1440 can be implemented via a processing resource, such as an execution unit (EU). The processing resource, such as the EU, may include, for example, programmable logic or circuitry such as a logic core or cores that may provide a wide array of programmable logic functions. In an implementation, one or more or portions of the one or more or portions of the TEFE 1410, TEBE 1415, TRB 1420, and TED 1440 are implemented via dedicated hardware such as fixed function circuitry or the like. Fixed function circuitry may include dedicated logic or circuitry and may provide a set of fixed function entry points that may map to the dedicated logic for a fixed purpose or function.

The tessellation redistribution provided by processor 1400 is expected to provide gains by re-balancing the TEs before tessellation as each patch and GPP may introduce a variable amount of work. In order to maintain the ordering of the work, synchronization communication is utilized between the TEFE 1410 and TEBE 1415 through the TED 1440. As previously noted, in the case of large GPUs, the latency between TEFE 1410 to TED 1440 and TED 1440 to TEBE 1415 can be significant. This can result in performance loss if there is a frequent switching utilized. Also, if the TEFE 1410 has batch of tessellation work that it can handle locally, it has capability to send a control packet (having information of a next TE) to the TED 1440 while it processes the batch itself. Again, performance can be enhanced if this control packet reaches the TED 1440 as soon as possible.

In some embodiments, the tessellation redistribution provided by processor 1400 enables each TEFE 1410 of all of the GPPs interacting with the TED 1440 to send packets to the TED 1440 in parallel. Although the packets may be received in parallel at the TED 1440, the TED 1440 processes such packets in order in accordance with a sequence defining an order of processing of the GPPs. In embodiments, one of more of the TEFEs 1410A-1410N may have tessellation work that is marked for distribution. These TEFEs 1410A-1410N having tessellation work marked for distribution can communicate with the TED 1440 in parallel with one another. It is the responsibility of the TED 1440 to process the traffic from each TEFE 1410a-1410N in order. In conventional approaches, the TEFEs 1410 would have to wait until a signal is received that the TED 1440 is ready to receive communications from a particular TEFE 1410. In contrast, embodiments allow the TEFEs 1410 to transmit tessellation work to the TED 1440 without having to wait for the TEFE's 1410 turn in the TEFE sequence order adhered to by the TED 1440.

In some implementations, the TED 1440 may include a storage structure, such as queue that is used to queue the received patch transmissions (e.g., tessellation work) marked for distribution that are received from the TEFEs 1410. The TED 1440 may process, in a sequential order, the patch transmissions that are queued, the sequential order defined by a determined sequence of the parallel interconnected geometry fixed-function units.

Embodiments further provide for distribution barrier-based synchronization between the TEs (including TEFEs 1410 and TEBEs 1415) and the TED 1440 to allow for pipelined processing of tessellation work. Selection circuitry 1430A-1430N (e.g., a multiplexor (mux)) may be implemented by each TE as control logic to manage processing of tessellation work by TEBEs 1415A-1415N. A select line 1435A-1435N for switching between patch traffic coming from the TED 1440 and patch traffic coming directly from the TEFE 1410 utilizes communications from TEFE 1410 to TED 1440 and communications from TED 1440 to TEBE 1415.

In some embodiments, subsequent to sending tessellation work that is marked for distribution to the TED 1440, if the TEFE 1410 receives additional tessellation work marked for local processing (e.g., to be sent directly to TEBE 1415), the TEFE 1410 can push this tessellation work marked for local processing into an intermediate storage (e.g., a first in first out (FIFO) queue) with a marker indicating that the TEBE 1415 should wait for a synchronization barrier packet to be received from the TED 1440 before processing this work.

When such tessellation work is sent to the intermediate storage (e.g., while other tessellation work is pending distribution to the TED 1440), the TEFE 1410 also transmits a synchronization barrier packet to the TED 1440, which when received and processed by the TED 1440 would be broadcasted by the TED 1440 to all TEBEs 1415. This synchronization barrier packet is received by TEBE 1415 corresponding to its own TEFE 1410, while other TEBEs 1415 drop it. In one implementation, the synchronization barrier packet includes an identifier (ID) of the TE originating the synchronization barrier packet. The TEBEs 1415 can utilize this ID in the synchronization barrier packet to determine whether to process the synchronization barrier packet or to drop the synchronization barrier packet.

With respect to operations of the TEBE 1415, the TEBE 1415 waits for communications from the TED 1440. Either the TEBE 1415 receives work from the TED 1440 that the TEBE 1415 can execute, or the TEBE 1415 receives a control command indicating that it can process the traffic coming directly from the TEFE 1410. Furthermore, the TEBE 1415, on receiving the work from TEFE 1410 with a marker indicating that it should wait for a synchronization barrier packet, can read out work or control packets from the TED 1440 until the TEBE 1415 receives the synchronization barrier packet. The TEBE 1415, on receiving communication from the TED 1440 indicating the TEBE 1415 should process local traffic, begins to process the complete batch of work as transferred from the TEFL, 1410 into the intermediate storage.

In some implementations, if all of the tessellation work within a batch processed by the TEFE 1410 is marked to be processed locally, the TEFE 1410 can send a control cycle to the TED 1440 immediately. Also, the TEFE 1410 may have multiple such batches back to back marked local and the TEFE 1410 can send a number of control cycles corresponding to the batches immediately to the TED 1440. For step 7, the TEFL, 1410 can start moving the work into the intermediate storage (e.g., local FIFO queues).

Figure 15:
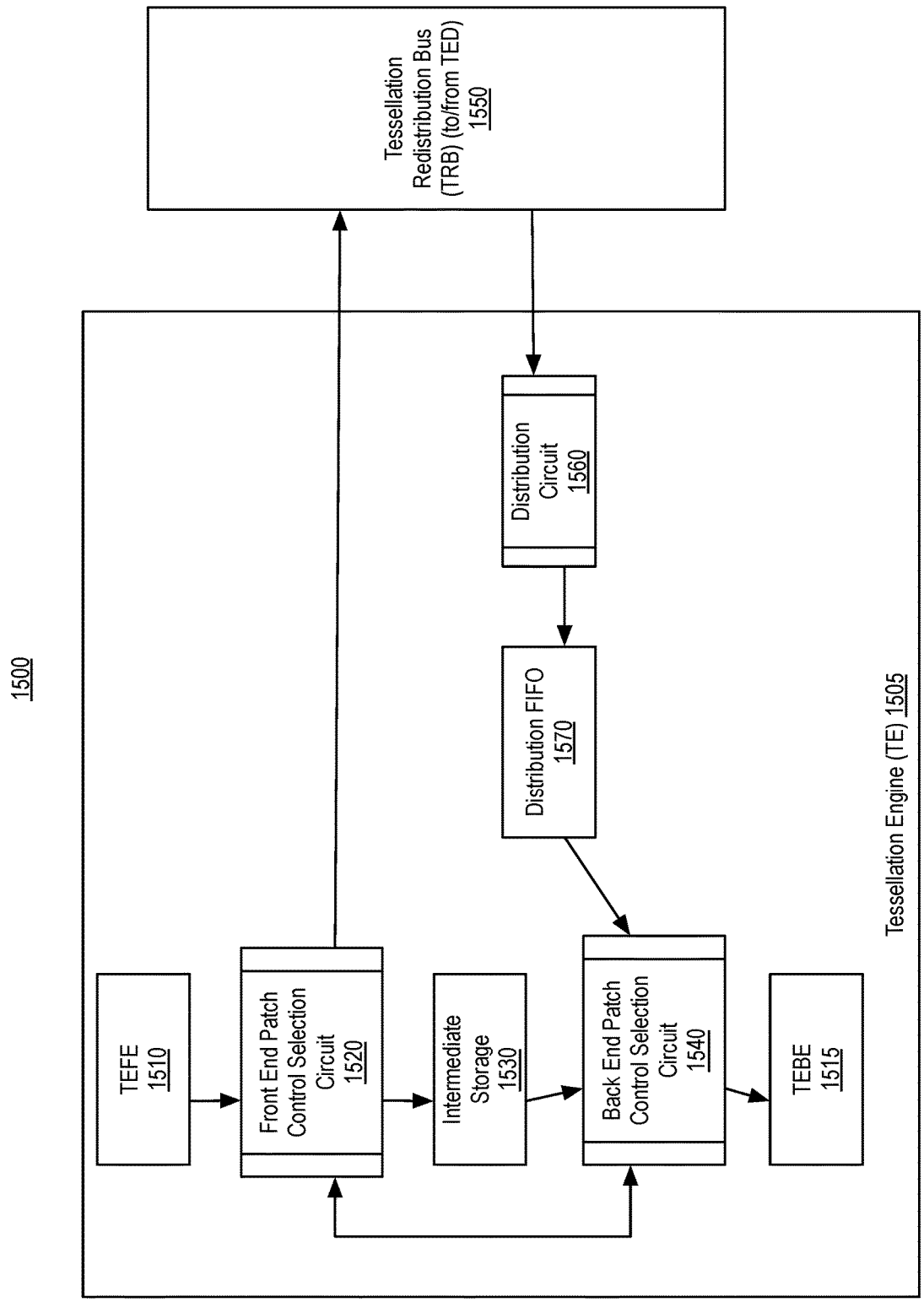
FIG. 15 is a block diagram illustrating tessellation redistribution system having a tessellation engine for tessellation redistribution for reducing latencies, according to embodiments.

FIG. 15 is a block diagram illustrating tessellation redistribution system 1500 having a tessellation engine for tessellation redistribution for reducing latencies, according to embodiments. In one implementation, tessellation redistribution system 1500 may include a GPGPU or GPU, such as the example GPGPUs and/or GPUs described herein with respect to FIGS. 1-13. In one implementation, tessellation redistribution system 1500 includes a tessellation engine 1505 communicably coupled to a TRB 1550 (communicating with a TED) and having a TEFE 1510 and TEBE 1515. TEFE 1510 and TEBE 1515 may be the same as TEFE 1410A-N and TEBE 1415A-N, respectively, described with respect to FIG. 14. TRB 1550 may be the same as TRB 1420 described with respect to FIG. 14.

As illustrated, TE 1505 may include TEFE 1510, front end patch control selection circuit 1520, intermediate storage 1530, back end patch control selection circuit 1540, TEBE 1515, distribution storage 1570, and distribution circuit 1560. TE 1505 may include more or less components than described herein. In one implementation, front end patch control selection circuit 1520, back end patch control selection circuit 1540, and/or distribution circuit 1560 may each implement a finite state machine (FSM). The front end patch control selection circuit 1520 may manage forward transmission to the TED, via the TRB 1550, as previously discussed.

In embodiments herein, the front end patch control selection circuit 1520 may forward patch transmissions to the TED via the TRB 1550 as soon as they are received from the TEFE 1510 and does not wait to receive a signal from the TED to forward such patch transmissions. These forwarded patch transmissions are queues by the TED for subsequent processing in accordance with a determined order.

In some implementations, the intermediate storage 1530 may receive local tessellation work (e.g., marked for local processing) pushed to the intermediate storage 1530 by the front end patch control selection circuit 1520. In one implementation, the intermediate storage 1530 may be a local FIFO of the TE 1505. As discussed with respect to FIG. 14, tessellation work pushed to the intermediate storage may be marked with a synchronization barrier bit to indicate that such work is associated with a synchronization barrier packet sent by the TEFE 1510 (or, in some implementations, the front end patch control selection circuit 1520) to the TED.

The back end patch control selection circuit 1540 manages a control signal (e.g., controlling select line of a mux, such as mux 1430A-N described with respect to FIG. 14) based on messages received from the TEFE 1410/front end patch control selection circuit 1520 and messages received from the TED (e.g., via distribution circuit 1560 discussed further below). The back end patch control selection circuit 1540 may toggle the control signal based on the received messages to cause the TEBE 151 to process tessellation work received either from the intermediate storage 1530 or from the TED via the distribution storage 1570.

In some implementations, the distribution storage 1570 may be a FIFO queue that receives and stores tessellation work sent by the TED. The distribution circuit 1560 may operate to receive and process control messages, such as synchronization barrier packets, sent by the TED (via the TRB 1550). For example, the distribution circuit 1560 may implement an FSM to accept and pass on synchronization barrier packets broadcast by the TED that have an ID corresponding to the TE 1505, while dropping any synchronization barrier packets that do not include the ID of the TE 1505. The distribution circuit 1560 may also cause tessellation work distributed by the TE to be pushed to the distribution storage 1570 for subsequent processing by the TEBE 1515. As noted above, the TEBE 1515 obtains and processes work from the distribution storage 1570 in response to a control signal from the back end patch control selection circuit causing the TEBE 1515 to begin processing such tessellation work.

FIG. 16 is a flow diagram illustrating an embodiment of a method 1600 for tessellation redistribution for reducing latencies in processors. Method 1600 may be performed by processing logic that may comprise hardware (e.g., circuitry, dedicated logic, programmable logic, etc.), software (such as instructions run on a processing device), or a combination thereof. The process of method 1600 is illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-17 may not be repeated or discussed hereafter. In one implementation, a processor, such as a processor 1400 of FIG. 14 or a processor including a tessellation engine (TE) 1505 of FIG. 15, may perform method 1600.

Method 1600 begins at processing block 1610 where processing device may provide parallel interconnected geometry fixed-function units with separate front end and back ends. In one implementation, the front ends are to perform patch culling and transmission and the back ends are to perform patch reception from the front end and patch tessellation. At processing block 1620, the processing device may provide a tessellation redistribution central engine to redistribute patches among the back ends using a redistribution bus provided between the front ends and the back ends.

Subsequently, at processing block 1630, the processing device may receive, by the tessellation redistribution central engine from the front ends in parallel, patch transmissions marked for distribution. In one implementation, the tessellation redistribution engine is to process the patch transmissions in order. Lastly, at processing block 1640, the processing device may, in response to receiving a synchronization barrier packet from one of the front ends, broadcast, by the tessellation redistribution central engine. In one implementation, the synchronization barrier packet to the back ends to cause one of the back ends to process tessellation work locally.

Figure 17:
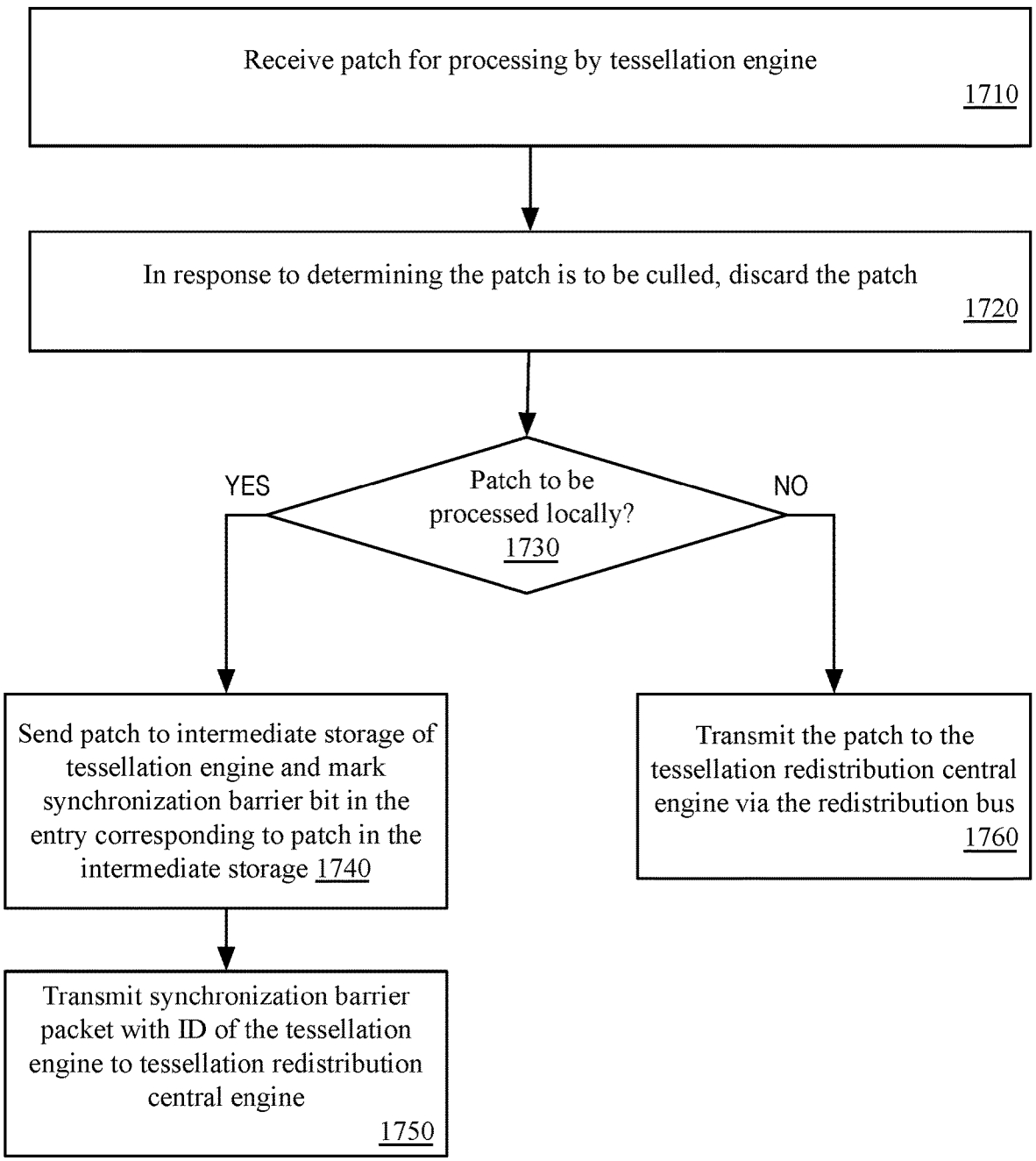
FIG. 17 is a flow diagram illustrating an embodiment of a method for a tessellation engine front end (TEFE) performing tessellation redistribution for reducing latencies in processors.

FIG. 17 is a flow diagram illustrating an embodiment of a method 1700 for a TEFE performing tessellation redistribution for reducing latencies in processors. Method 1700 may be performed by processing logic that may comprise hardware (e.g., circuitry, dedicated logic, programmable logic, etc.), software (such as instructions run on a processing device), or a combination thereof. The process of method 1700 is illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-17 may not be repeated or discussed hereafter. In one implementation, a TEFE of a processor, such as TEFE 1410 of FIG. 14 or TEFE 1510 of FIG. 15, may perform method 1700.

Method 1700 begins at processing block 1710 where processing device may receive, at TEFE, a patch for processing by tessellation engine. At processing block 1720, the TEFL, may in response to determining the patch is to be culled, discard the patch.

Then, at decision block 1730, the TEFL, may determine whether the patch is to be processed locally. If so, method 1700 proceeds to processing block 1740 where the TEFE may send the patch to intermediate storage of tessellation engine and mark a synchronization barrier bit in the entry corresponding to patch in the intermediate storage. Subsequently, at processing block 1750, the TEFL, may transmit a synchronization barrier packet with an ID of the tessellation engine to the tessellation redistribution central engine.

On the other hand, if, at decision block 1730, the TEFE determines that the patch is not to be processed locally (e.g., marked for distribution to the TED), then method 1700 may proceed to processing block 1760. At processing block 1760, the TEFE may transmit the patch to the tessellation redistribution central engine via the redistribution bus.

FIG. 18 is a flow diagram illustrating an embodiment of a method 1800 for a TEBE performing tessellation redistribution for reducing latencies in processors. Method 1800 may be performed by processing logic that may comprise hardware (e.g., circuitry, dedicated logic, programmable logic, etc.), software (such as instructions run on a processing device), or a combination thereof. The process of method 1800 is illustrated in linear sequences for brevity and clarity in presentation; however, it is contemplated that any number of them can be performed in parallel, asynchronously, or in different orders. Further, for brevity, clarity, and ease of understanding, many of the components and processes described with respect to FIGS. 1-17 may not be repeated or discussed hereafter. In one implementation, a TEBE of a processor, such as TEBE 1415 of FIG. 14 or TEBE 1515 of FIG. 15, may perform method 1800.

Method 1800 begins at processing block 1810 where a processing device may receive, at a TEBE, a patch marked for local processing at tessellation engine with a marker indicating a synchronization barrier packet associated with the patch. In one implementation, the patch maintain in intermediate storage of the tessellation engine. At processing block 1820, the TEBE may read out work from front end that is not marked with a synchronization barrier packet or control packets from tessellation redistribution central engine, while the received patch is held in intermediate storage.

Subsequently, at processing block 1830, the TEBE may receive, from the tessellation redistribution central engine, a synchronization barrier packet marked with an ID of the tessellation engine. Lastly, at processing block 1840, the TEBE may process the patch from the intermediate storage in response to receiving the synchronization barrier packet.

The following examples pertain to further embodiments. Example 1 is an apparatus to facilitate tessellation redistribution for reducing latencies in processors. The apparatus of Example 1 includes a processor to provide parallel interconnected geometry fixed-function units with separate front end and back ends, the front ends to perform patch culling and transmission and the back ends to perform patch reception from the front ends and patch tessellation; provide a tessellation redistribution central engine to redistribute patches among the back ends using a redistribution bus provided between the front ends and the back ends; receive, by the tessellation redistribution central engine from the front ends in parallel, patch transmissions marked for distribution, the tessellation redistribution engine to process the patch transmissions in order; and in response to receiving a synchronization barrier packet from one of the front ends, broadcast, by the tessellation redistribution central engine, the synchronization barrier packet to the back ends to cause one of the back ends to process tessellation work locally.

In Example 2, the subject matter of Example 1 can optionally include wherein the synchronization barrier packet to cause the one of the back ends corresponding to the synchronization barrier packet to read out the tessellation work from intermediate storage corresponding to the one of the back ends, and wherein the one of the back ends to perform the patch tessellation on the tessellation work read out from the intermediate storage. In Example 3, the subject matter of any one of Examples 1-2 can optionally include wherein the synchronization barrier packet comprises an identifier (ID) of the parallel interconnected geometry fixed-function unit originating the synchronization barrier packet, and wherein the back ends utilize the ID to determine whether to process the synchronization barrier packet or to drop the synchronization barrier packet.

In Example 4, the subject matter of any one of Examples 1-3 can optionally include wherein the intermediate storage is a first in first out (FIFO) queue, and wherein each entry of the FIFO queue comprising a synchronization barrier bit that is set responsive to tessellation work stored in the entry being associated with the synchronization barrier packet. In Example 5, the subject matter of any one of Examples 1-4 can optionally include wherein the front ends to push the tessellation work marked for local processing to the intermediate storage.

In Example 6, the subject matter of any one of Examples 1-5 can optionally include wherein each of the parallel interconnected geometry fixed-function units comprises a corresponding intermediate storage. In Example 7, the subject matter of any one of Examples 1-6 can optionally include wherein each of the parallel interconnected geometry fixed-function units comprises selection circuitry to switch a control signal that indicates to each of the corresponding back ends to process tessellation work from either the intermediate storage or the redistribution bus.

In Example 8, the subject matter of any one of Examples 1-7 can optionally include wherein the tessellation redistribution central engine to queue the patch transmissions marked for distribution that are received from the front ends and to process in a sequential order the patch transmissions that are queued, the sequential order defined by a determined sequence of the parallel interconnected geometry fixed-function units.

In Example 9, the subject matter of any one of Examples 1-8 can optionally include wherein the processor comprises a graphics processing unit (GPU). In Example 10, the subject matter of any one of Examples 1-9 can optionally include wherein the apparatus is at least one of a single instruction multiple data (SIMD) machine or a single instruction multiple thread (SIMT) machine.

Example 11 is a method for facilitating tessellation redistribution for reducing latencies in processors, the method comprising providing, by a processor, parallel interconnected geometry fixed-function units with separate front end and back ends, the front ends to perform patch culling and transmission and the back ends to perform patch reception from the front ends and patch tessellation; providing a tessellation redistribution central engine to redistribute patches among the back ends of the parallel interconnected geometry fixed-function units using a redistribution bus provided between the front ends and the back ends; receiving, by the tessellation redistribution central engine from the front ends in parallel, patch transmissions marked for distribution, the tessellation redistribution engine to process the patch transmissions in order; and in response to receiving a synchronization barrier packet from one of the front ends, broadcasting, by the tessellation redistribution central engine, the synchronization barrier packet to the back ends to cause one of the back ends to process tessellation work locally.

In Example 12, the subject matter of Example 11 can optionally include wherein the synchronization barrier packet to cause the one of the back ends corresponding to the synchronization barrier packet to read out the tessellation work from intermediate storage corresponding to the one of the back ends, and wherein the one of the back ends to perform the patch tessellation on the tessellation work read out from the intermediate storage. In Example 13, the subject matter of any one of Examples 11-12 can optionally include wherein the synchronization barrier packet comprises an identifier (ID) of the parallel interconnected geometry fixed-function unit originating the synchronization barrier packet, and wherein the back ends utilize the ID to determine whether to process the synchronization barrier packet or to drop the synchronization barrier packet.

In Example 14, the subject matter of any one of Examples 11-13 can optionally include wherein the intermediate storage is a first in first out (FIFO) queue, and wherein each entry of the FIFO queue comprising a synchronization barrier bit that is set responsive to tessellation work stored in the entry being associated with the synchronization barrier packet. In Example 15, the subject matter of any one of Examples 11-14 can optionally include wherein each of the parallel interconnected geometry fixed-function units comprises a corresponding intermediate storage, and wherein each of the parallel interconnected geometry fixed-function units comprises selection circuitry to switch a control signal that indicates to each of the corresponding back ends to process tessellation work from either the intermediate storage or the redistribution bus.

In Example 16, the subject matter of any one of Examples 11-15 can optionally include further comprising: queuing, by the tessellation redistribution central engine, the patch transmissions marked for distribution that are received from the front ends; and processing, by the tessellation redistribution central engine in a sequential order, the patch transmissions that are queued, the sequential order defined by a determined sequence of the parallel interconnected geometry fixed-function units.

Example 17 is a non-transitory computer-readable medium for facilitating tessellation redistribution for reducing latencies in processors. In Example 17, the non-transitory computer-readable medium can have instructions stored thereon, which when executed by one or more processors, cause the processors to: provide parallel interconnected geometry fixed-function units with separate front end and back ends, the front ends to perform patch culling and transmission and the back ends to perform patch reception from the front ends and patch tessellation; provide a tessellation redistribution central engine to redistribute patches among the back ends of the parallel interconnected geometry fixed-function units using a redistribution bus provided between the front ends and the back ends; receive, by the tessellation redistribution central engine from the front ends in parallel, patch transmissions marked for distribution, the tessellation redistribution engine to process the patch transmissions in order; and in response to receiving a synchronization barrier packet from one of the front ends, broadcast, by the tessellation redistribution central engine, the synchronization barrier packet to the back ends to cause one of the back ends to process tessellation work locally.

In Example 18, the subject matter of Example 17 can optionally include wherein the synchronization barrier packet to cause the one of the back ends corresponding to the synchronization barrier packet to read out the tessellation work from intermediate storage corresponding to the one of the back ends, and wherein the one of the back ends to perform the patch tessellation on the tessellation work read out from the intermediate storage.

In Example 19, the subject matter of any one of Examples 17-18 can optionally include wherein the synchronization barrier packet comprises an identifier (ID) of the parallel interconnected geometry fixed-function unit originating the synchronization barrier packet, and wherein the back ends utilize the ID to determine whether to process the synchronization barrier packet or to drop the synchronization barrier packet. In Example 20, the subject matter of any one of Examples 17-19 can optionally include wherein the intermediate storage is a first in first out (FIFO) queue, and wherein each entry of the FIFO queue comprising a synchronization barrier bit that is set responsive to tessellation work stored in the entry being associated with the synchronization barrier packet.

Example 21 is a system for facilitating tessellation redistribution for reducing latencies in processors. In Example 21, the system includes a memory and one or more processors of a plurality of GPUs. The one or more processors of Example 21 are communicably coupled to the memory and are to provide parallel interconnected geometry fixed-function units with separate front end and back ends, the front ends to perform patch culling and transmission and the back ends to perform patch reception from the front ends and patch tessellation; provide a tessellation redistribution central engine to redistribute patches among the back ends using a redistribution bus provided between the front ends and the back ends; receive, by the tessellation redistribution central engine from the front ends in parallel, patch transmissions marked for distribution, the tessellation redistribution engine to process the patch transmissions in order; and in response to receiving a synchronization barrier packet from one of the front ends, broadcast, by the tessellation redistribution central engine, the synchronization barrier packet to the back ends to cause one of the back ends to process tessellation work locally.

In Example 22, the subject matter of Example 21 can optionally include wherein the synchronization barrier packet to cause the one of the back ends corresponding to the synchronization barrier packet to read out the tessellation work from intermediate storage corresponding to the one of the back ends, and wherein the one of the back ends to perform the patch tessellation on the tessellation work read out from the intermediate storage. In Example 23, the subject matter of any one of Examples 21-22 can optionally include wherein the synchronization barrier packet comprises an identifier (ID) of the parallel interconnected geometry fixed-function unit originating the synchronization barrier packet, and wherein the back ends utilize the ID to determine whether to process the synchronization barrier packet or to drop the synchronization barrier packet.

In Example 24, the subject matter of any one of Examples 21-23 can optionally include wherein the intermediate storage is a first in first out (FIFO) queue, and wherein each entry of the FIFO queue comprising a synchronization barrier bit that is set responsive to tessellation work stored in the entry being associated with the synchronization barrier packet. In Example 25, the subject matter of any one of Examples 21-24 can optionally include wherein the front ends to push the tessellation work marked for local processing to the intermediate storage.

In Example 26, the subject matter of any one of Examples 21-25 can optionally include wherein each of the parallel interconnected geometry fixed-function units comprises a corresponding intermediate storage. In Example 27, the subject matter of any one of Examples 21-26 can optionally include wherein each of the parallel interconnected geometry fixed-function units comprises selection circuitry to switch a control signal that indicates to each of the corresponding back ends to process tessellation work from either the intermediate storage or the redistribution bus.

In Example 28, the subject matter of any one of Examples 21-27 can optionally include wherein the tessellation redistribution central engine to queue the patch transmissions marked for distribution that are received from the front ends and to process in a sequential order the patch transmissions that are queued, the sequential order defined by a determined sequence of the parallel interconnected geometry fixed-function units.

In Example 29, the subject matter of any one of Examples 21-28 can optionally include wherein the processor comprises a graphics processing unit (GPU). In Example 30, the subject matter of any one of Examples 21-29 can optionally include wherein the apparatus is at least one of a single instruction multiple data (SIMD) machine or a single instruction multiple thread (SIMT) machine.

Example 31 is an apparatus for facilitating tessellation redistribution for reducing latencies in processors comprising means for providing parallel interconnected geometry fixed-function units with separate front end and back ends, the front ends to perform patch culling and transmission and the back ends to perform patch reception from the front ends and patch tessellation; means for providing a tessellation redistribution central engine to redistribute patches among the back ends of the parallel interconnected geometry fixed-function units using a redistribution bus provided between the front ends and the back ends; means for receiving, by the tessellation redistribution central engine from the front ends in parallel, patch transmissions marked for distribution, the tessellation redistribution engine to process the patch transmissions in order; and in response to receiving a synchronization barrier packet from one of the front ends, means for broadcasting, by the tessellation redistribution central engine, the synchronization barrier packet to the back ends to cause one of the back ends to process tessellation work locally. In Example 32, the subject matter of Example 31 can optionally include the apparatus further configured to perform the method of any one of the Examples 12 to 16.

Example 33 is at least one machine readable medium comprising a plurality of instructions that in response to being executed on a computing device, cause the computing device to carry out a method according to any one of Examples 11-16. Example 34 is an apparatus for facilitating tessellation redistribution for reducing latencies in processors, configured to perform the method of any one of Examples 11-16. Example 35 is an apparatus for facilitating tessellation redistribution for reducing latencies in processors comprising means for performing the method of any one of claims 11 to 16. Specifics in the Examples may be used anywhere in one or more embodiments.

The foregoing description and drawings are to be regarded in an illustrative rather than a restrictive sense. Persons skilled in the art will understand that various modifications and changes may be made to the embodiments described herein without departing from the broader spirit and scope of the features set forth in the appended claims.

What is claimed is:

1. An apparatus comprising:
    a processor to:
        provide parallel interconnected geometry fixed-function units with separate front ends and back ends, the front ends to perform patch culling and transmission and the back ends to perform patch reception from the front ends and patch tessellation;
        provide a tessellation redistribution central engine to redistribute patches among the back ends using a redistribution bus provided between the front ends and the back ends;
        receive, by the tessellation redistribution central engine from the front ends in parallel, patch transmissions marked for distribution, the tessellation redistribution central engine to process the patch transmissions in order; and
        in response to receiving a synchronization barrier packet from one of the front ends, broadcast, by the tessellation redistribution central engine, the synchronization barrier packet to the back ends to cause one of the back ends to process tessellation work locally.

2. The apparatus of claim 1, wherein the synchronization barrier packet to cause the one of the back ends corresponding to the synchronization barrier packet to read out the tessellation work from intermediate storage corresponding to the one of the back ends, and wherein the one of the back ends to perform the patch tessellation on the tessellation work read out from the intermediate storage.

3. The apparatus of claim 2, wherein the synchronization barrier packet comprises an identifier (ID) of the parallel interconnected geometry fixed-function unit originating the synchronization barrier packet, and wherein the back ends utilize the ID to determine whether to process the synchronization barrier packet or to drop the synchronization barrier packet.

4. The apparatus of claim 2, wherein the intermediate storage is a first in first out (FIFO) queue, and wherein each entry of the FIFO queue comprising a synchronization barrier bit that is set responsive to the tessellation work stored in the entry being associated with the synchronization barrier packet.

5. The apparatus of claim 2, wherein the front ends to push the tessellation work marked for local processing to the intermediate storage.

6. The apparatus of claim 1, wherein each of the parallel interconnected geometry fixed-function units comprises a corresponding intermediate storage.

7. The apparatus of claim 6, wherein each of the parallel interconnected geometry fixed-function units comprises selection circuitry to switch a control signal that indicates to each of corresponding ones of the back ends to process the tessellation work from either the intermediate storage or the redistribution bus.

8. The apparatus of claim 1, wherein the tessellation redistribution central engine to queue the patch transmissions marked for distribution that are received from the front ends and to process in a sequential order the patch transmissions that are queued, the sequential order defined by a determined sequence of the parallel interconnected geometry fixed-function units.

9. The apparatus of claim 1, wherein the processor comprises a graphics processing unit (GPU).

10. The apparatus of claim 1, wherein the apparatus is at least one of a single instruction multiple data (SIMD) machine or a single instruction multiple thread (SIMT) machine.

11. A method comprising:
providing, by a processor, parallel interconnected geometry fixed-function units with separate front end and back ends, the front ends to perform patch culling and transmission and the back ends to perform patch reception from the front ends and patch tessellation;
providing a tessellation redistribution central engine to redistribute patches among the back ends of the parallel interconnected geometry fixed-function units using a redistribution bus provided between the front ends and the back ends;
receiving, by the tessellation redistribution central engine from the front ends in parallel, patch transmissions marked for distribution, the tessellation redistribution central engine to process the patch transmissions in order; and
in response to receiving a synchronization barrier packet from one of the front ends, broadcasting, by the tessellation redistribution central engine, the synchronization barrier packet to the back ends to cause one of the back ends to process tessellation work locally.

12. The method of claim 11, wherein the synchronization barrier packet to cause the one of the back ends corresponding to the synchronization barrier packet to read out the tessellation work from intermediate storage corresponding to the one of the back ends, and wherein the one of the back ends to perform the patch tessellation on the tessellation work read out from the intermediate storage.

13. The method of claim 12, wherein the synchronization barrier packet comprises an identifier (ID) of the parallel interconnected geometry fixed-function unit originating the synchronization barrier packet, and wherein the back ends utilize the ID to determine whether to process the synchronization barrier packet or to drop the synchronization barrier packet.

14. The method of claim 12, wherein the intermediate storage is a first in first out (FIFO) queue, and wherein each entry of the FIFO queue comprising a synchronization barrier bit that is set responsive to the tessellation work stored in the entry being associated with the synchronization barrier packet.

15. The method of claim 11, wherein each of the parallel interconnected geometry fixed-function units comprises a corresponding intermediate storage, and wherein each of the parallel interconnected geometry fixed-function units comprises selection circuitry to switch a control signal that indicates to each of corresponding ones of the back ends to process tessellation work from either the intermediate storage or the redistribution bus.

16. The method of claim 11, further comprising:
queuing, by the tessellation redistribution central engine, the patch transmissions marked for distribution that are received from the front ends; and
processing, by the tessellation redistribution central engine in a sequential order, the patch transmissions that are queued, the sequential order defined by a determined sequence of the parallel interconnected geometry fixed-function units.

17. A non-transitory computer-readable medium having instructions stored thereon, which when executed by one or more processors, cause the processors to:
provide parallel interconnected geometry fixed-function units with separate front end and back ends, the front ends to perform patch culling and transmission and the back ends to perform patch reception from the front ends and patch tessellation;
provide a tessellation redistribution central engine to redistribute patches among the back ends of the parallel interconnected geometry fixed-function units using a redistribution bus provided between the front ends and the back ends;
receive, by the tessellation redistribution central engine from the front ends in parallel, patch transmissions marked for distribution, the tessellation redistribution central engine to process the patch transmissions in order; and
in response to receiving a synchronization barrier packet from one of the front ends, broadcast, by the tessellation redistribution central engine, the synchronization barrier packet to the back ends to cause one of the back ends to process tessellation work locally.

18. The non-transitory computer-readable medium of claim 17, wherein the synchronization barrier packet to cause the one of the back ends corresponding to the synchronization barrier packet to read out the tessellation work from intermediate storage corresponding to the one of the back ends, and wherein the one of the back ends to perform the patch tessellation on the tessellation work read out from the intermediate storage.

19. The non-transitory computer-readable medium of claim 18, wherein the synchronization barrier packet comprises an identifier (ID) of the parallel interconnected geometry fixed-function unit originating the synchronization barrier packet, and wherein the back ends utilize the ID to determine whether to process the synchronization barrier packet or to drop the synchronization barrier packet.

20. The non-transitory computer-readable medium of claim 18, wherein the intermediate storage is a first in first out (FIFO) queue, and wherein each entry of the FIFO queue comprising a synchronization barrier bit that is set responsive to the tessellation work stored in the entry being associated with the synchronization barrier packet.

* * * * *

UNITED STATES PATENT AND TRADEMARK OFFICE
CERTIFICATE OF CORRECTION

| | | |
|---|---|---|
| PATENT NO. | : 12,125,121 B2 | |
| APPLICATION NO. | : 17/211095 | |
| DATED | : October 22, 2024 | |
| INVENTOR(S) | : Amandeep Singh et al. | |

It is certified that error appears in the above-identified patent and that said Letters Patent is hereby corrected as shown below:

In the Claims

Claim 15, Column 50, Line 16, should read "process the tessellation work"

Signed and Sealed this
Nineteenth Day of November, 2024

Katherine Kelly Vidal
*Director of the United States Patent and Trademark Office*